(12) United States Patent
Henry et al.

(10) Patent No.: US 9,465,432 B2
(45) Date of Patent: Oct. 11, 2016

(54) MULTI-CORE SYNCHRONIZATION MECHANISM

(71) Applicant: VIA TECHNOLOGIES, INC., New Taipei (TW)

(72) Inventors: G. Glenn Henry, Austin, TX (US); Terry Parks, Austin, TX (US)

(73) Assignee: VIA TECHNOLOGIES, INC., New Taipei (TW)

( * ) Notice: Subject to any disclaimer, the term of this patent is extended or adjusted under 35 U.S.C. 154(b) by 79 days.

(21) Appl. No.: 14/281,434

(22) Filed: May 19, 2014

(65) Prior Publication Data

US 2015/0067369 A1    Mar. 5, 2015

Related U.S. Application Data

(60) Provisional application No. 61/871,206, filed on Aug. 28, 2013, provisional application No. 61/916,338, filed on Dec. 16, 2013.

(51) Int. Cl.
| | |
|---|---|
| *G06F 1/04* | (2006.01) |
| *G06F 1/32* | (2006.01) |
| *G06F 9/52* | (2006.01) |
| *G06F 12/08* | (2016.01) |

(52) U.S. Cl.
CPC .............. *G06F 1/3287* (2013.01); *G06F 1/04* (2013.01); *G06F 1/32* (2013.01); *G06F 9/522* (2013.01); *G06F 12/0891* (2013.01); *G06F 2212/1028* (2013.01); *G06F 2212/60* (2013.01)

(58) Field of Classification Search
CPC ............. G06F 1/04; G06F 1/32; G06F 9/522
See application file for complete search history.

(56) References Cited

U.S. PATENT DOCUMENTS

| | | |
|---|---|---|
| 4,484,303 A | 11/1984 | Provanzano et al. |
| 5,546,532 A | 8/1996 | Trevett |
| 5,724,527 A | 3/1998 | Karnik et al. |

(Continued)

OTHER PUBLICATIONS

Lempel, Oded et al. "2nd Generation Intel® Core™ Processor Family: Intel® Core™ i7, i5 and i3" 2nd Gen Intel® Core™ Microarchitecture formerly codenamed Sandy Bridge. Downloaded Jul. 12, 2013 from http://www.hotchips.org/wp-content/uploads/hc_archives/hc23/HC23.19.9-Desktop-CPUs/HC23.19.911-Sandy-Bridge-Lempel-Intel-Rev%207.pdf pp. 1-48.

(Continued)

*Primary Examiner* — Mark Connolly
*Assistant Examiner* — Kevin Stewart
(74) *Attorney, Agent, or Firm* — E. Alan Davis; Eric W. Cernyar; James W. Huffman

(57) ABSTRACT

A microprocessor includes a control unit configured to selectively control a respective clock signal to each of a plurality of processing cores. Each of the processing cores is configured to separately write a value to the control unit. For each core of the plurality of processing cores, the control unit is configured to turn off the respective clock signal to the core in response to the core writing a value to the control unit. The control unit is configured to detect a condition has occurred when all of the processing cores have written a value to the control unit and the control unit has turned off the respective clock signal to all of the processing cores. The control unit is configured to simultaneously turn on the respective clock signal to all of the processing cores in response to detecting the condition has occurred.

33 Claims, 30 Drawing Sheets

(56) References Cited

U.S. PATENT DOCUMENTS

| | | | |
|---|---|---|---|
| 5,796,972 A | 8/1998 | Johnson et al. | |
| 5,904,733 A | 5/1999 | Jayakumar | |
| 6,049,672 A | 4/2000 | Shiell et al. | |
| 6,108,781 A | 8/2000 | Jayakumar | |
| 6,205,509 B1 | 3/2001 | Platko et al. | |
| 6,279,066 B1 | 8/2001 | Velingker | |
| 6,530,076 B1 | 3/2003 | Ryan et al. | |
| 6,594,756 B1 | 7/2003 | Datta et al. | |
| 6,611,911 B1 | 8/2003 | O'Shea et al. | |
| 6,665,802 B1 | 12/2003 | Ober | |
| 6,760,838 B2 | 7/2004 | Owen et al. | |
| 6,763,517 B2 | 7/2004 | Hines | |
| 6,792,551 B2 | 9/2004 | Dal | |
| 6,922,787 B2 | 7/2005 | Karpel et al. | |
| 6,925,556 B2 | 8/2005 | Hill et al. | |
| 7,100,034 B2 | 8/2006 | Collins et al. | |
| 7,155,551 B2 | 12/2006 | Kolinummi et al. | |
| 7,194,660 B2 | 3/2007 | Edrich | |
| 7,257,679 B2 | 8/2007 | Clark | |
| 7,269,707 B2 | 9/2007 | Menon et al. | |
| 7,290,081 B2 | 10/2007 | Parthasarathy et al. | |
| 7,389,368 B1 | 6/2008 | Burroughs et al. | |
| 7,392,414 B2 * | 6/2008 | Bailey | G06F 1/324 713/300 |
| 7,451,333 B2 * | 11/2008 | Naveh | G06F 1/3203 713/323 |
| 7,509,481 B2 | 3/2009 | Chaudhry et al. | |
| 7,519,799 B2 | 4/2009 | Hebda et al. | |
| 7,694,055 B2 | 4/2010 | Orita et al. | |
| 7,987,352 B2 | 7/2011 | Harikumar et al. | |
| 8,028,154 B2 | 9/2011 | Yu et al. | |
| 8,151,027 B2 | 4/2012 | Zimmer et al. | |
| 8,296,528 B2 | 10/2012 | Zimmer et al. | |
| 8,607,040 B2 | 12/2013 | Zimmer et al. | |
| 8,799,697 B2 | 8/2014 | Johnson et al. | |
| 8,862,917 B2 | 10/2014 | Ulmer et al. | |
| 8,930,932 B2 | 1/2015 | Li et al. | |
| 8,977,871 B2 | 3/2015 | Tang et al. | |
| 8,984,315 B2 | 3/2015 | Rosay | |
| 9,043,580 B2 | 5/2015 | Henry et al. | |
| 2001/0052053 A1 | 12/2001 | Nemirovsky et al. | |
| 2003/0163662 A1 | 8/2003 | Glew et al. | |
| 2003/0196096 A1 | 10/2003 | Sutton | |
| 2004/0015627 A1 | 1/2004 | Desoli et al. | |
| 2004/0117510 A1 | 6/2004 | Arimilli et al. | |
| 2005/0138249 A1 | 6/2005 | Galbraith et al. | |
| 2005/0215274 A1 * | 9/2005 | Matson | G06F 1/3203 455/522 |
| 2005/0251670 A1 | 11/2005 | Michaelis | |
| 2006/0059314 A1 | 3/2006 | Bouchard et al. | |
| 2006/0136640 A1 | 6/2006 | Tuan | |
| 2007/0088939 A1 | 4/2007 | Baumberger et al. | |
| 2007/0124434 A1 | 5/2007 | Smith et al. | |
| 2007/0157042 A1 | 7/2007 | Jahagirdar et al. | |
| 2007/0168592 A1 | 7/2007 | Todoroki et al. | |
| 2007/0250691 A1 | 10/2007 | Cool et al. | |
| 2008/0036613 A1 | 2/2008 | Gaskins et al. | |
| 2008/0134191 A1 | 6/2008 | Warrier et al. | |
| 2008/0162865 A1 | 7/2008 | Koufaty et al. | |
| 2009/0007104 A1 | 1/2009 | Zimmer et al. | |
| 2009/0031090 A1 | 1/2009 | Henry et al. | |
| 2009/0031121 A1 | 1/2009 | Henry et al. | |
| 2009/0083493 A1 | 3/2009 | Kinter | |
| 2009/0172369 A1 | 7/2009 | Stillwell, Jr. et al. | |
| 2009/0235099 A1 | 9/2009 | Branover et al. | |
| 2009/0235260 A1 | 9/2009 | Branover et al. | |
| 2009/0248934 A1 | 10/2009 | Ge et al. | |
| 2009/0271601 A1 | 10/2009 | Zimmer et al. | |
| 2010/0180104 A1 | 7/2010 | Henry et al. | |
| 2010/0218015 A1 * | 8/2010 | Yarak | G06F 1/3228 713/320 |
| 2011/0022857 A1 | 1/2011 | Nussbaum et al. | |
| 2011/0191620 A1 | 8/2011 | Wakabayashi et al. | |
| 2011/0252258 A1 | 10/2011 | Im et al. | |
| 2012/0047580 A1 | 2/2012 | Smith et al. | |
| 2012/0066484 A1 | 3/2012 | Yin et al. | |
| 2012/0089782 A1 | 4/2012 | McKean et al. | |
| 2012/0151263 A1 | 6/2012 | Rentschler et al. | |
| 2012/0166764 A1 | 6/2012 | Henry et al. | |
| 2012/0166845 A1 * | 6/2012 | Henry | G06F 1/3206 713/323 |
| 2013/0131838 A1 | 5/2013 | Washington et al. | |
| 2013/0159664 A1 | 6/2013 | Blinzer et al. | |
| 2013/0159772 A1 | 6/2013 | Felton | |
| 2013/0290758 A1 | 10/2013 | Quick et al. | |
| 2014/0006767 A1 | 1/2014 | Chang et al. | |
| 2014/0006852 A1 | 1/2014 | Buyuktosunoglu et al. | |
| 2014/0013021 A1 | 1/2014 | Matsumoto et al. | |
| 2014/0059372 A1 | 2/2014 | Guntur et al. | |
| 2014/0095896 A1 | 4/2014 | Carter et al. | |
| 2014/0108778 A1 | 4/2014 | Molloy et al. | |
| 2014/0181557 A1 | 6/2014 | Branover et al. | |
| 2014/0181830 A1 | 6/2014 | Naik et al. | |
| 2014/0281457 A1 | 9/2014 | Weissmann et al. | |
| 2015/0058609 A1 | 2/2015 | Henry et al. | |
| 2015/0113250 A1 | 4/2015 | Henry et al. | |
| 2015/0234640 A1 | 8/2015 | Tian et al. | |
| 2015/0324240 A1 | 11/2015 | You | |

OTHER PUBLICATIONS

"Intel and Core i7 (Nehalem) Dynamic Power Management" Downloaded Jun. 14, 2013 from http://impact.asu.edu/cse591sp11/Nahelempm.pdf pp. 1-11.

Dice, Pete. "Booting an Intel Architecture System, Part 1: Early Initialization." Dec. 26, 2011. downloaded May 6, 2015 from http://www.drdobbs.com/go-parallel/article/print?articleId=232300699. pp. 1-10.

Hong, Bo. "Hardware-based Synchronization Support for Shared Accesses in Multi-core Architectures." Mar. 31, 2008 downloaded May 6, 2015 from http://citeseerx.ist.psu.edu/viewdoc/download?doi=10.1.1.135.9036&rep=rep1&type=pdf. pp. 1-7.

Hawkes, Ben. "Notes on Intel Microcode Updates." Dec. 2012-Mar. 2013. downloaded May 6, 2015 from http://inertiawar.com/microcode/. pp. 1-11.

Tian, G. et al. "Performance Measurements of Synchronization of Mechanisms on 16PE NOC Based Multi-Core with Dedicated Synchronization and Data NOC." Dec. 13, 2009-Dec. 16, 2009. downloaded May 6, 2015 from http://www.design-reuse.com/articles/24448/16pe-noc-based-multi-core-synchronization-mechanisms.html. pp. 1-8.

"Symmetric Multiprocessors and Performance of SpinLock Techniques." Based on Anderson's Paper. Feb. 8, 2007. downloaded May 6, 2015 from https://wiki.cc.gatech.edu/multicore/index.php/Synchronization. pp. 1-32.

Stoif, Christian et al. "Hardware Synchronization for Embedded Multi-Core Processors." May 15, 2011-May 18, 2011 downloaded May 6, 2015 from https://wiki.cc.gatech.edu/multicore/index.php/Synchronization. pp. 1-4.

* cited by examiner

FIG. 2
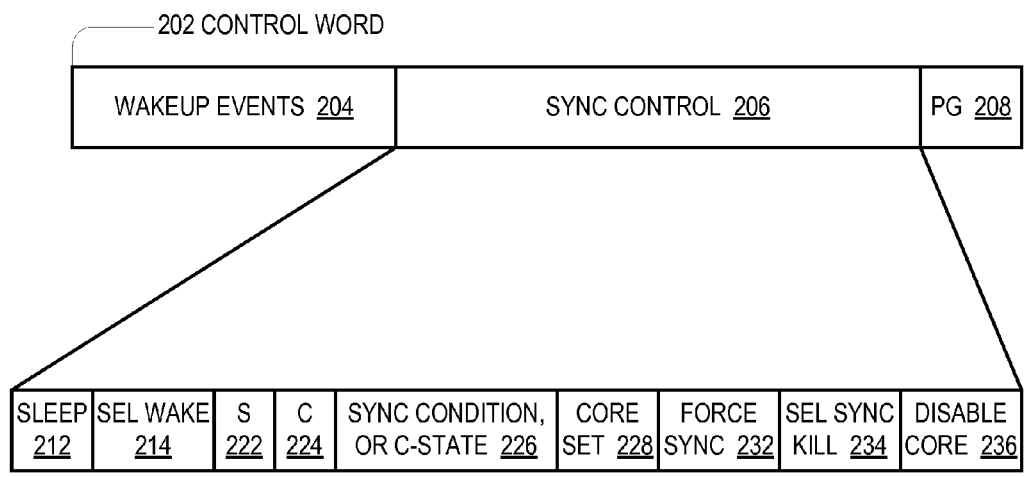
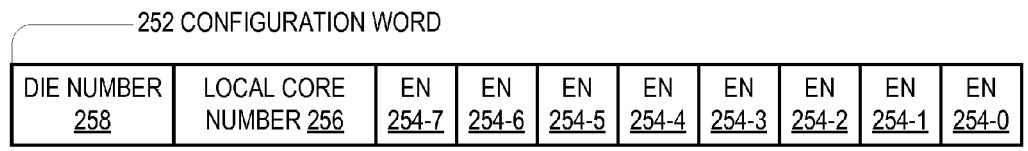

US 9,465,432 B2

MULTI-CORE SYNCHRONIZATION MECHANISM

CROSS REFERENCE TO RELATED APPLICATION(S)

This application claims priority based on U.S. Provisional Application, Ser. No. 61/871,206, filed Aug. 28, 2013, and on U.S. Provisional Application, Ser. No. 61/916,338, filed Dec. 16, 2013, each of which is hereby incorporated by reference in its entirety. This application is related to the following U.S. Non-Provisional Applications filed concurrently with the instant application: Ser. Nos. 14/281,488; 14/281,551; 14/281,585; 14/281,621; 14/281,657; 14/281,681; 14/281,709; 14/281,729; 14/281,758; 14/281,786; 14/281,796.

BACKGROUND

Multi-core microprocessors have proliferated, primarily due to the performance advantages they offer. This has been made possible primarily by the rapid reduction in semiconductor device geometry dimensions resulting in increased transistor density. The presence of multiple cores in a microprocessor has created the need for the cores to communicate with one another in order to accomplish various features such as power management, cache management, debugging, and configuration that implicate more than one core.

Historically, architectural programs (e.g., operating system or application programs) running on multi-core processors have communicated using semaphores located in a system memory architecturally addressable by all the cores. This may suffice for many purposes, but may not provide the speed, precision and/or system-level transparency needed for others.

BRIEF SUMMARY

In one aspect the present invention provides a microprocessor. The microprocessor includes a control unit configured to selectively control a respective clock signal to each of a plurality of processing cores. Each of the plurality of processing cores is configured to separately write a value to the control unit. For each core of the plurality of processing cores, the control unit is configured to turn off the respective clock signal to the core in response to the core writing a value to the control unit. The control unit is configured to detect a condition has occurred when all of the plurality of processing cores have written a value to the control unit and the control unit has turned off the respective clock signal to all of the plurality of processing cores. The control unit is configured to simultaneously turn on the respective clock signal to all of the plurality of processing cores in response to detecting the condition has occurred.

In another aspect, the present invention provides, in a microprocessor having a control unit and a plurality of processing cores, a method for synchronizing operations among the cores. The method includes writing, by each of the plurality of processing cores, a value to the control unit. The method also includes turning off, by the control unit for each core of the plurality of processing cores, a respective clock signal to the core in response to the core said writing a value to the control unit. The method also includes detecting, by the control unit, that a condition has occurred when all of the plurality of processing cores have written a value to the control unit and the control unit has turned off the respective clock signal to all of the plurality of processing cores. The method also includes turning on, by the control unit, simultaneously the respective clock signal to all of the plurality of processing cores in response to said detecting the condition has occurred.

In yet another aspect, the present invention provides a computer program product encoded in at least one non-transitory computer usable medium for use with a computing device, the computer program product comprising computer usable program code embodied in said medium for specifying a microprocessor. The computer usable program code includes first program code for specifying a control unit configured to selectively control a respective clock signal to each of a plurality of processing cores. The computer usable program code also includes second program code for specifying the plurality of processing cores, each configured to separately write a value to the control unit. For each core of the plurality of processing cores, the control unit is configured to turn off the respective clock signal to the core in response to the core writing a value to the control unit. The control unit is configured to detect a condition has occurred when all of the plurality of processing cores have written a value to the control unit and the control unit has turned off the respective clock signal to all of the plurality of processing cores. The control unit is configured to simultaneously turn on the respective clock signal to all of the plurality of processing cores in response to detecting the condition has occurred.

BRIEF DESCRIPTION OF THE DRAWINGS

FIG. 2 is a block diagram illustrating a control word, a status word, and a configuration word.

DETAILED DESCRIPTION OF THE EMBODIMENTS

Figure 1:
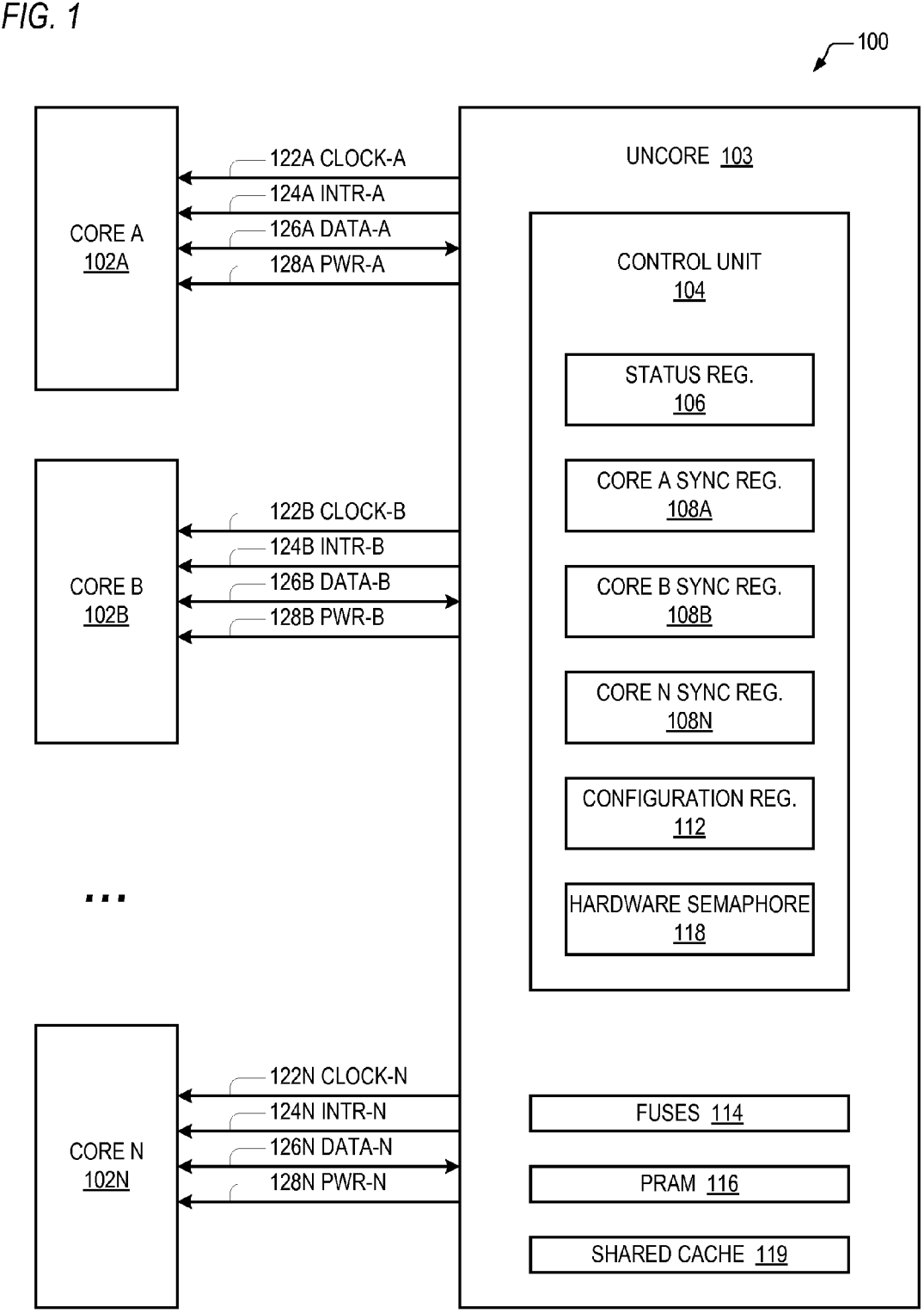
FIG. 1 is a block diagram illustrating a multi-core microprocessor.

Referring now to FIG. 1, a block diagram illustrating a multi-core microprocessor 100 is shown. The microprocessor 100 includes a plurality of processing cores denoted 102A, 102B through 102N, which are referred to collectively as processing cores 102, or simply cores 102, and are referred to individually as processing core 102, or simply core 102. Preferably, each core 102 includes one or more pipelines of functional units (not shown), including an instruction cache, instruction translation unit or instruction decoder that preferably includes a microcode unit, register renaming unit, reservation stations, data caches, execution units, memory subsystem and a retire unit including a reorder buffer. Preferably, the cores 102 include a superscalar, out-of-order execution microarchitecture. In one embodiment, the microprocessor 100 is an x86 architecture microprocessor, although other embodiments are contemplated in which the microprocessor 100 conforms to another instruction set architecture.

The microprocessor 100 also includes an uncore portion 103 coupled to the cores 102 and that it is distinct from the cores 102. The uncore 103 includes a control unit 104, fuses 114, a private random access memory (PRAM) 116, and a shared cache memory 119, for example, a level-2 (L2) and/or level-3 (L3) cache memory, shared by the cores 102. Each of the cores 102 is configured to read/write data from/to the uncore 103 via a respective address/data bus 126 that provides a non-architectural address space (also referred to as private or micro-architectural address space) to shared resources of the uncore 103. The PRAM 116 is private, or non-architectural, in the sense that it is not in the architectural user program address space of the microprocessor 100. In one embodiment, the uncore 103 includes arbitration logic that arbitrates requests by the cores 102 for access to uncore 103 resources.

Each of the fuses 114 is an electrical device that may be blown or not blown; when not blown, the fuse 114 has low impedance and readily conducts electrical current; when blown, the fuse 114 has high impedance and does not readily conduct electrical current. A sense circuit is associated with each fuse 114 to evaluate the fuse 114, i.e., to sense whether the fuse 114 conducts a high current or low voltage (not blown, e.g., logical zero, or clear) or a low current or high voltage (blown, e.g., logical one, or set). The fuse 114 may be blown during manufacture of the microprocessor 100 and, in some embodiments, an unblown fuse 114 may be blown after manufacture of the microprocessor 100. Preferably, the blowing of a fuse 114 is irreversible. An example of a fuse 114 is a polysilicon fuse that may be blown by applying a sufficiently high voltage across the device. Another example of a fuse 114 is a nickel-chromium fuse that may be blown using a laser. Preferably, at power up the sense circuit senses the fuse 114 and provides its evaluation to a corresponding bit in a holding register of the microprocessor 100. When the microprocessor 100 is released out of reset, the cores 102 (e.g., microcode) read the holding registers to determine the sensed fuse 114 values. In one embodiment, before the microprocessor 100 is released out of reset, updated values may be scanned into the holding registers via a boundary scan input, for example, such as a JTAG input, to essentially update the fuse 114 values. This is particularly valuable for testing and/or debug purposes, such as in embodiments described below with respect to FIGS. 22 and 23.

Additionally, in one embodiment, the microprocessor 100 includes a different local Advanced Programmable Interrupt Controller (APIC) (not shown) associated with each core 102. In one embodiment, the local APICs conform architecturally to the description of a local APIC in the Intel 64 and IA-32 Architectures Software Developer's Manual, Volume 3A, May 2012, by the Intel Corporation, of Santa Clara, Calif., particularly in section 10.4. In particular, the local APIC includes an APIC ID register that includes an APIC ID and an APIC base register that includes a bootstrap processor (BSP) flag, whose generation and uses are described in more detail below, particularly with respect to embodiments related to FIGS. 14 through 16 and FIGS. 22 and 23.

The control unit 104 comprises hardware, software, or a combination of hardware and software. The control unit 104 includes a hardware semaphore 118 (described in detail below with respect to FIGS. 17 through 20), a status register 106, a configuration register 112, and a respective sync register 108 for each core 102. Preferably, each of the uncore 103 entities is addressable by each of the cores 102 at a distinct address within the non-architectural address space that enables microcode to read and write it.

Each sync register 108 is writeable by its respective core 102. The status register 106 is readable by each of the cores 102. The configuration register 112 is readable and indirectly writeable (via the disable core bit 236 of FIG. 2, as described below) by each of the cores 102. The control unit 104 preferably includes interrupt logic (not shown) that generates a respective interrupt signal (INTR) 124 to each core 102, which the control unit 104 generates to interrupt the respective core 102. The interrupt sources in response to which the control unit 104 generates an interrupt 124 to a core 102 may include external interrupt sources, such as the x86 architecture INTR, SMI, NMI interrupt sources; or bus events, such as the assertion or de-assertion of the x86 architecture-style bus signal STPCLK. Additionally, each core 102 may send an inter-core interrupt 124 to each of the other cores 102 by writing to the control unit 104. Preferably, the inter-core interrupts described herein, unless otherwise indicated, are non-architectural inter-core interrupts requested by microcode of a core 102 via a microinstruction, which are distinguished from conventional architectural inter-core interrupts that system software requests via an architectural instruction. Finally, the control unit 104 may generate an interrupt 124 to the cores 102 (a sync interrupt) when a synchronization condition, or sync condition, has occurred, as described below (e.g., see FIG. 21 and block 334 of FIG. 3). The control unit 104 also generates a respective core clock signal (CLOCK) 122 to each core 102, which the control unit 104 may selectively turn off and effectively put the respective core 102 to sleep and turn on to wake the core 102 back up. The control unit 104 also generates a respective core power control signal (PWR) 128 to each core 102 that selectively controls whether or not the respective core 102 is receiving power. Thus, the control unit 104 may selectively turn off power to a core 102 via the respective PWR signal 128 to put the core 102 into an even deeper sleep and turn power back on to the core 102 as part of waking the core 102 up.

A core 102 may write to its respective sync register 108 with the synchronization bit set (see S bit 222 of FIG. 2), which is referred to as a synchronization request, or sync request. As described in more detail below, in one embodiment the sync request requests the control unit 104 to put the core 102 to sleep and to awaken it when a sync condition occurs and/or when a specified wakeup event occurs. A sync condition occurs when all the enabled (see enabled bits 254 of FIG. 2) cores 102 of the microprocessor 100—or a specified subset of the enabled cores 102 (see FIG. 2 core set field 228)—have written the same sync condition (specified in a combination of the C bit 224, sync condition or C-state field 226, and core set field 228 of FIG. 2, described in more detail below with respect to the S bit 222) to their respective sync register 108. In response to the occurrence of a sync condition, the control unit 104 simultaneously wakes up all the cores 102 that are waiting on the sync condition, i.e., that have requested the sync condition. In an alternate embodiment described below, the cores 102 can request that only the last core 102 to write the sync request is awakened (see sel wake bit 214 of FIG. 2). In another embodiment, the sync request does not request to put the core 102 to sleep; instead, the sync request requests the control unit 104 to interrupt the cores 102 when the sync condition occurs, as described in more detail below, particularly with respect to FIGS. 3 and 21.

Preferably, when the control unit 104 detects that a sync condition has occurred (due to the last core 102 writing the sync request to the sync register 108), the control unit 104 puts the last core 102 to sleep, i.e., turns off the clock 122 to the last-writing core 102, and then simultaneously awakes all the cores 102, i.e., turns on the clocks 122 to all the cores 102. In this manner all the cores 102 are awakened, i.e., have their clocks 122 turned on, on precisely the same clock cycle. This may be particularly advantageous for certain operations, such as debugging (see for example embodiments of FIG. 5), in which it is beneficial for the cores 102 to wakeup on precisely the same clock cycle. In one embodiment, the uncore 103 includes a single phase-locked loop (PLL) that produces the clock signals 122 provided to the cores 102. In other embodiments, the microprocessor 100 includes multiple PLLs that produces the clock signals 122 provided to the cores 102.

Control, Status and Configuration Words

Referring now to FIG. 2, a block diagram illustrating a control word 202, a status word 242, and a configuration word 252 are shown. A core 102 writes a value of the control word 202 to the sync register 108 of the control unit 104 of FIG. 1 to make an atomic request to sleep and/or to synchronize (sync) with all the other cores 102, or a specified subset thereof, of the microprocessor 100. A core 102 reads a value of the status word 242 from the status register 106 of the control unit 104 to determine status information described herein. A core 102 reads a value of the configuration word 252 from the configuration register 112 of the control unit 104 and uses the value as described below.

The control word 202 includes a wakeup events field 204, a sync control field 206, and a power gate (PG) bit 208. The sync control field 206 includes various bits or subfields that control the sleeping of the core 102 and/or the syncing of the core 102 with other cores 102. The sync control field 206 includes a sleep bit 212, a selective wakeup (sel wake) bit 214, an S bit 222, a C bit 224, a sync condition or C-state field 226, a core set field 228, a force sync bit 232, a selective sync kill bit 234, and a core disable core bit 236. The status word 242 includes a wakeup events field 244, a lowest common C-state field 246, and an error code field 248. The configuration word 252 includes one enabled bit 254 for each core 102 of the microprocessor 100, a local core number field 256, and a die number field 258.

The wakeup events field 204 of the control word 202 comprises a plurality of bits corresponding to different events. If the core 102 sets a bit in the wakeup events field 204, the control unit 104 will wakeup (i.e., turn on the clock 122 to) the core 102 when the event occurs that corresponds to the bit. One wakeup event occurs when the core 102 has synced with all the other cores specified in the core set field 228. In one embodiment, the core set field 228 may specify all the cores 102 of the microprocessor 100; all the cores 102 that share a cache memory (e.g., an L2 cache and/or L3 cache) with the instant core 102; all the cores 102 on the same semiconductor die as the instant core 102 (see FIG. 4 for an example of an embodiment that describes a multi-die, multi-core microprocessor 100); or all the cores 102 on the other semiconductor die as the instant core 102. A set of cores 102 that share a cache memory are referred to as a slice. Other examples of wakeup events include, but are not limited to, an x86 INTR, SMI, NMI, assertion or de-assertion of STPCLK, and an inter-core interrupt. When a core 102 is awakened, it may read the wakeup events field 244 in the status word 242 to determine the active wakeup events.

If the core 102 sets the PG bit 208, the control unit 104 turns off power to the core 102 (e.g., via the PWR signal 128) after it puts the core 102 to sleep. When the control unit 104 subsequently restores power to the core 102, the control unit 104 clears the PG bit 208. Use of the PG bit 208 is described in more detail below with respect to FIGS. 11 through 13.

If the core 102 sets the sleep bit 212 or the sel wake bit 214, the control unit 104 puts the core 102 to sleep after the core 102 writes the sync register 108 using the wakeup events specified in the wakeup events field 204. The sleep bit 212 and the sel wake bit 214 are mutually exclusive. The difference between them regards the action taken by the control unit 104 when a sync condition occurs. If a core 102 sets the sleep bit 212, when a sync condition occurs the control unit 104 will wake up all cores 102. In contrast, if a core 102 sets the sel wake bit 214, when the sync condition occurs the control unit 104 will wake up only the last core 102 that wrote the sync condition to its sync register 108.

If the core 102 sets neither the sleep bit 212 nor the sel wake bit 214, although the control unit 104 will not put the core 102 to sleep and will therefore not wakeup the core 102 when a sync condition occurs, the control unit 104 will nevertheless set the bit in the wakeup events field 242 that indicates a sync condition is active, so the core 102 can detect the sync condition has occurred. Many of the wakeup events that may be specified in the wakeup events field 204 may also be interrupt sources for which the control unit 104 can generate an interrupt to a core 102. However, the microcode of the core 102 may mask the interrupt sources if desirable. If so, when the core 102 wakes up, the microcode may read the status register 106 to determine whether a sync condition occurred or a wakeup event occurred or both.

If the core 102 sets the S bit 222, it requests the control unit 104 to sync on a sync condition. The sync condition is specified in some combination of the C bit 224, sync condition or C-state field 226, and core set field 228. If the C bit 224 is set, the C-state field 226 specifies a C-state value; if the C bit 224 is clear, the sync condition field 226 specifies a non-C-state sync condition. Preferably, the values of the sync condition or C-state field 226 comprise a bounded set of non-negative integers. In one embodiment, the sync condition or C-state field 226 is four bits. When the C bit 224 is clear, a sync condition occurs when all cores 102 in a specified core set 228 have written their respective sync register 108 with the S bit 222 set and with the same value of the sync condition field 226. In one embodiment, the sync condition field 226 values correspond to unique sync conditions, such as for example, various sync conditions specified in the exemplary embodiments described below. When the C bit 224 is set, a sync condition occurs when all cores 102 in a specified core set 228 have written their respective sync register 108 with the S bit 222 set regardless of whether they have written the same value of the C-state field 226. In this case, the control unit 104 posts the lowest written value of the C-state field 226 to the lowest common C-state field 246 of the status register 106, which may be read by a core 102 (e.g., by the master core 102 at block 908 or by the last writing/selectively awakened core 102 at block 1108). In one embodiment, if the core 102 specifies a predetermined value (e.g., all bits set) in the sync condition field 226, this instructs the control unit 104 to match the instant core 102 with any sync condition field 226 value specified by other cores 102.

If the core 102 sets the force sync bit 232, the control unit 104 forces all pending sync requests to be immediately matched.

Normally, if any core 102 is awakened due to a wakeup event specified in the wakeup events field 204, the control unit 104 kills all pending sync requests (by clearing the S bit 222 in the sync register 108). However, if the core 102 sets the selective sync kill bit 234, the control unit 104 will kill the pending sync request for only the core 102 that is awakened due to the (non-sync condition occurrence) wakeup event.

If two or more cores 102 request a sync on different sync conditions, the control unit 104 considers this a deadlock condition. Two or more cores 102 request a sync on different sync conditions if they write their respective sync register 108 with the S bit 222 set, the C bit 224 clear and different values of the sync condition field 226. For example, if one core 102 writes to its sync register 108 with the S bit 222 set and the C bit 224 clear and a sync condition 226 value of 7 and another core 102 writes to its sync register 108 with the S bit 222 set and the C bit 224 clear and a sync condition 226 value of 9, then the control unit 104 considers this a deadlock condition. Additionally, if one core 102 writes to its sync register 108 with the C bit 224 clear and another core 102 writes to its sync register 108 with the C bit 224 set, then the control unit 104 considers this a deadlock condition. In response to a deadlock condition, the control unit 104 kills all pending sync requests and wakes up all sleeping cores 102. The control unit 104 also posts values in the error code field 248 of the status register 106 which the cores 102 may read to determine the cause of the deadlock and take appropriate action. In one embodiment, the error code 248 indicates the sync condition written by each core 102, which enables each core to decide whether to proceed with its intended course of action or to defer to another core 102. For example, if one core 102 writes a sync condition to perform a power management operation (e.g., execute an x86 MWAIT instruction) and another core 102 writes a sync condition to perform a cache management operation (e.g., x86 WBINVD instruction), then the core 102 that intended to perform the MWAIT defers to the core 102 that is performing the WBINVD by cancelling the MWAIT, because the MWAIT is an optional operation, whereas the WBINVD is a mandatory operation. For another example, if one core 102 writes a sync condition to perform a debug operation (e.g., to dump debug state) and another core 102 writes a sync condition to perform a cache management operation (e.g., WBINVD instruction), then the core 102 that intended to perform the WBINVD defers to the core 102 that is performing the debug dump by saving the state of the WBINVD, waiting for the debug dump to occur, and then restoring the state of the WBINVD and performing the WBINVD.

The die number field 258 is zero in a single-die embodiment. In a multi-die embodiment (e.g., FIG. 4), the die number field 258 indicates which die the core 102 reading the configuration register 112 resides on. For example, in a two-die embodiment, the dies are designated 0 and 1 and the die number 258 has a value of either 0 or 1. In one embodiment, fuses 114 are selectively blown to designate a die as 0 or 1, for example.

The local core number field 256 indicates the core number, local to its die, of the core 102 that is currently reading the configuration register 112. Preferably, although there is a single configuration register 112 shared by all the cores 102, the control unit 104 knows which core 102 is reading the configuration register 112 and provides the correct value in the local core number field 256 based on the reader. This enables microcode of the core 102 to know its local core number among the other cores 102 located on the same die. In one embodiment, a multiplexer in the uncore 103 portion of the microprocessor 100 selects the appropriate value that is returned in the local core number field 256 of the configuration word 252 depending upon the core 102 reading the configuration register 112. In one embodiment, selectively blown fuses 114 operate in conjunction with the multiplexer to return the local core number field 256 value. Preferably, the local core number field 256 value is fixed independent of which cores 102 on the die are enabled, as indicated by the enabled bits 254 described below. That is, even if one or more cores 102 on the die are disabled, the local core number field 256 values remain fixed. Additionally, the microcode of a core 102 computes the global core number of the core 102, which is a configuration-related value, whose use is described in more detail below. The global core number indicates the core number of the core 102 global to the microprocessor 100. The core 102 computes its global core number by using the die number field 258 value. For example, in an embodiment in which the microprocessor 100 includes eight cores 102 evenly divided on two dies having die numbers 0 and 1, on each die the local core number field 256 returns a value of either 0, 1, 2 or 3; the cores 102 on die number 1 add 4 to the value returned in the local core number field 256 to compute their global core number.

Figure 4:
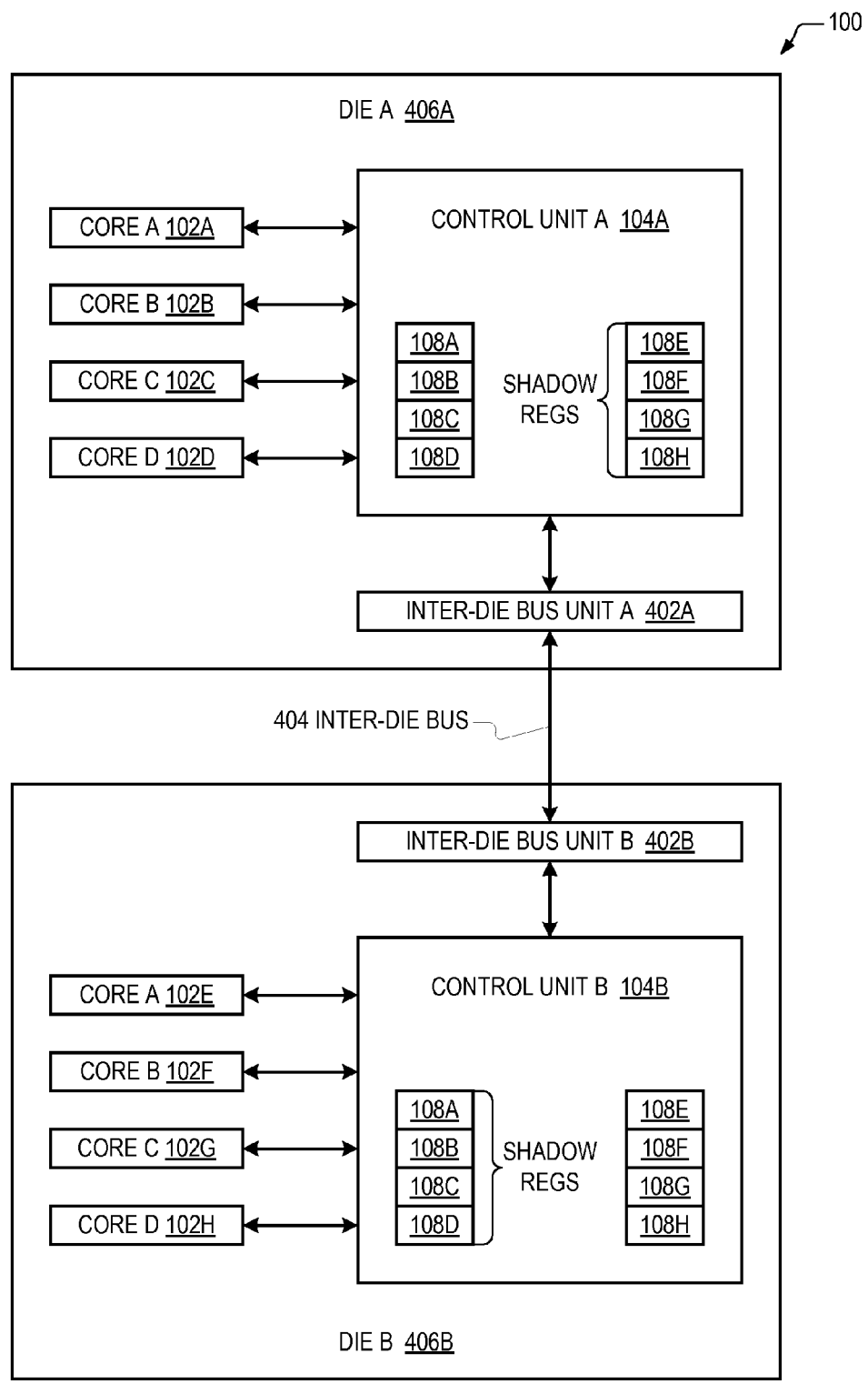
FIG. 4 is a block diagram illustrating an alternate embodiment of a microprocessor.

Each core 102 of the microprocessor 100 has a corresponding enabled bit 254 of the configuration word 252 that indicates whether the core 102 is enabled or disabled. In FIG. 2, the enabled bits 254 are individually denoted enabled bit 254-x, where x is the global core number of the corresponding core 102. The example of FIG. 2 assumes eight cores 102 on the microprocessor 100. In the example of FIGS. 2 and 4, enabled bit 254-0 indicates whether the core 102 having global core number 0 (e.g., core A) is enabled, enabled bit 254-1 indicates whether the core 102 having global core number 1 (e.g., core B) is enabled, enabled bit 254-2 indicates whether the core 102 having global core number 2 (e.g., core C) is enabled, and so forth. Thus, by knowing its global core number, microcode of a core 102 can determine from the configuration word 252 which cores 102 of the microprocessor 100 are disabled and which are enabled. Preferably, an enabled bit 254 is set if the core 102 is enabled and is clear if the core 102 is disabled. When the microprocessor 100 is reset, hardware automatically populates the enabled bits 254. Preferably, the hardware populates the enabled bits 254 based on fuses 114 selectively blown when the microprocessor 100 is manufactured that indicate whether a given core 102 is enabled or disabled. For example, if a given core 102 is tested and found to be faulty, a fuse 114 may be blown to clear the enabled bit 254 of the core 102. In one embodiment, a fuse 114 blown to indicate a core 102 is disabled also prevents clock signals from being provided to the disabled core 102. Each core 102 can write the disable core bit 236 in its sync register 108 to clear its enabled bit 254, as described in more detail below with respect to FIGS. 14 through 16. Preferably, clearing the enabled bit 254 does not prevent the core 102 from executing instructions, but simply updates the configuration register 112, and the core 102 must set a different bit (not shown) to prevent itself from executing instructions, e.g., to have its power removed and/or turn off its clock signals. For a multi-die configuration microprocessor 100 (e.g., FIG. 4), the configuration register 112 includes an enabled bit 254 for all cores 102 of the microprocessor 100, i.e., not just the cores 102 of the local die but also the cores 102 of the remote die. Preferably, in the case of a multi-die configuration microprocessor 100, when a core 102 writes to its sync register 108, the sync register 108 value is propagated to the core's 102 corresponding shadow sync register 108 on the other die (see FIG. 4), which, if the disable core bit 236 is set, causes an update to the remote die configuration register 112 such that both the local and remote die configuration registers 112 have the same value.

Figure 14:
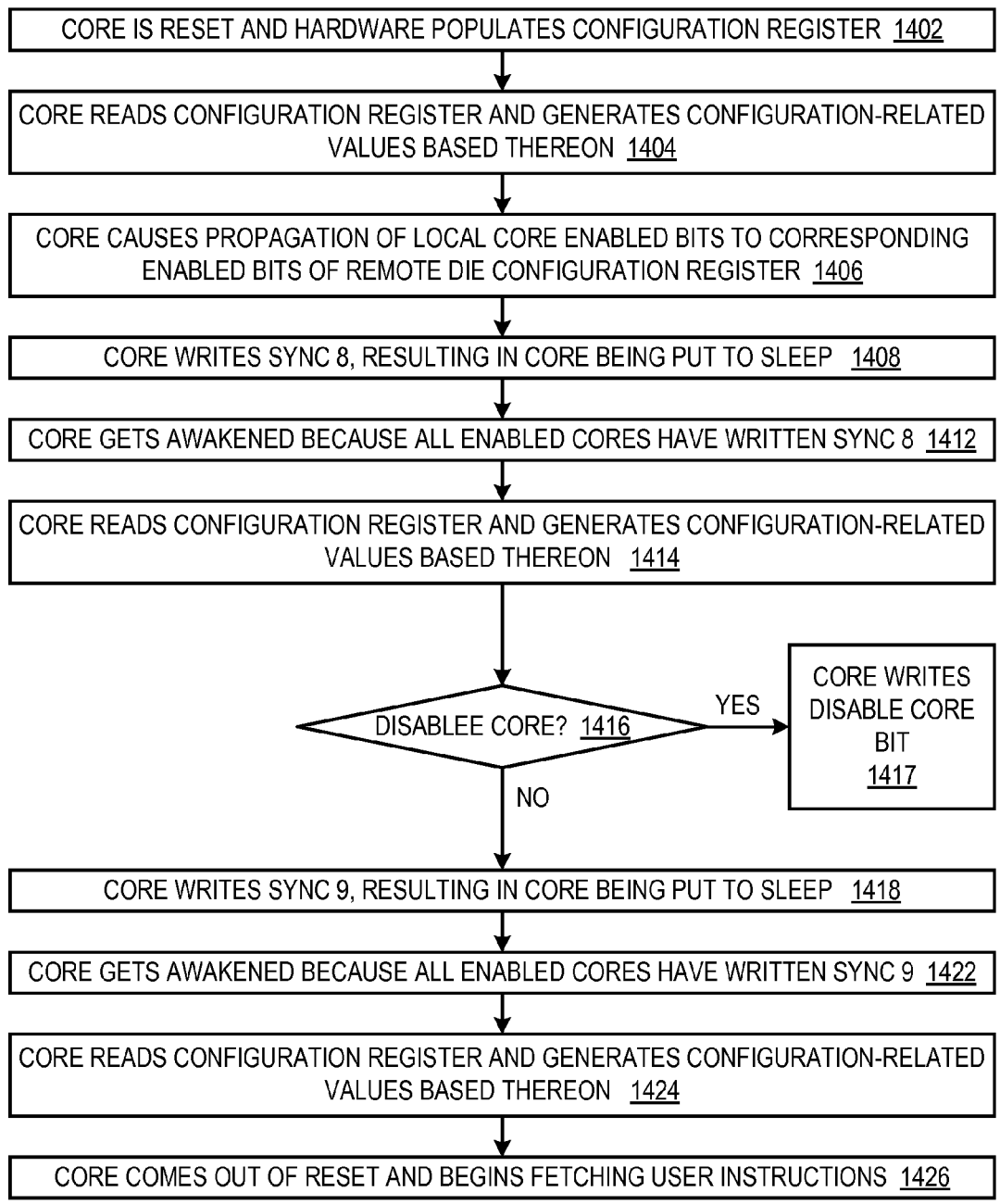
FIG. 14 is a flowchart illustrating dynamic reconfiguration of a microprocessor.

In one embodiment, the configuration register 112 cannot be written directly by a core 102; however, a write by a core 102 to the configuration register 112 causes the local enabled bit 254 values to be propagated to the configuration register 112 of the other die in a multi-die microprocessor 100 configuration, as described with respect to block 1406 of FIG. 14, for example.

Control Unit

Figure 3:
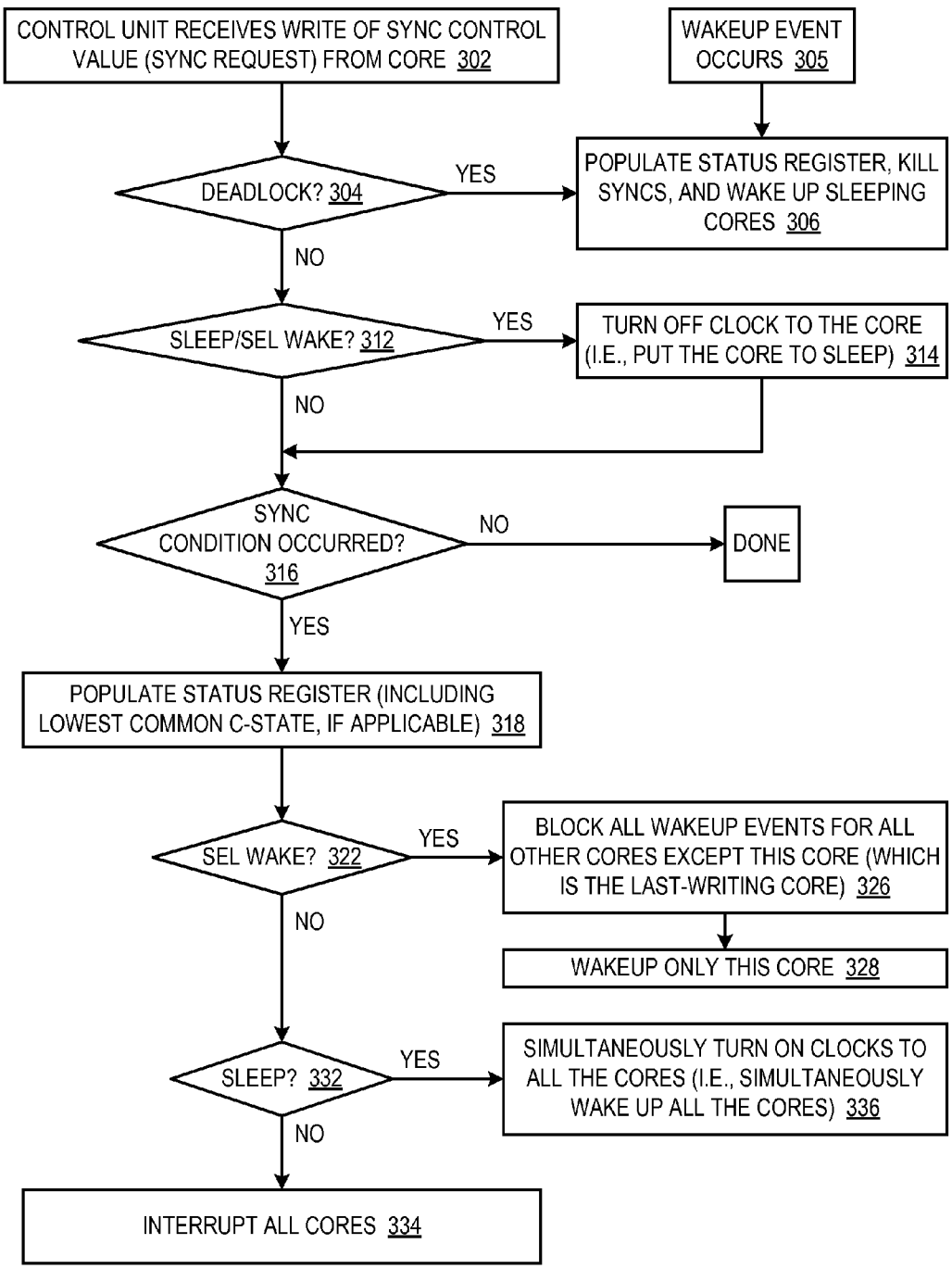
FIG. 3 is a flowchart illustrating operation of a control unit.

Referring now to FIG. 3, a flowchart illustrating operation of the control unit 104 is shown. Flow begins at block 302.

At block 302, a core 102 writes a sync request, i.e., writes to its sync register 108 a control word 202, which is received the control unit 104. In the case of a multi-die configuration microprocessor 100 (e.g., see FIG. 4), when a shadow register 108 of the control unit 104 receives a propagated sync register 108 value from the other die 406, the control unit 104 operates effectively according to FIG. 3, i.e., as if the control unit 104 received a sync request from one of its local cores 102 (at block 302), except the control unit 104 only puts to sleep (e.g., at block 314) or wakes up (at blocks 306 or 328 or 336) or interrupts (at block 334) or blocks wakeup events for (at block 326) cores 102 on its local die 406 and only populates its local status register 106 (at block 318). Flow proceeds to block 304.

At block 304, the control unit 104 examines the sync condition specified at block 302 to determine if a deadlock condition has occurred, as described above with respect to FIG. 2. If so, flow proceeds to block 306; otherwise, flow proceeds to decision block 312.

At block 305, the control unit 104 detects the occurrence of a wakeup event specified in the wakeup events field 204 of one of the sync registers 108 (other than a sync condition occurrence, which is detected at block 316). As described below with respect to block 326, the control unit 104 may automatically block the wakeup events. The control unit 104 may detect the wakeup event occurrence as an event asynchronous to the writing of a sync request at block 302. Flow proceeds also from block 305 to block 306.

At block 306, the control unit 104 populates the status register 106, kills pending sync requests, and wakes up any sleeping cores 102. As described above, waking up a sleeping core 102 may include restoring its power. The cores 102 may then read the status register 106, in particular the error code 248, to determine the cause of the deadlock and handle it based on the relative priorities of the conflicting sync requests, as described above. Additionally, the control unit 104 kills all pending sync requests (i.e., clears the S bit 222 in the sync register 108 of each of the cores 102), unless block 306 was reached from block 305 and the selective sync kill bit 234 was set, in which case the control unit 104 will kill the pending sync request of only the core 102 being awakened by the wakeup event. If block 306 was reached from block 305, the cores 102 may read the wakeup events 244 field to determine the wakeup event that occurred. Additionally, if the wakeup event was an unmasked interrupt source, the control unit 104 will generate an interrupt request via the INTR signal 124 to the core 102. Flow ends at block 306.

At decision block 312, the control unit 104 determines whether the sleep 212 or sel wake bit 214 is set. If so, flow proceeds to block 314; otherwise, flow proceeds to decision block 316.

At block 314, the control unit 104 puts the core 102 to sleep. As described above, putting a core 102 to sleep may include removing its power. In one embodiment, as an optimization, even if the PG bit 208 is set, the control unit 104 does not remove power from the core 102 at block 314 if this is the last writing core 102 (i.e., will cause the sync condition to occur) and the sel wake bit 214 is set since the control unit 104 will be immediately waking the last writing core 102 back up at block 328. In one embodiment, the control unit 104 comprises synchronization logic and sleep logic, which are separate from, but in communication with, one other; furthermore, the sync logic and sleep logic each comprise a portion of the sync register 108. Advantageously, the write to the sync logic portion of the sync register 108 and the write to the sleep logic portion of the sync register 108 are atomic. That is, if one occurs, they are both guaranteed to occur. Preferably, the core 102 pipeline stalls, not allowing any more writes to occur, until it is guaranteed that the writes to both portions of the sync register 108 have occurred. An advantage of writing a sync request and immediately sleeping is that it does not require the core 102 (e.g., microcode) to continuously loop to determine whether the sync condition has occurred. This is advantageous because it saves power and does not consume other resources, such as bus and/or memory bandwidth. It is noted that the core 102 may write to the sync register 108 with the S bit 222 clear and the sleep bit 212 set, referred to herein as a sleep request, in order to sleep but without requesting a sync with other cores 102 (e.g., at blocks 924 and 1124); in this case the control unit 104 wakes up the core 102 (e.g., at block 306) if an unmasked wakeup event specified in the wakeup events field 204 occurs (e.g., at block 305), but does not look for a sync condition occurrence for this core 102 (e.g., at block 316). Flow proceeds to decision block 316.

At decision block 316, the control unit 104 determines whether a sync condition occurred. If so, flow proceeds to block 318. As described above, a sync condition can occur only if the S bit 222 is set. In one embodiment, the control unit 104 uses the enabled bits 254 of FIG. 2 that indicate which cores 102 in the microprocessor 100 are enabled and which cores 102 are disabled. The control unit 104 only looks for the cores 102 that are enabled to determine whether a sync condition has occurred. A core 102 may be disabled because it was tested and found defective at manufacturing time; consequently, a fuse was blown to keep the core 102 from operating and to indicate the core 102 is disabled. A core 102 may be disabled because software requested the core 102 be disabled (e.g., see FIG. 15). For example, at a user request, BIOS writes to a model specific register (MSR) to request the core 102 be disabled, and in response the core 102 disables itself (e.g., via the disable core bit 236) and notifies the other cores 102 to read the configuration register 112 by which the other cores 102 determine the core 102 is disabled. A core 102 may also be disabled via a microcode patch (e.g., see FIG. 14), which may be made by blowing fuses 114 and/or loaded from system memory, such as a FLASH memory. In addition to determining whether a sync condition occurred, the control unit 104 examines the force sync bit 232. If set, flow also proceeds to block 318. If the force sync bit 232 is clear and a sync condition has not occurred, flow ends at block 316.

At block 318, the control unit 104 populates the status register 106. Specifically, if the occurring sync condition was that all cores 102 requested a C-state sync, the control unit 104 populates the lowest common C-state field 246 as described above. Flow proceeds to decision block 322.

At decision block 322, the control unit 104 examines the sel wake bit 214. If the bit is set, flow proceeds to block 326; otherwise, flow proceeds to decision block 332.

At block 326, the control unit 104 blocks all wakeup events for all other cores 102 except the instant core 102, which was last core 102 to write the sync request to its sync register 108 at block 302 and therefore to cause the sync condition to occur. In one embodiment, logic of the control unit 104 simply Boolean ANDs the wakeup conditions with a signal that is false if it is desired to block the wakeup events and otherwise is true. A use for blocking off all the wakeup events for all the other cores is described in more detail below, particularly with respect to FIGS. 11 through 13. Flow proceeds to block 328.

At block 328, the control unit 104 wakes up only the instant core 102, but does not wakeup the other cores that requested the sync. Additionally, the control unit 104 kills the pending sync request for the instant core 102 by clearing its S bit 222, but does not kill the pending sync requests for the other cores 102, i.e., leaves the S bit 222 set for the other cores 102. Consequently and advantageously, if and when the instant core 102 writes another sync request after it is awakened, it will again cause the sync condition to occur (assuming the pending sync requests of the other cores 102 have not been killed), an example of which is described below with respect to FIGS. 12 and 13. Flow ends at block 328.

At decision block 332, the control unit 104 examines the sleep bit 212. If the bit is set, flow proceeds to block 336; otherwise, flow proceeds to block 334.

Figure 21:
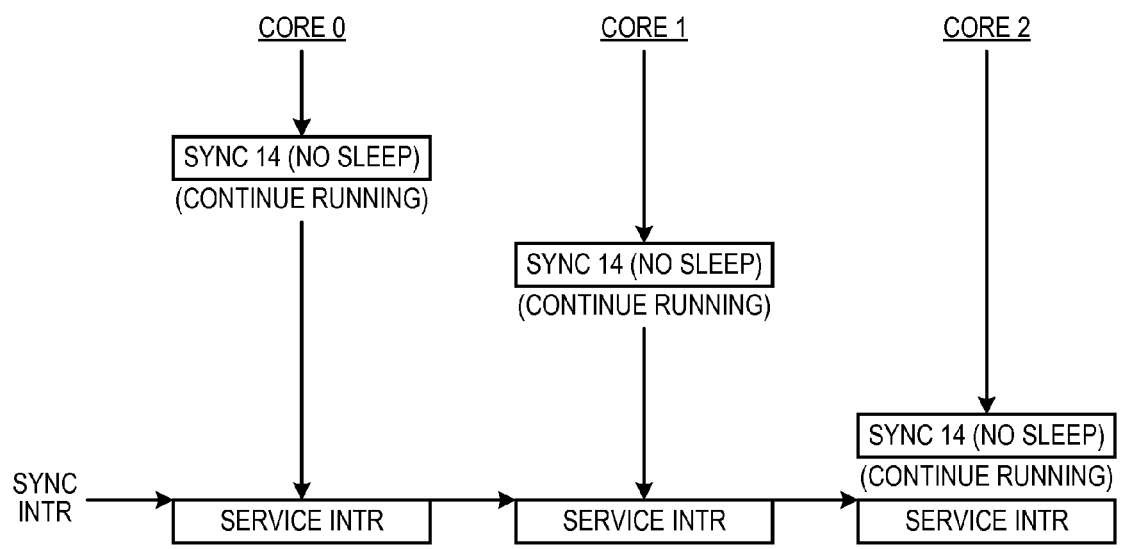
FIG. 21 is a timing diagram illustrating an example of the operation of a microprocessor according to the flowchart of FIG. 3 in which the cores issue non-sleeping sync requests.

At block 334, the control unit 104 sends an interrupt (a sync interrupt) to all the cores 102. The timing diagram of FIG. 21 illustrates an example of a non-sleeping sync request. Each core 102 may read the wakeup events field 244 and detect that a sync condition occurrence was the cause of the interrupt. Flow has proceeded to block 334 in the case where the cores 102 elected not to go to sleep when they wrote their sync requests. Although this case does not enable them to enjoy the same benefit (i.e., simultaneous wakeup) of the case where they sleep, it has the potential advantage of allowing the cores 102 to continue processing instructions while waiting for the last core 102 to write its sync request in situations where simultaneous wakeup is not needed. Flow ends at block 334.

Figure 5:
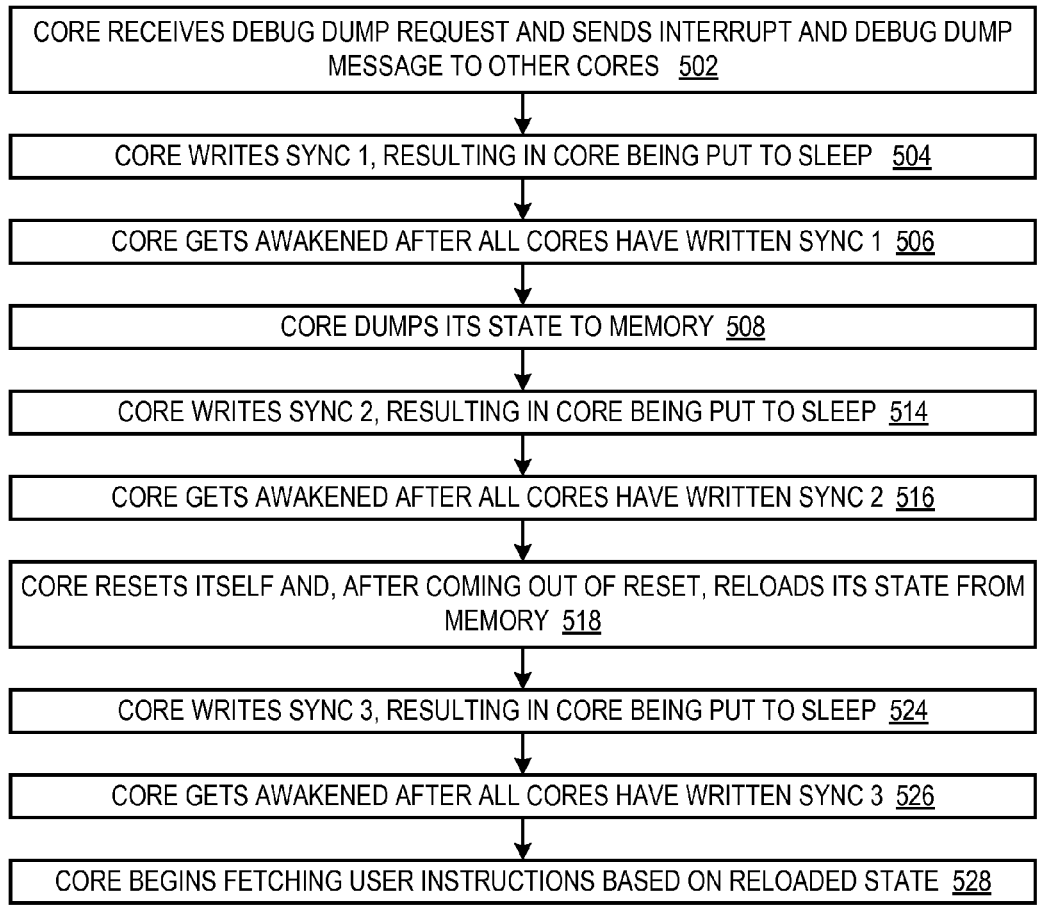
FIG. 5 is a flowchart illustrating operation of a microprocessor to dump debug information.
Figure 6:
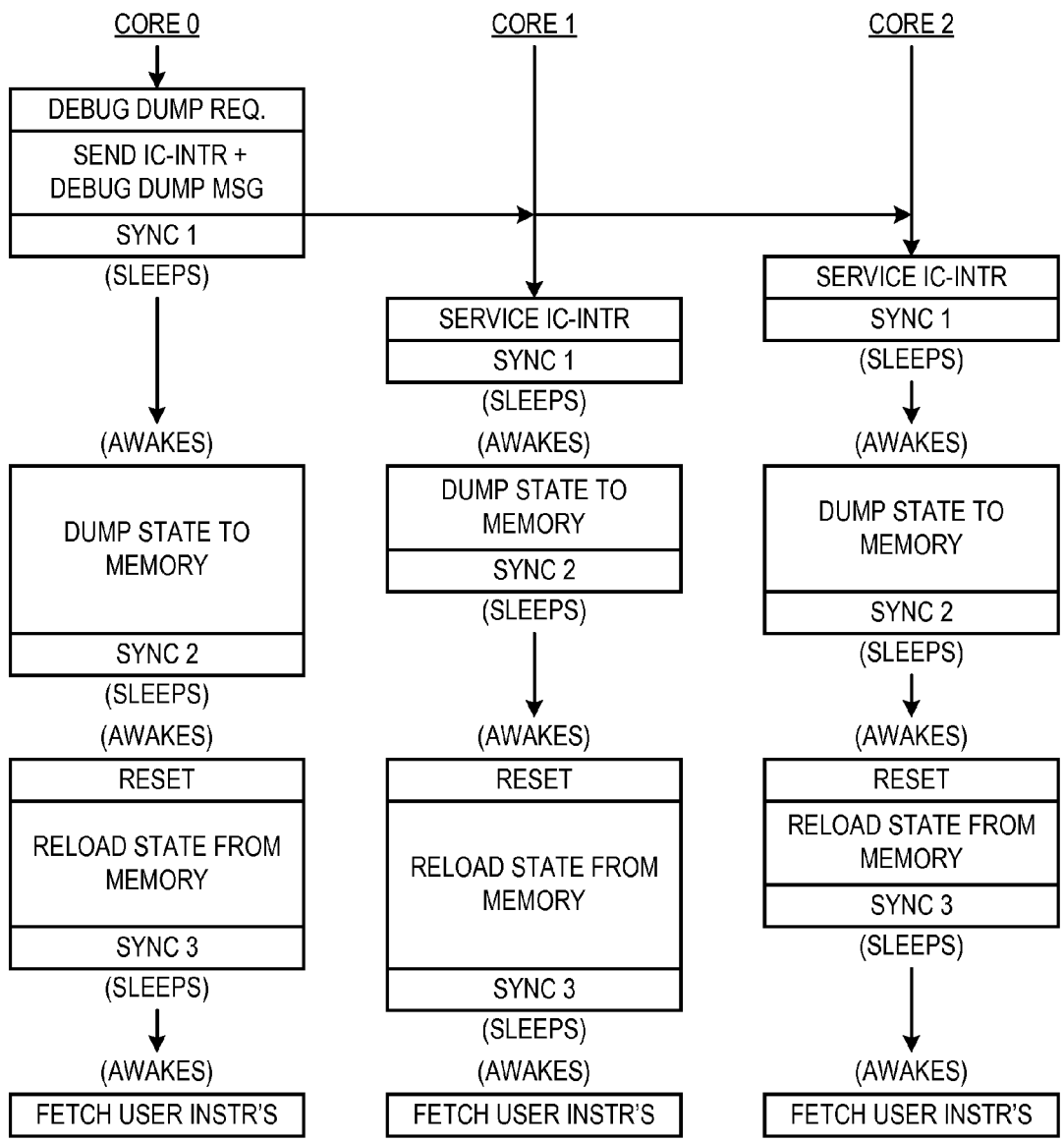
FIG. 6 is a timing diagram illustrating an example of the operation of a microprocessor according to the flowchart of FIG. 5.

At block 336, the control unit 104 simultaneously wakes up all the cores 102. In one embodiment, the control unit 104 turns on the clocks 122 to all the cores 102 on precisely the same clock cycle. In another embodiment, the control unit 104 turns on the clocks 122 to all the cores 102 in a staggered fashion. That is, the control unit 104 introduces a delay of a predetermined number of clock cycles (e.g., on the order of ten or a hundred clocks) in between turning on the clock 122 to each core 102. However, the staggered turning on of the clocks 122 is considered simultaneous in the present disclosure. It may be advantageous to stagger turning on the clocks 122 in order to reduce the likelihood of a power consumption spike when all the cores 102 wake up. In yet another embodiment, in order to reduce the power consumption spike likelihood, the control unit 104 turns on the clock signals 122 to all the cores 102 on the same clock cycle, but does so in a stuttering, or throttled, fashion by initially providing the clock signals 122 at a reduced frequency and ramping up the frequency to the target frequency. In one embodiment, the sync requests are issued as a result of the execution of an instruction of microcode of the core 102, and the microcode is designed such that, for at least some of the sync condition values, the location in the microcode that specifies the sync condition value is unique. For example, only one place in the microcode includes a sync x request, only one place in the microcode includes a sync y request, and so forth. In these cases, the simultaneous wakeup is advantageous because all cores 102 are waking up in the exact same place, which enables the microcode designer to design more efficient and bug-free code. Furthermore, the simultaneous wakeup may be particularly advantageous for debugging purposes when attempting to recreate and fix bugs that only appear due to the interaction of multiple cores but that do not appear when a single core is running FIGS. 5 and 6 depict such an example. Additionally, the control unit 104 kills all pending sync requests (i.e., clears the S bit 222 in the sync register 108 of each of the cores 102). Flow ends at block 336.

An advantage of embodiments described herein is that they may significantly reduce the amount of microcode in a microprocessor because, rather than looping or performing other checks to synchronize operations between multiple cores, the microcode in each core can simply write the sync request, go to sleep, and know that when it wakes up all the cores are in the same place in microcode. Microcode uses of the sync request mechanism will be described below.

Multi-Die Microprocessor

Referring now to FIG. 4, a block diagram illustrating an alternate embodiment of a microprocessor 100 is shown. The microprocessor 100 of FIG. 4 is similar in many respects to the microprocessor 100 of FIG. 1 in that it is a multi-core processor and the cores 102 are similar. However, the embodiment of FIG. 4 is a multi-die configuration. That is, the microprocessor 100 comprises multiple semiconductor dies 406 mounted within a common package and in communication with one another via an inter-die bus 404. The embodiment of FIG. 4 includes two dies 406, denoted die A 406A and die B 406B coupled by the inter-die bus 404. Furthermore, each die 406 comprises an inter-die bus unit 402 that interfaces its respective die 406 to the inter-die bus 404. Still further, each die 406 includes its own uncore 103 control unit 104 coupled to its respective cores 102 and inter-die bus unit 402. In the embodiment of FIG. 4, die A 406A includes four cores 102—core A 102A, core B 102B, core C 102C and core D 102D that are coupled to a control unit A 102A, which is coupled to an inter-die bus unit A 402A; similarly, die B 406B includes four cores 102—core E 102E, core F 102F, core G 102G and core H 102H that are coupled to a control unit B 102B, which is coupled to an inter-die bus unit B 402B. Finally, each of the control units 104 includes not only a sync register 108 for each of the cores 102 on the die 406 that comprises it, but also includes a sync register 108 for each of the cores 102 on the other die 406, which are referred to as shadow registers in FIG. 4. Thus, each of the control units 104 of the embodiment of FIG. 4 includes eight sync register 108, denoted 108A, 108B, 108C, 108D, 108E, 108F, 108G and 108H. In control unit A 104A, sync registers 108E, 108F, 108G and 108H are the shadow registers, whereas in control unit B 104B, sync registers 108A, 108B, 108C and 108D are the shadow registers.

When a core 102 writes a value to its sync register 108, the control unit 104 on the core's 102 die 406 writes the value, via the inter-die bus units 402 and inter-die bus 404, to the corresponding shadow register 108 on the other die 406. Furthermore, if the disable core bit 236 is set in the value propagated to the shadow sync register 108, the control unit 104 also updates the corresponding enabled bit 254 in the configuration register 112. In this manner, a sync condition occurrence—including a trans-die sync condition occurrence—may be detected even in situations in which the microprocessor 100 core configuration is dynamically changing (e.g., FIG. 14 through 16). In one embodiment, the inter-die bus 404 is a relatively low-speed bus, and the propagation may take on the order of 100 core clock cycles that is a predetermined number, and each of the control units 104 comprises a state machine that takes a predetermined number of clocks to detect the sync condition occurrence and turn on the clocks to all the cores 102 of its respective die 406. Preferably, the control unit 104 on the local die 406 (i.e., the die 406 comprising the core 102 that wrote) is configured to delay updating the local sync register 108 until a predetermined number of clocks (e.g., the sum of the number of propagation clocks and the number of state machine sync condition occurrence detection clocks) after initiating the write of the value to the other die 406 (e.g., being granted the inter-die bus 404). In this manner, the control units 104 on both dies simultaneously detect the occurrence of a sync condition and turn on the clocks to all cores 102 on both dies 406 at the same time. This may be particularly advantageous for debugging purposes when attempting to recreate and fix bugs that only appear due to the interaction of multiple cores but that do not appear when a single core is running FIGS. 5 and 6 describe embodiments that may take advantage of this feature.

Debug Operations

The cores 102 of the microprocessor 100 are configured to perform individual debug operations, such as breakpoints on instruction executions and data accesses. Furthermore, the microprocessor 100 is configured to perform debug operations that are trans-core, i.e., that implicate more than one core 102 of the microprocessor 100.

Referring now to FIG. 5, a flowchart illustrating operation of the microprocessor 100 to dump debug information is shown. The operation is described from the perspective of a single core, but each of the cores 102 of the microprocessor 100 operates according to the description to collectively dump the state of the microprocessor 100. More specifically, FIG. 5 describes the operation of one core that receives the request to dump the debug information, whose flow begins at block 502, and the operation of the other cores 102, whose flow begins at block 532.

At block 502, one of the cores 102 receives a request to dump debug information. Preferably, the debug information includes the state of the core 102 or a subset thereof. Preferably, the debug information is dumped to system memory or to an external bus that may be monitored by debug equipment, such as a logic analyzer. In response to the request, the core 102 sends a debug dump message to the other cores 102 and sends them an inter-core interrupt. Preferably, the core 102 traps to microcode in response to the request to dump the debug information (at block 502) or in response to the interrupt (at block 532) and remains in microcode, during which time interrupts are disabled (i.e., the microcode does not allow itself to be interrupted), until block 528. In one embodiment, the core 102 only takes interrupts when it is asleep and on architectural instruction boundaries. In one embodiment, various inter-core messages described herein (such as the message sent at block 502 and other messages, such as at blocks 702, 1502, 2606 and 3206) are sent and received via the sync condition or C-state field 226 of the control word 202 of the sync registers 108. In other embodiments, the inter-core messages are sent and received via the uncore PRAM 116. Flow proceeds from block 502 to block 504.

At block 532, one of the other cores 102 (i.e., a core 102 other than the core 102 that received the debug dump request at block 502) gets interrupted and receives the debug dump message as a result of the inter-core interrupt and message sent at block 502. As described above, although flow at block 532 is described from the perspective of a single core 102, each of the other cores 102 (i.e., not the core 102 at block 502) gets interrupted and receives the message at block 532 and performs the steps at blocks 504 through 528. Flow proceeds from block 532 to block 504.

At block 504, the core 102 writes a sync request to its sync register 108 with a sync condition value of 1 (denoted sync 1 in FIG. 5). As a result, the control unit 104 puts the core 102 to sleep. Flow proceeds to block 506.

At block 506, the core 102 gets awakened by the control unit 104 when all cores 102 have written a sync 1. Flow proceeds to block 508.

At block 508, the core 102 dumps its state to memory. Flow proceeds to block 514.

At block 514, the core 102 writes a sync 2, which results in the control unit 104 putting the core 102 to sleep. Flow proceeds to block 516.

At block 516, the core 102 gets awakened by the control unit 104 when all cores 102 have written a sync 2. Flow proceeds to block 518.

At block 518, the core 102 saves the address of the memory location to which the debug information was dumped at block 508 and sets a flag, both of which persist through a reset, and then resets itself. The core's 102 microcode detects the flag and reloads its state from the saved memory location. Flow proceeds to block 524.

At block 524, the core 102 writes a sync 3, which results in the control unit 104 putting the core 102 to sleep. Flow proceeds to block 526.

At block 526, the core 102 gets awakened by the control unit 104 when all cores 102 have written a sync 3. Flow proceeds to block 528.

At block 528, the core 102 comes out of reset and begins fetching architectural (e.g., x86) instructions based on the state that was reloaded at block 518. Flow ends at block 528.

Referring now to FIG. 6, a timing diagram illustrating an example of the operation of the microprocessor 100 according to the flowchart of FIG. 5 is shown. In the example, a configuration of a microprocessor 100 with three cores 102, denoted core 0, core 1 and core 2, is shown; however, it should be understood that in other embodiments the microprocessor 100 may include different numbers of cores 102. In the timing diagram, the timing of events proceeds downward.

Core 0 receives a debug dump request and in response sends a debug dump message and interrupt to core 1 and core 2 (per block 502). Core 0 then writes a sync 1 and is put to sleep (per block 504).

Each of core 1 and core 2 eventually are interrupted from their current tasks and read the message (per block 532). In response, each of core 1 and core 2 writes a sync 1 and is put to sleep (per block 504). As shown, the time at which each of the cores writes the sync 1 may vary, for example due to the latency of the instruction that is executing when the interrupt is asserted.

When all the cores have written the sync 1, the control unit 104 wakes them all up simultaneously (per block 506). Each core then dumps its state to memory (per block 508) and writes a sync 2 and is put to sleep (per block 514). The amount of time required to dump the state may vary; consequently, the time at which each of the cores writes the sync 2 may vary, as shown.

When all the cores have written the sync 2, the control unit 104 wakes them all up simultaneously (per block 516). Each core then resets itself and reloads its state from memory (per block 518) and writes a sync 3 and is put to sleep (per block 524). As shown, the amount of time required to reset and reload the state may vary; consequently, the time at which each of the cores writes the sync 3 may vary.

When all the cores have written the sync 3, the control unit 104 wakes them all up simultaneously (per block 526). Each core then begins fetching architectural instructions at the point where it was interrupted (per block 528).

A conventional solution to synchronizing operations between multiple processors is to employ software semaphores. However, a disadvantage of the conventional solution is that they do not provide clock-level synchronization. An advantage of the embodiments described herein is that the control unit 104 can turn on the clocks 122 to all of the cores 102 simultaneously.

In the manner described above, an engineer debugging the microprocessor 100 may configure one of the cores 102 to periodically generate checkpoints at which it generates the debug dump requests, for example after a predetermined number of instructions have been retired. While the microprocessor 100 is running, the engineer captures all activity on the external bus of the microprocessor 100 in a log. The portion of the log near the time the bug is suspected to have occurred may then be provided to a software simulator that simulates the microprocessor 100 to aid the engineer in debugging. The simulator simulates the execution of instructions by each core 102 and simulates the transactions on the external microprocessor 100 bus using the log information. In one embodiment, the simulators for all the cores 102 are started simultaneously from a reset point. Therefore, it is highly desirable that all the cores 102 of the microprocessor 100 actually come out of reset (e.g., after the sync 2) at the same time. Furthermore, by waiting to dump its state until all the other cores 102 have stopped their current task (e.g., after the sync 1), the dumping of the state by one core 102 does not interfere with the execution by the other cores 102 of code and/or hardware that is being debugged (e.g., shared memory bus or cache interaction), which may increase the likelihood of being able to reproduce the bug and determine its cause. Similarly, waiting to begin fetching architectural instructions until all the cores 102 have finished reloading their state (e.g., after the sync 3), reloading of the state by one core 102 does not interfere with the execution by the other cores 102 of code and/or hardware that is being debugged, which may increase the likelihood of being able to reproduce the bug and determine its cause. These advantages may provide benefits over prior methods such as described in U.S. Pat. No. 8,370,684, which is hereby incorporated by reference in its entirety for all purposes, which did not enjoy the advantage of cores being able to make sync requests.

Cache Control Operations

The cores 102 of the microprocessor 100 are configured to perform individual cache control operations, such as on local cache memories, i.e., caches that are not shared by two or more cores 102. Furthermore, the microprocessor 100 is configured to perform cache control operations that are trans-core, i.e., that implicate more than one core 102 of the microprocessor 100, e.g., because they implicate a shared cache 119.

Figure 7:
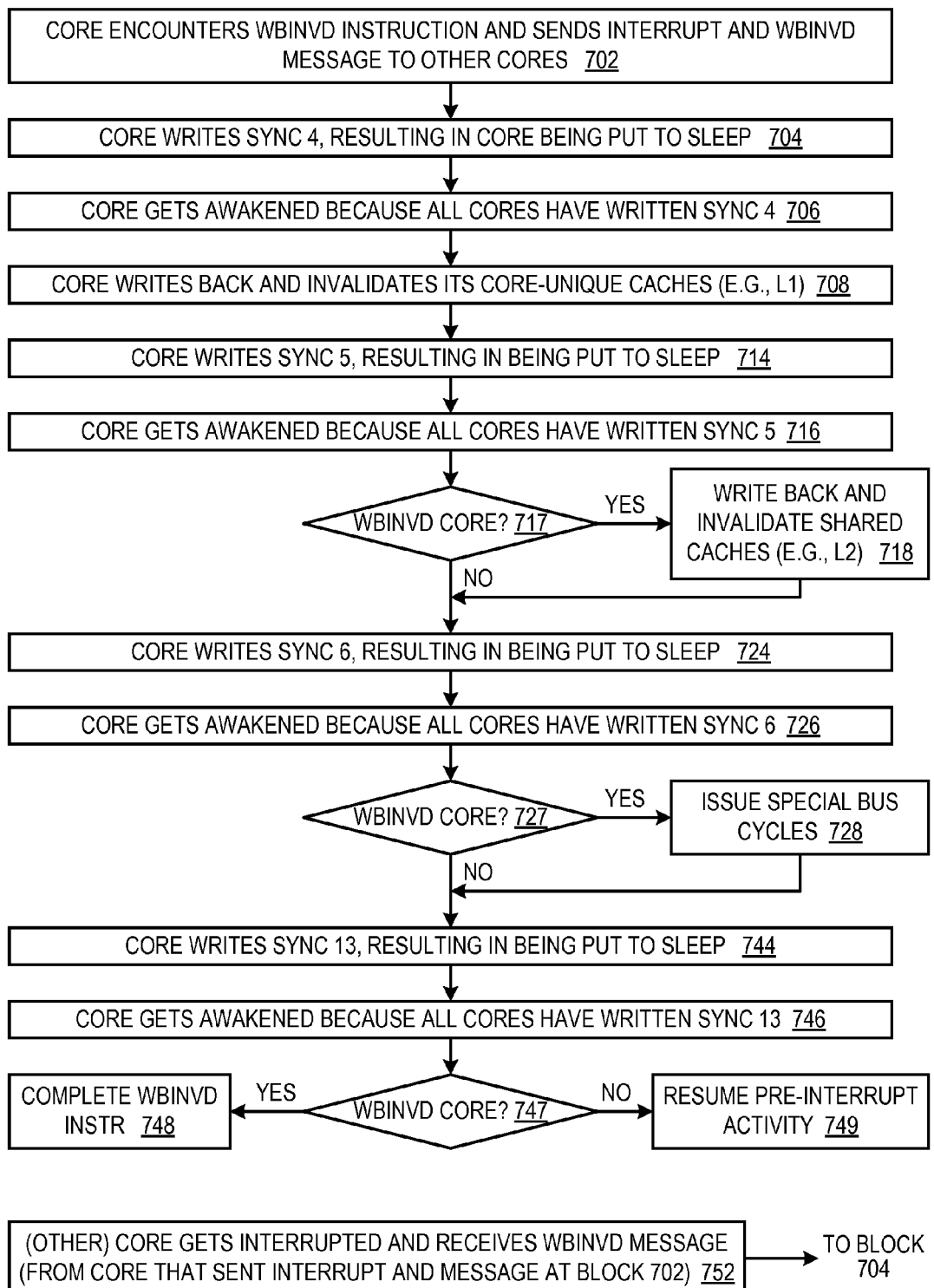
FIG. 7 is a flowchart illustrating operation of a microprocessor to perform a trans-core cache control operation.

Referring now to FIG. 7, a flowchart illustrating operation of the microprocessor 100 to perform a trans-core cache control operation is shown. The embodiment of FIG. 7 describes how the microprocessor 100 performs an x86 architecture write-back-and-invalidate cache (WBINVD) instruction. A WBINVD instruction instructs the core 102 executing the instruction to write back all modified cache lines in the cache memories of the microprocessor 100 to system memory and to invalidate, or flush, the cache memories. The WBINVD instruction also instructs the core 102 to issue special bus cycles to direct any cache memories external to the microprocessor 100 to write back their modified data and invalidate themselves. The operation is described from the perspective of a single core, but each of the cores 102 of the microprocessor 100 operates according to the description to collectively write back modified cache lines and invalidate the cache memories of the microprocessor 100. More specifically, FIG. 7 describes the operation of one core that encounters the WBINVD instruction, whose flow begins at block 702, and the operation of the other cores 102, whose flow begins at block 752.

At block 702, one of the cores 102 encounters a WBINVD instruction. In response, the core 102 sends a WBINVD instruction message to the other cores 102 and sends them an inter-core interrupt. Preferably, the core 102 traps to microcode in response to the WBINVD instruction (at block 702) or in response to the interrupt (at block 752) and remains in microcode, during which time interrupts are disabled (i.e., the microcode does not allow itself to be interrupted), until block 748/749. Flow proceeds from block 702 to block 704.

At block 752, one of the other cores 102 (i.e., a core 102 other than the core 102 that encountered the WBINVD instruction at block 702) gets interrupted and receives the WBINVD instruction message as a result of the inter-core interrupt sent at block 702. As described above, although flow at block 752 is described from the perspective of a single core 102, each of the other cores 102 (i.e., not the core 102 at block 702) gets interrupted and receives the message at block 752 and performs the steps at blocks 704 through 749. Flow proceeds from block 752 to block 704.

At block 704, the core 102 writes a sync request to its sync register 108 with a sync condition value of 4 (denoted sync 4 in FIG. 7). As a result, the control unit 104 puts the core 102 to sleep. Flow proceeds to block 706.

At block 706, the core 102 gets awakened by the control unit 104 when all cores 102 have written a sync 4. Flow proceeds to block 708.

At block 708, the core 102 writes back and invalidates its local cache memories, e.g., level-1 (L1) cache memories that are not shared by the core 102 with other cores 102. Flow proceeds to block 714.

At block 714, the core 102 writes a sync 5, which results in the control unit 104 putting the core 102 to sleep. Flow proceeds to block 716.

At block 716, the core 102 gets awakened by the control unit 104 when all cores 102 have written a sync 5. Flow proceeds to decision block 717.

At decision block 717, the core 102 determines whether it was the core 102 that encountered the WBINVD instruction at block 702 (as opposed to a core 102 that received the WBINVD instruction message at block 752). If so, flow proceeds to block 718; otherwise, flow proceeds to block 724.

At block 718, the core 102 writes back and invalidates the shared cache 119. In one embodiment, the microprocessor 100 comprises slices in which multiple, but not all, cores 102 of the microprocessor 100 share a cache memory, as described above. In such embodiments, intermediate operations (not shown) similar to blocks 717 through 726 are performed in which one of the cores 102 in the slice writes back and invalidates the shared cache memory while the other core(s) of the slice go back to sleep similar to block 724 to wait until the slice cache memory is invalidated. Flow proceeds to block 724.

At block 724, the core 102 writes a sync 6, which results in the control unit 104 putting the core 102 to sleep. Flow proceeds to block 726.

At block 726, the core 102 gets awakened by the control unit 104 when all cores 102 have written a sync 6. Flow proceeds to decision block 727.

At decision block 727, the core 102 determines whether it was the core 102 that encountered the WBINVD instruction at block 702 (as opposed to a core 102 that received the WBINVD instruction message at block 752). If so, flow proceeds to block 728; otherwise, flow proceeds to block 744.

At block 728, the core 102 issues the special bus cycles to cause external caches to be written back and invalidated. Flow proceeds to block 744.

At block 744, the core 102 writes a sync 13, which results in the control unit 104 putting the core 102 to sleep. Flow proceeds to block 746.

At block 746, the core 102 gets awakened by the control unit 104 when all cores 102 have written a sync 13. Flow proceeds to decision block 747.

At decision block 747, the core 102 determines whether it was the core 102 that encountered the WBINVD instruction at block 702 (as opposed to a core 102 that received the WBINVD instruction message at block 752). If so, flow proceeds to block 748; otherwise, flow proceeds to block 749.

Figure 20:
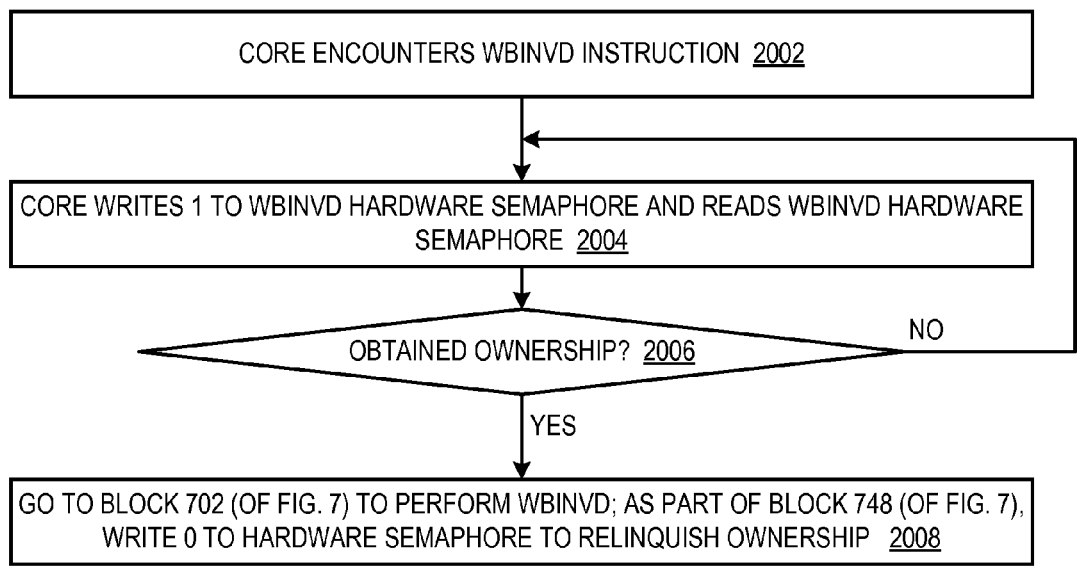
FIG. 20 is a flowchart illustrating operation of a microprocessor to employ a hardware semaphore to perform an action that requires exclusive ownership of a resource.

At block 748, the core 102 completes the WBINVD instruction, which includes retiring the WBINVD instruction and may include relinquishing ownership of a hardware semaphore (see FIG. 20). Flow ends at block 748.

At block 749, the core 102 resumes the task it was performing before it was interrupted at block 752. Flow ends at block 749.

Figure 8:
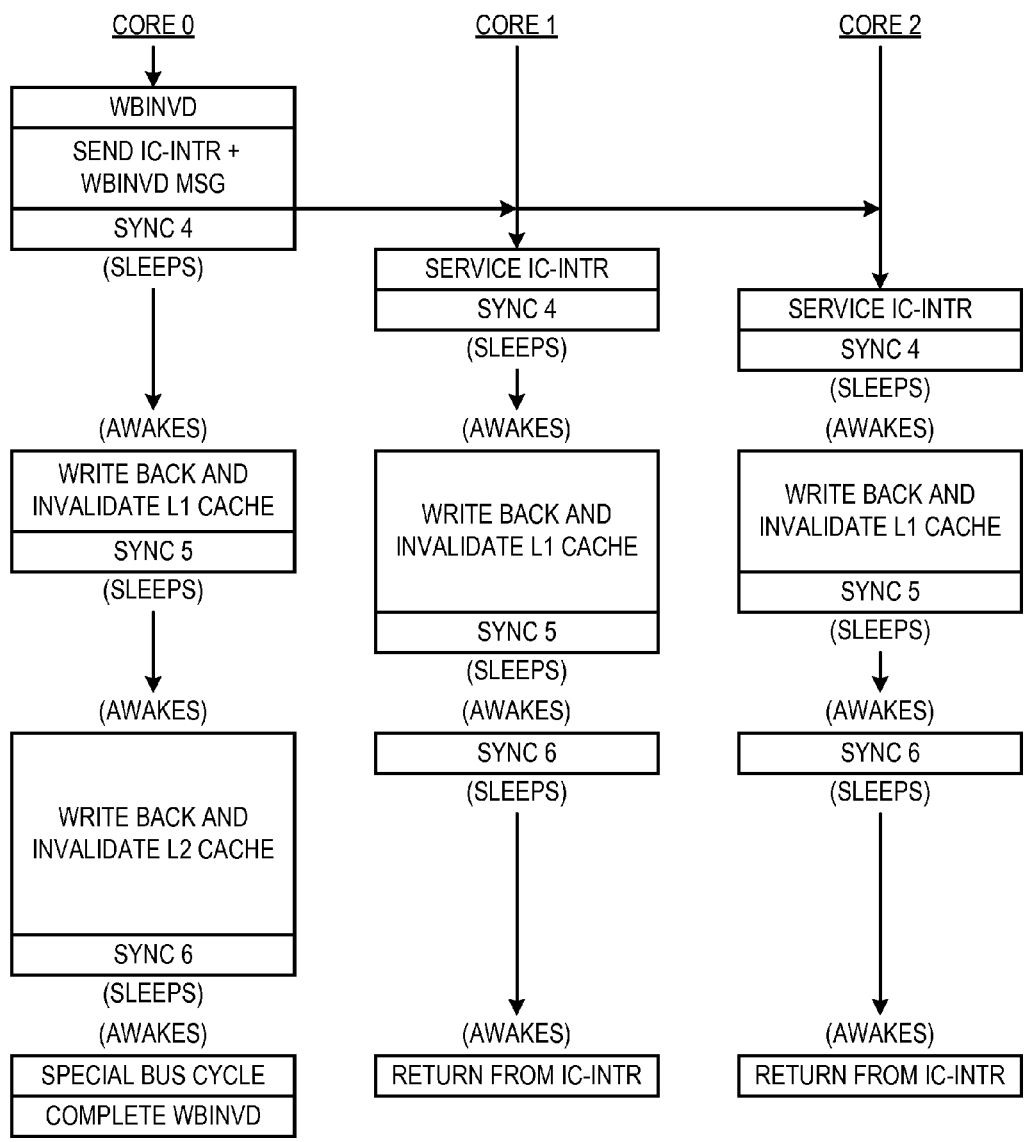
FIG. 8 is a timing diagram illustrating an example of the operation of a microprocessor according to the flowchart of FIG. 7.

Referring now to FIG. 8, a timing diagram illustrating an example of the operation of the microprocessor 100 according to the flowchart of FIG. 7 is shown. In the example, a configuration of a microprocessor 100 with three cores 102, denoted core 0, core 1 and core 2, is shown; however, it should be understood that in other embodiments the microprocessor 100 may include different numbers of cores 102.

Core 0 encounters a WBINVD instruction and in response sends a WBINVD instruction message and interrupt to core 1 and core 2 (per block 702). Core 0 then writes a sync 4 and is put to sleep (per block 704).

Each of core 1 and core 2 eventually are interrupted from their current tasks and read the message (per block 752). In response, each of core 1 and core 2 writes a sync 4 and is put to sleep (per block 704). As shown, the time at which each of the cores writes the sync 4 may vary.

When all the cores have written the sync 4, the control unit 104 wakes them all up simultaneously (per block 706). Each core then writes back and invalidates it unique cache memories (per block 708) and writes a sync 5 and is put to sleep (per block 714). The amount of time required to write back and invalidate the cache may vary; consequently, the time at which each of the cores writes the sync 5 may vary, as shown.

When all the cores have written the sync 5, the control unit 104 wakes them all up simultaneously (per block 716). Only the core that encountered the WBINVD instruction writes back and invalidates the shared cache 119 (per block 718) and all of the cores write a sync 6 and are put to sleep (per block 724). Since only one core writes back and invalidates the shared cache 119, the time at which each of the cores writes the sync 6 may vary, as shown.

When all the cores have written the sync 6, the control unit 104 wakes them all up simultaneously (per block 726). Only the core that encountered the WBINVD instruction completes the WBINVD instruction (per block 748) and all of the other cores resume their pre-interrupt processing (per block 749).

It should be understood that although embodiments have been described in which the cache control instruction is an x86 WBINVD instruction, other embodiments are contemplated in which sync requests are employed to perform other cache control instructions. For example, the microprocessor 100 may perform similar actions to perform an x86 INVD instruction without writing back the cache data (at blocks 708 and 718) and simply invalidating the caches. For another example, the cache control instruction may be from a different instruction set architecture than the x86 architecture.

Power Management Operations

The cores 102 of the microprocessor 100 are configured to perform individual power reduction actions, such as, but not limited to, ceasing to execute instructions, requesting the control unit 104 to stop clock signals to the core 102, requesting the control unit 104 to remove power from the core 102, writing back and invalidating local (i.e., non-shared) cache memories of the core 102 and saving the state of the core 102 to an external memory such as the PRAM 116. When a core 102 has performed one or more core-specific power reduction actions it has entered a "core" C-state (also referred to as a core idle state or core sleep state). In one embodiment, the C-state values may correspond roughly to the well-known Advanced Configuration and Power Interface (ACPI) Specification Processor states, but may include finer granularity. Typically, a core 102 will enter a core C-state in response to a request from the operating system to do so. For example, the x86 architecture monitor wait (MWAIT) instruction is a power management instruction that provides a hint, namely a target C-state, to the core 102 executing the instruction to allow the microprocessor 100 to enter an optimized state, such as a lower power consuming state. In the case of an MWAIT instruction, the target C-states are proprietary rather than being ACPI C-states. Core C-state 0 (C0) corresponds to the running state of the core 102 and increasingly larger values of the C-state correspond to increasingly less active or responsive states (such as the C1, C2, C3, etc. states). A progressively less responsive or active state refers to a configuration or operating state that saves more power, relative to a more active or responsive state, or is somehow relatively less responsive (e.g., has a longer wakeup latency, less fully enabled). Examples of power savings actions that a core 102 may undergo are stopping execution of instructions, stopping clocks to, lowering voltages to, and/or removing power from portions of the core (e.g., functional units and/or local cache) or to the entire core.

Additionally, the microprocessor 100 is configured to perform power reduction actions that are trans-core. The trans-core power reductions actions implicate, or affect, more than one core 102 of the microprocessor 100. For example, the shared cache 119 may be large and consume a relatively large amount of power; thus, significant power savings may be achieved by removing the clock signal and/or power to the shared cache 119. However, in order to remove the clock or power to the shared cache 119, all of the cores 102 sharing the cache must agree so that data coherency is maintained. Embodiments are contemplated in which the microprocessor 100 includes other shared power-related resources, such as shared clock and power sources.

In one embodiment, the microprocessor 100 is coupled to a chipset of the system that includes a memory controller, peripheral controllers and/or power management controller. In other embodiments, one or more of the controllers are integrated within the microprocessor 100. System power savings may be achieved by the microprocessor 100 informing the controllers that it took an action that enables the controllers to take power saving actions. For example, the microprocessor 100 may inform the controllers that it invalidated and turned off the caches of the microprocessor such that they need not be snooped.

In addition to the notion of a core C-state, there is the notion of a "package" C-state (also referred to as a packet idle state or package sleep state) for the microprocessor 100 as a whole. The package C-state corresponds to the lowest (i.e., highest-power-consuming) common core C-state of the cores 102 (see, for example, field 246 of FIG. 2 and block 318 of FIG. 3). However, the package C-state involves the microprocessor 100 performing one or more trans-core power reduction actions in addition to the core-specific power reduction actions. An example of trans-core power savings actions that may be associated with package C-states include turning off a phase-locked-loop (PLL) that generates clock signals and flushing the shared cache 119 and stopping its clocks and/or power, which enables the memory/peripheral controller to refrain from snooping the local and shared microprocessor 100 caches. Other examples are changing voltage, frequency and/or bus clock ratio; reducing the size of cache memories, such as the shared cache 119; and running the shared cache 119 at half speed.

In many cases, the operating system is effectively relegated to executing instructions on individual cores 102 and can therefore put individual cores to sleep (e.g., into core C-states), but does not have a means to directly put the microprocessor 100 package to sleep (e.g., into package C-states). Advantageously, embodiments are described in which the cores 102 of the microprocessor 100 work cooperatively, with the help of the control unit 104, to detect when all cores 102 have entered a core C-state and are ready to allow trans-core power savings actions to occur.

Figure 9:
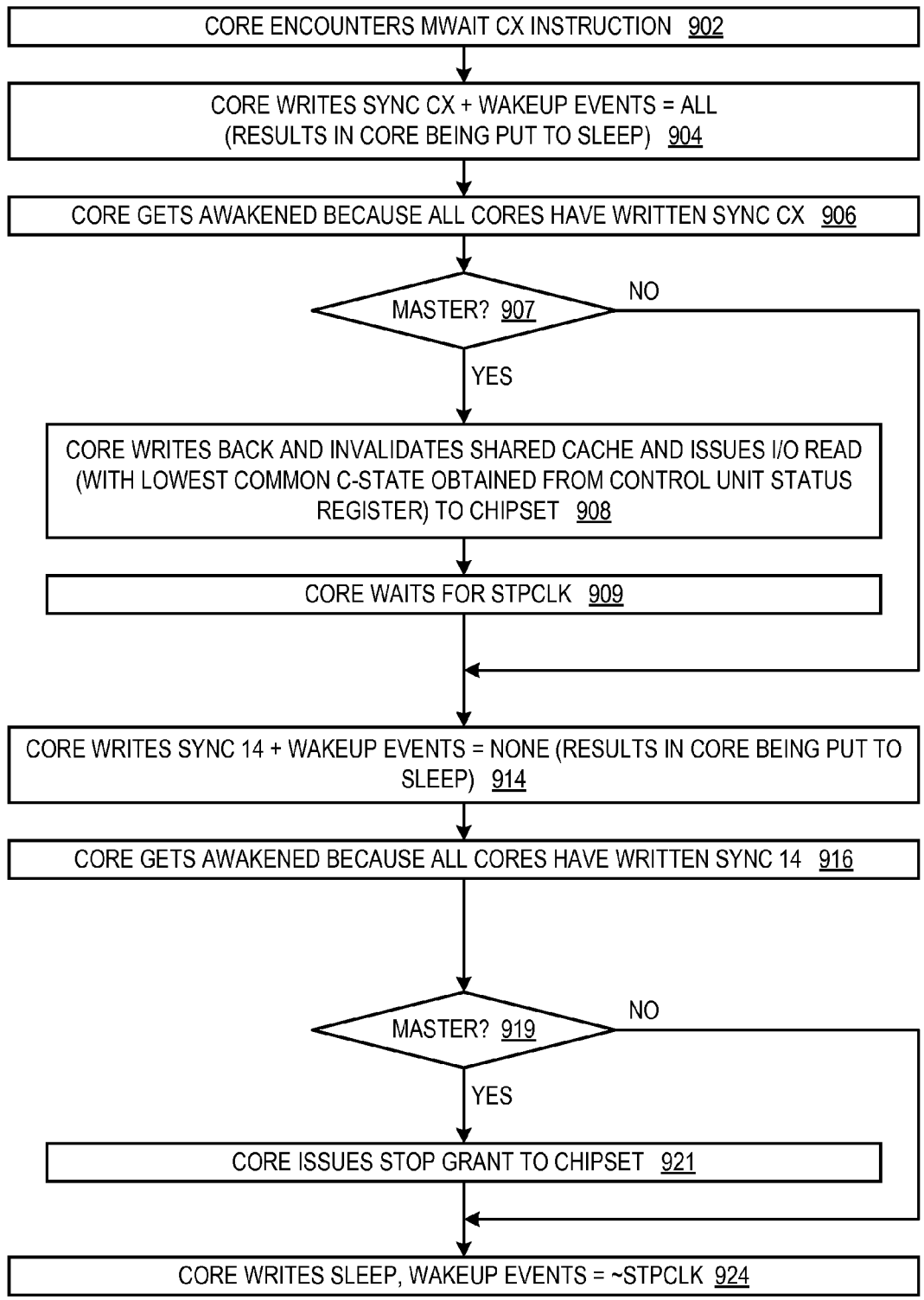
FIG. 9 is a flowchart illustrating operation of a microprocessor to enter a low power package C-state.

Referring now to FIG. 9, a flowchart illustrating operation of the microprocessor 100 to enter a low power package C-state is shown. The embodiment of FIG. 9 is described using the example of the execution of MWAIT instructions in which the microprocessor 100 is coupled to a chipset. However, it should be understood that in other embodiments the operating system employs other power management instructions and the master core 102 communicates with controllers that are integrated within the microprocessor 100 and that employ a different handshake protocol than described. The operation is described from the perspective of a single core, but each of the cores 102 of the microprocessor 100 may encounter an MWAIT instruction and operate according to the description to collectively cause the microprocessor 100 to enter the optimized state. Flow begins at block 902.

At block 902, a core 102 encounters an MWAIT instruction that specifies a target C-state, denoted Cx in FIG. 9, where x is a non-negative integer value. Flow proceeds to block 904.

At block 904, the core 102 writes a sync request to its sync register 108 with the C bit 224 set and a C-state field 226 value of x (denoted sync Cx in FIG. 9). Additionally, the sync request specifies in its wakeup events field 204 that the core 102 is to be awakened on all wakeup events. As a result, the control unit 104 puts the core 102 to sleep. Preferably, the core 102 writes back and invalidates its local caches before it writes the sync Cx. Flow proceeds to block 906.

At block 906, the core 102 gets awakened by the control unit 104 when all cores 102 have written a sync Cx. As described above, the x value written by the other cores 102 may be different, and the control unit 104 posts the lowest common C-state value to the lowest common C-state field 246 of the status word 242 of the status register 106 (per block 318). Prior to block 906, while the core 102 is asleep, it may be awakened by a wakeup event, such as an interrupt (e.g., at blocks 305 and 306). More specifically, there is no guarantee that the operating system will execute an MWAIT for all of the cores 102, which would allow the microprocessor 100 to perform power savings actions associated with a package C-state, before a wakeup event occurs (e.g., interrupt) directed to one of the cores 102 that effectively cancels the MWAIT instruction. However, once the core 102 is awakened at block 906, the core 102 is (indeed, all the cores 102 are) still executing microcode as a result of the MWAIT instruction (at block 902) and remains in microcode, during which time interrupts are disabled (i.e., the microcode does not allow itself to be interrupted), until block 924. In other words, while less than all of the cores 102 have received an MWAIT instruction to go to sleep, individual cores 102 may sleep, but the microprocessor 100 as a package does not indicate to the chipset that it is ready to enter a package sleep state; however, once all the cores 102 have agreed to enter a package sleep state, which is effectively indicated by the sync condition occurrence at block 906, the master core 102 is allowed to complete a package sleep state handshake protocol with the chipset (e.g., blocks 908, 909 and 921 below) without being interrupted and without any of the other cores 102 being interrupted. Flow proceeds to decision block 907.

At decision block 907, the core 102 determines whether it is the master core 102 of the microprocessor 100. Preferably, a core 102 is the master core 102 if it determines it is the BSP at reset time. If the core 102 is the master, flow proceeds to block 908; otherwise, flow proceeds to block 914.

At block 908, the master core 102 writes back and invalidates the shared cache 119 and then communicates to the chipset that it may take appropriate actions that may reduce power consumption. For example, the memory controller and/or peripheral controller may refrain from snooping the local and shared caches of the microprocessor 100 since they all remain invalid while the microprocessor 100 is in the package C-state. For another example, the chipset may signal to the microprocessor 100 to cause the microprocessor 100 to take power savings actions (e.g., assert x86-style STPCLK, SLP, DPSLP, NAP, VRDSLP signals as described below). Preferably, the core 102 communicates power management information based on the lowest common C-state field 246 value. In one embodiment, the core 102 issues an I/O Read bus cycle to an I/O address that provides the chipset the relevant power management information, e.g., the package C-state state value. Flow proceeds to block 909.

At block 909, the master core 102 waits for the chipset to assert the STPCLK signal. Preferably, if the STPCLK signal is not asserted after a predetermined number of clock cycles, the control unit 104 detects this condition and wakes up all the cores 102 after killing their pending sync requests and indicates the error in the error code field 248. Flow proceeds to block 914.

At block 914, the core 102 writes a sync 14. In one embodiment, the sync request specifies in its wakeup events field 204 that the core 102 is to not be awakened on any wakeup event. As a result, the control unit 104 puts the core 102 to sleep. Flow proceeds to block 916.

At block 916, the core 102 gets awakened by the control unit 104 when all cores 102 have written a sync 14. Flow proceeds to decision block 919.

At decision block 919, the core 102 determines whether it is the master core 102 of the microprocessor 100. If so, flow proceeds to block 921; otherwise, flow proceeds to block 924.

At block 921, the master core 102 issues a stop grant cycle to the chipset on the microprocessor 100 bus to notify the chipset that it may take trans-core, i.e., package-wide, power savings actions regarding the microprocessor 100 package as a whole, e.g., refrain from snooping the caches of the microprocessor 100, remove the bus clock (e.g., x86-style BCLK) to the microprocessor 100, and assert other signals (e.g., x86-style SLP, DPSLP, NAP, VRDSLP) on the bus to cause the microprocessor 100 to remove clocks and/or power to various portions of the microprocessor 100. Although embodiments are described herein that involve a handshake protocol between the microprocessor 100 and a chipset involving the I/O read (at block 908), the assertion of STPCLK (at block 909) and the issuing of the stop grant cycle (at block 921) which are historically associated with x86 architecture-based systems, it should be understood that other embodiments are contemplated that involve systems with other instruction set architecture-based systems with different protocols but in which it is also desirable to save power, increase performance and/or reduce complexity. Flow proceeds to block 924.

At block 924, the core 102 writes a sleep request to the sync register 108, i.e., with the sleep bit 212 set and the S bit 222 clear. Additionally, the sync request specifies in its wakeup events field 204 that the core 102 is to be awakened only on the wakeup event of the de-assertion of STPCLK. As a result, the control unit 104 puts the core 102 to sleep. Flow ends at block 924.

Figure 10:
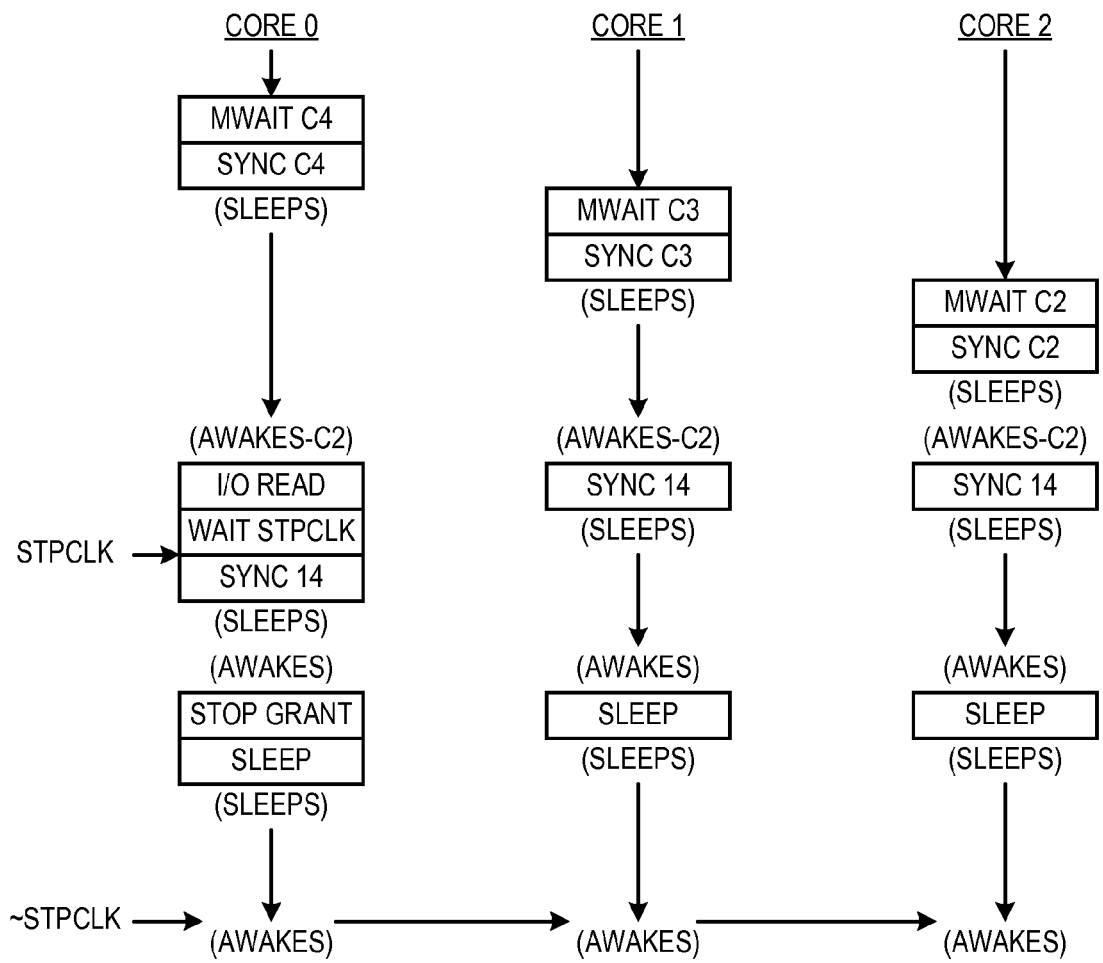
FIG. 10 is a timing diagram illustrating an example of the operation of a microprocessor according to the flowchart of FIG. 9.

Referring now to FIG. 10, a timing diagram illustrating an example of the operation of the microprocessor 100 according to the flowchart of FIG. 9 is shown. In the example, a configuration of a microprocessor 100 with three cores 102, denoted core 0, core 1 and core 2, is shown; however, it should be understood that in other embodiments the microprocessor 100 may include different numbers of cores 102.

Core 0 encounters an MWAIT instruction specifying C-state 4 (per block 902). Core 0 then writes a sync C4 and is put to sleep (per block 904). Core 1 encounters an MWAIT instruction specifying C-state 3 (per block 902). Core 1 then writes a sync C3 and is put to sleep (per block 904). Core 2 encounters an MWAIT instruction specifying C-state 2 (per block 902). Core 2 then writes a sync C2 and is put to sleep (per block 904). As shown, the time at which each of the cores writes the sync Cx may vary. Indeed, it is possible that one or more of the cores may not encounter an MWAIT instruction before some other event occurs, such as an interrupt.

When all the cores have written the sync Cx, the control unit 104 wakes them all up simultaneously (per block 906). The master core then issues the I/O Read bus cycle (per block 908) and waits for the assertion of STPCLK (per block 909). All of the cores write a sync 14 and are put to sleep (per block 914). Since only the master core flushes the shared cache 119, issues the I/O Read bus cycle and waits for the assertion of STPCLK, the time at which each of the cores writes the sync 14 may vary, as shown. Indeed, the master core may write the sync 14 on the order of hundreds of microseconds after the other cores.

When all the cores have written the sync 14, the control unit 104 wakes them all up simultaneously (per block 916). Only the master core issues the stop grant cycle (per block 921). All of the cores write a sleep request waiting on the de-assertion of STPCLK and are put to sleep (per block 924). Since only the master core issues the stop grant cycle, the time at which each of the cores writes the sleep request may vary, as shown.

When STPCLK is de-asserted, the control unit 104 wakes up all the cores.

Figure 11:
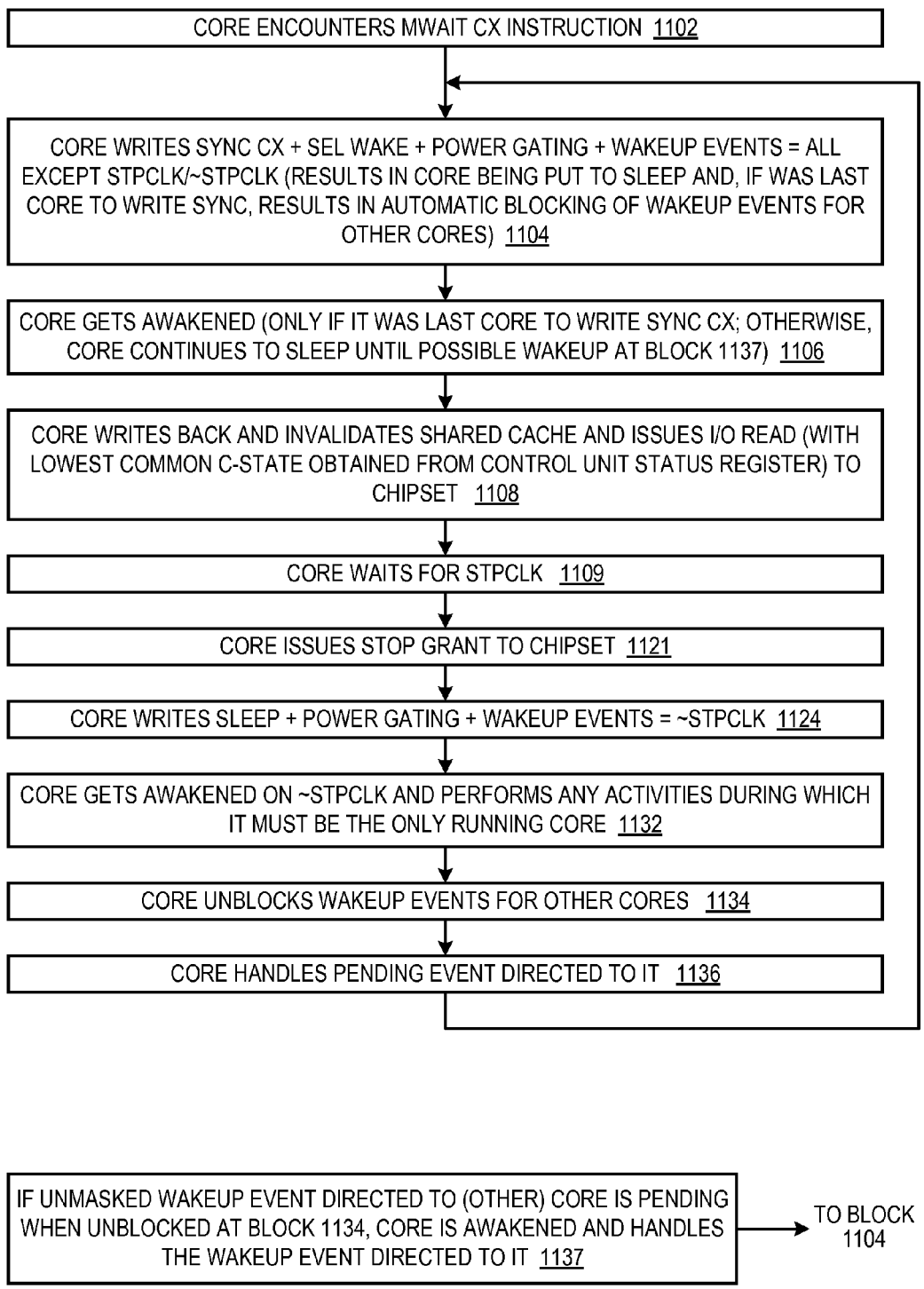
FIG. 11 is a flowchart illustrating operation of a microprocessor to enter a low power package C-state according to an alternate embodiment.

As may be observed from FIG. 10, advantageously core 1 and core 2 are able to sleep for a significant portion of the time while core 0 performs the handshake protocol. However, it is noted that the amount of time required to wake up the microprocessor 100 from the package sleep state is generally proportional to how deep the sleep is (i.e., how great the power savings while in the sleep state). Consequently, in cases where the package sleep state is relatively deep (or even where an individual core 102 sleep state is relatively deep), it may be desirable to even further reduce the wakeup occurrences and/or time required to wakeup associated with the handshake protocol. FIG. 11 describes an embodiment in which a single core 102 handles the handshake protocol while the other cores 102 continue to sleep. Furthermore, according to the embodiment of FIG. 11, further power savings may be obtained by reducing the number of cores 102 that are awakened in response to a wakeup event.

Referring now to FIG. 11, a flowchart illustrating operation of the microprocessor 100 to enter a low power package C-state according to an alternate embodiment is shown. The embodiment of FIG. 11 is described using the example of the execution of MWAIT instructions in which the microprocessor 100 is coupled to a chipset. However, it should be understood that in other embodiments the operating system employs other power management instructions and the last-syncing core 102 communicates with controllers that are integrated within the microprocessor 100 and that employ a different handshake protocol than described. The embodiment of FIG. 11 is similar in some respects to the embodiment of FIG. 9. However, the embodiment of FIG. 11 is designed to facilitate potentially greater power savings in the presence of an environment in which the operating system requests the microprocessor 100 to enter very low power states and tolerates the latencies associated with them. More specifically, the embodiment of FIG. 11 facilitates gating power to the cores and waking up only one of the cores when necessary, such as to handle interrupts, for example. Embodiments are contemplated in which the microprocessor 100 supports operation in both the mode of FIG. 9 and the mode of FIG. 11. Furthermore, the mode may be configurable, either in manufacturing (e.g., by fuses 114) and/or via software control or automatically decided by the microprocessor 100 depending on the particular C-state specified by the MWAIT instructions. Flow begins at block 1102.

At block 1102, a core 102 encounters an MWAIT instruction that specifies a target C-state, denoted Cx in FIG. 11. Flow proceeds to block 1104.

At block 1104, the core 102 writes a sync request to its sync register 108 with the C bit 224 set and a C-state field 226 value of x (denoted sync Cx in FIG. 11). The sync request also sets the sel wake bit 214 and the PG bit 208. Additionally, the sync request specifies in its wakeup events field 204 that the core 102 is to be awakened on all wakeup events except assertion of STPCLK and deassertion of STPCLK (~STPCLK). (Preferably, there are other wakeup events, such as AP startup, for which the sync request specifies the core 102 is not to be awakened.) As a result, the control unit 104 puts the core 102 to sleep, which includes refraining from providing power to the core 102 because the PG bit 208 was set. Additionally, the core 102 writes back and invalidates its local cache memories and saves (preferably to the PRAM 116) its core 102 state before writing the sync request. The core 102 will restore its state (e.g., from the PRAM 116) when it is subsequently awakened (e.g., at block 1137, 1132 or 1106). As described above, particularly with respect to FIG. 3, when the last core 102 writes its sync request with the sel wake bit 214 set, the control unit 104 automatically blocks off all wakeup events for all cores 102 other than the last writing core 102 (per block 326). Flow proceeds to block 1106.

At block 1106, the control unit 104 awakens the last writing core 102 when all cores 102 have written a sync Cx. As described above, the control unit 104 keeps the S bit 222 set for the other cores 102 even though it wakes up the last writing core 102 and clears its S bit 222. Prior to block 1106, while the core 102 is asleep, it may be awakened by a wakeup event, such as an interrupt. However, once the core 102 is awakened at block 1106, the core 102 is still executing microcode as a result of the MWAIT instruction (at block 1102) and remains in microcode, during which time interrupts are disabled (i.e., the microcode does not allow itself to be interrupted), until block 1124. In other words, while less than all of the cores 102 have received an MWAIT instruction to go to sleep, only individual cores 102 will sleep, but the microprocessor 100 as a package does not indicate to the chipset that it is ready to enter a package sleep state; however, once all the cores 102 have agreed to enter a package sleep state, which is indicated by the sync condition occurrence at block 1106, the core 102 awakened at block 906 (the last writing core 102, which caused the sync condition occurrence) is allowed to complete the package sleep state handshake protocol with the chipset (e.g., blocks 1108, 1109 and 1121 below) without being interrupted and without any of the other cores 102 being interrupted. Flow proceeds to block 1108.

At block 1108, the core 102 writes back and invalidates the shared cache 119 and then communicates to the chipset that it may take appropriate actions that may reduce power consumption. Flow proceeds to block 1109.

At block 1109, the core 102 waits for the chipset to assert the STPCLK signal. Preferably, if the STPCLK signal is not asserted after a predetermined number of clock cycles, the control unit 104 detects this condition and wakes up all the cores 102 after killing their pending sync requests and indicates the error in the error code field 248. Flow proceeds to block 1121.

At block 1121, the core 102 issues a stop grant cycle to the chipset on the bus. Flow proceeds to block 1124.

At block 1124, the core 102 writes a sleep request to the sync register 108, i.e., with the sleep bit 212 set and the S bit 222 clear, and with the PG bit 208 set. Additionally, the sync request specifies in its wakeup events field 204 that the core 102 is to be awakened only on the wakeup event of the de-assertion of STPCLK. As a result, the control unit 104 puts the core 102 to sleep. Flow proceeds to block 1132.

At block 1132, the control unit 104 detects the de-assertion of STPCLK and wakes up the core 102. It is noted that prior to the control unit 104 waking up the core 102, the control unit 104 also un-gates power to the core 102. Advantageously, at this point the core 102 is the only running core 102, which provides an opportunity for the core 102 to perform any actions that must be performed while no other cores 102 are running Flow proceeds to block 1134.

At block 1134, the core 102 writes to a register (not shown) in the control unit 104 to unblock the wakeup events for each of the other cores 102 specified in the wakeup events field 204 of their respective sync register 108. Flow proceeds to block 1136.

At block 1136, the core 102 handles any pending wakeup events directed to it. For example, in one embodiment the system comprising the microprocessor 100 permits both directed interrupts (i.e., interrupts directed to a specific core 102 of the microprocessor 100) and non-directed interrupts (i.e., interrupts that may be handled by any core 102 of the microprocessor 100 as the microprocessor 100 selects). An example of a non-directed interrupt is what is commonly referred to as a "low priority interrupt." In one embodiment, the microprocessor 100 advantageously directs non-directed interrupts to the single core 102 that is awakened at the de-assertion of STPCLK at block 1132 since it is already awake and can handle the interrupt in hopes that the other cores 102 do not have any pending wakeup events and can therefore continue to sleep and be power-gated. Flow returns to block 1104.

If no specified wakeup events are pending for a core 102 other than the core 102 that was awakened at block 1132 when the wakeup events are unblocked at block 1134, then advantageously the core 102 will continue to sleep and be power-gated per block 1104. However, if a specified wakeup event is pending for the core 102 when wakeup events are unblocked at block 1134, then the core 102 will be un-power-gated and awakened by the control unit 104. In this case, a different flow begins at block 1137 of FIG. 11.

At block 1137, another core 102 (i.e., a core 102 other than the core 102 that unblocks the wakeup events at block 1134) is awakened after the wakeup events are unblocked at block 1134. The other core 102 handles any pending wakeup events directed to it, e.g., handles an interrupt. Flow proceeds from block 1137 to block 1104.

Figure 12:
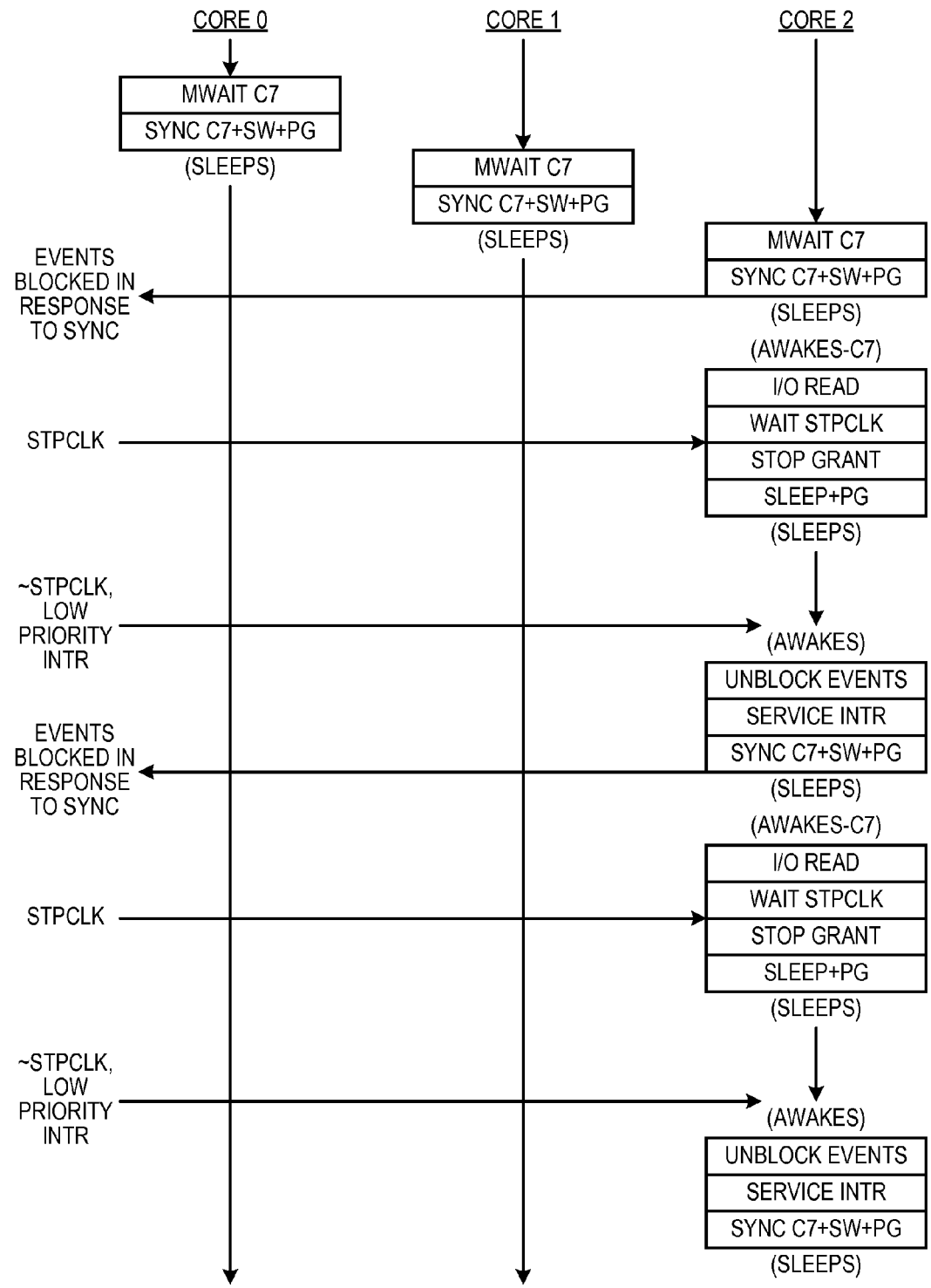
FIG. 12 is a timing diagram illustrating an example of the operation of a microprocessor according to the flowchart of FIG. 11.

Referring now to FIG. 12, a timing diagram illustrating an example of the operation of the microprocessor 100 according to the flowchart of FIG. 11 is shown. In the example, a configuration of a microprocessor 100 with three cores 102, denoted core 0, core 1 and core 2, is shown; however, it should be understood that in other embodiments the microprocessor 100 may include different numbers of cores 102.

Core 0 encounters an MWAIT instruction specifying C-state 7 (per block 1102). In the example, C-state 7 permits power-gating. Core 0 then writes a sync C7 with the sel wake bit 214 set (indicated by "SW" in FIG. 12) and the PG bit 208 set, and is put to sleep and power-gated (per block 1104). Core 1 encounters an MWAIT instruction specifying C-state 7 (per block 1102). Core 1 then writes a sync C7 with the sel wake bit 214 set and the PG bit 208 set, and is put to sleep and power-gated (per block 1104). Core 2 encounters an MWAIT instruction specifying C-state 7 (per block 1102). Core 2 then writes a sync C7 with the sel wake bit 214 set and the PG bit 208 set, and is put to sleep and power-gated (per block 1104) (however, in an optimization embodiment described at block 314, the last-writing core is not power-gated). As shown, the time at which each of the cores writes the sync C7 may vary.

When the last core writes the sync C7 with the sel wake bit 214 set, the control unit 104 blocks off the wakeup events for all but the last-writing core (per block 326), which in the example of FIG. 12 is core 2. Additionally, the control unit 104 wakes up only the last-writing core (per block 1106), which may result in power savings because the other cores continue to sleep and be power-gated while core 2 performs the handshake protocol with the chipset. Core 2 then issues the I/O Read bus cycle (per block 1108) and waits for the assertion of STPCLK (per block 1109). In response to STPCLK, core 2 issues the stop grant cycle (per block 1121) and writes a sleep request with the PG bit 208 set waiting on the de-assertion of STPCLK and is put to sleep and power-gated (per block 1124). The cores may sleep and be power-gated for a relatively long time.

When STPCLK is de-asserted, the control unit 104 wakes up only core 2 (per block 1132). In the example of FIG. 12, the chipset de-asserts STPCLK in response to reception of a non-directed interrupt, which it forwards to the microprocessor 100. The microprocessor 100 directs the non-directed interrupt to core 2, which may result in power savings because the other cores continue to sleep and be power-gated. Core 2 unblocks the wakeup events of the other cores (per block 1134) and services the non-directed interrupt (per block 1136). Core 2 then again writes a sync C7 with the sel wake bit 214 set and the PG bit 208 set, and is put to sleep and power-gated (per block 1104).

When core 2 writes the sync C7 with the sel wake bit 214 set, the control unit 104 blocks off the wakeup events for all but core 2, i.e., the last-writing core (per block 326) since the sync requests for the other cores are still pending, i.e., the S bits 222 of the other cores were not cleared by the wakeups of core 2. Additionally, the control unit 104 wakes up only core 2 (per block 1106). Core 2 then issues the I/O Read bus cycle (per block 1108) and waits for the assertion of STPCLK (per block 1109). In response to STPCLK, core 2 issues the stop grant cycle (per block 1121) and writes a sleep request with the PG bit 208 set waiting on the de-assertion of STPCLK and is put to sleep and power-gated (per block 1124).

When STPCLK is de-asserted, the control unit 104 wakes up only core 2 (per block 1132). In the example of FIG. 12, STPCLK is de-asserted because of another non-directed interrupt; therefore, the microprocessor 100 directs the interrupt to core 2, which may result in power savings. Core 2 again unblocks the wakeup events of the other cores (per block 1134) and services the non-directed interrupt (per block 1136). Core 2 then again writes a sync C7 with the sel wake bit 214 set and the PG bit 208 set, and is put to sleep and power-gated (per block 1104).

Figure 13:
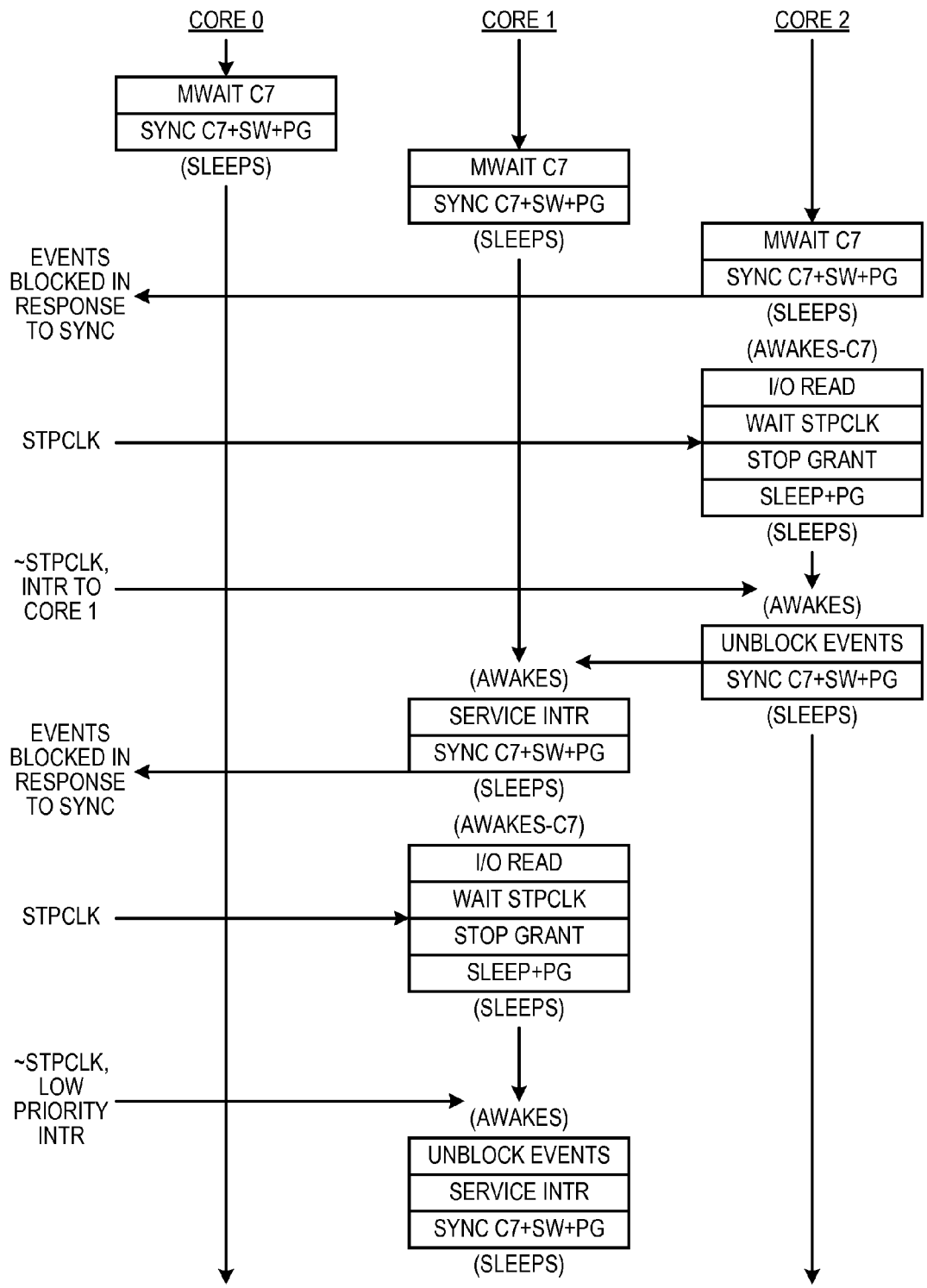
FIG. 13 is a timing diagram illustrating an alternate example of the operation of a microprocessor according to the flowchart of FIG. 11.

This cycle may continue for a relatively lengthy time, namely, as long as only non-directed interrupts are generated. FIG. 13 depicts an example of the handling of interrupts directed to a different core other than the last-writing core.

As may be observed by comparing FIG. 10 and FIG. 12, advantageously in the embodiment of FIG. 12, once the cores 102 initially go to sleep (after writing the sync C7 in the example of FIG. 12), only one of the cores 102 is awakened again to perform the handshaking protocol with the chipset and the other cores 102 remain asleep, which may be a significant advantage if the cores 102 were in a relatively deep sleep state. The power savings may be significant, particularly in cases where the operating system recognizes the workload on the system is sufficiently small for a single core 102 to handle the workload.

Furthermore, advantageously, only one of the cores 102 is awakened (to service non-directed events such as a low priority interrupt), as long as no wakeup events are directed to the other cores 102. Again, this may be a significant advantage if the cores 102 were in a relatively deep sleep state. The power savings may be significant, particularly in situations where there is effectively no workload on the system except relatively infrequent non-directed interrupts, such as USB interrupts. Still further, even if a wakeup event occurs that is directed to another core 102 (e.g., interrupts that the operating system directs to a single core 102, such as operating system timer interrupts), advantageously the embodiments may dynamically switch the single core 102 that performs the package sleep state protocol and services non-directed wakeup events, as illustrated in FIG. 13, so that the benefit of waking up only a single core 102 are enjoyed.

Referring now to FIG. 13, a timing diagram illustrating an alternate example of the operation of the microprocessor 100 according to the flowchart of FIG. 11 is shown. The example of FIG. 13 is similar in many respects to the example of FIG. 12; however, at the point where STPCLK is de-asserted in the first instance, the interrupt is a directed interrupt to core 1 (rather than a non-directed interrupt as in the example of FIG. 12). Consequently, the control unit 104 wakes up core 2 (per block 1132), and subsequently wakes up core 1 after the wakeup events are unblocked (per block 1134) by core 2. Core 2 then again writes a sync C7 with the sel wake bit 214 set and the PG bit 208 set, and is put to sleep and power-gated (per block 1104).

Core 1 services the directed interrupt (per block 1137). Core 1 then again writes a sync C7 with the sel wake bit 214 set and the PG bit 208 set, and is put to sleep and power-gated (per block 1104). In the example, core 2 wrote its sync C7 before core 1 wrote its sync C7. Consequently, although core 0 still has its S bit 222 set when it wrote its initial sync C7, core 1's S bit 222 was cleared when it was awakened. Therefore, when core 2 wrote the sync C7 after unblocking the wakeup events, it was not the last core to write the sync C7 request; rather, core 1 became the last core to write the sync C7 request.

When core 1 writes the sync C7 with the sel wake bit 214 set, the control unit 104 blocks off the wakeup events for all but core 1, i.e., the last-writing core (per block 326) since the sync requests for core 0 is still pending, i.e., it was not cleared by the wakeups of core 1 and core 2, and core 2 has already (in the example) written the sync 14 request. Additionally, the control unit 104 wakes up only core 1 (per block 1106). Core 1 then issues the I/O Read bus cycle (per block 1108) and waits for the assertion of STPCLK (per block 1109). In response to STPCLK, core 1 issues the stop grant cycle (per block 1121) and writes a sleep request with the PG bit 208 set waiting on the de-assertion of STPCLK and is put to sleep and power-gated (per block 1124).

When STPCLK is de-asserted, the control unit 104 wakes up only core 1 (per block 1132). In the example of FIG. 12, STPCLK is de-asserted because of a non-directed interrupt; therefore, the microprocessor 100 directs the interrupt to core 1, which may result in power savings. The cycle of handling non-directed interrupts by core 1 may continue for a relatively lengthy time, namely, as long as only non-directed interrupts are generated. In this manner, the microprocessor 100 advantageously may save power by directing non-directed interrupts to the core 102 to which the most recent interrupt was directed, which in the example of FIG. 13 involved switching to a different core. Core 1 again unblocks the wakeup events of the other cores (per block 1134) and services the non-directed interrupt (per block 1136). Core 1 then again writes a sync C7 with the sel wake bit 214 set and the PG bit 208 set, and is put to sleep and power-gated (per block 1104).

It should be understood that although embodiments have been described in which the power management instruction is an x86 MWAIT instruction, other embodiments are contemplated in which sync requests are employed to perform other power management instructions. For example, the microprocessor 100 may perform similar actions in response to a read from a set of predetermined I/O port addresses associated with the various C-states. For another example, the power management instruction may be from a different instruction set architecture than the x86 architecture.

Dynamic Reconfiguration of Multi-Core Processor

Each core 102 of the microprocessor 100 generates configuration-related values based on the configuration of cores 102 of the microprocessor 100. Preferably, microcode of each core 102 generates, saves and uses the configuration-related values. Embodiments are described in which the generation of the configuration-related values advantageously may be dynamic as described below. Examples of configuration-related values include, but are not limited to, the following.

Each core 102 generates a global core number described above with respect to FIG. 2. The global core number indicates the core number of the core 102 globally relative to all the cores 102 of the microprocessor 100 in contrast to the local core number 256 that indicates the core number of the core 102 locally relative to only the cores 102 of the die 406 on which the core 102 resides. In one embodiment, the core 102 generates the global core number as the sum of the product of its die number 258 and the number of cores 102 per die and its local core number 256, as shown here:

$$\text{global core number} = (\text{die number} * \text{number cores per die}) + \text{local core number}.$$

Each core 102 also generates a virtual core number. The virtual core number is the global core number minus the number of disabled cores 102 having a global core number lower than the global core number of the instant core 102. Thus, in the case in which all cores 102 of the microprocessor 100 are enabled, the global core number and the virtual core number are the same. However, if one or more of the cores 102 are disabled, leaving holes, the virtual core number of a core 102 may be different from its global core number. In one embodiment, each core 102 populates the APIC ID field in its corresponding APIC ID register with its virtual core number. However, according to alternate embodiments (e.g., FIGS. 22 and 23) this is not the case. Furthermore, in one embodiment, the operating system may update the APIC ID in the APIC ID register.

Each core 102 also generates a BSP flag, which indicates whether the core 102 is the BSP. In one embodiment, normally (e.g., when the "all cores BSP" feature of FIG. 23 is disabled) one core 102 designates itself the bootstrap processor (BSP) and each of the other cores 102 designates itself as an application processor (AP). After a reset, the AP cores 102 initialize themselves and then go to sleep waiting for the BSP to tell them to begin fetching and executing instructions. In contrast, after initializing itself, the BSP core 102 immediately begins fetching and executing instructions of the system firmware, e.g., BIOS bootstrap code, which initializes the system (e.g., verifies that the system memory and peripherals are working properly and initializes and/or configures them) and bootstraps the operating system, i.e., loads the operating system (e.g., from disk) and transfers control to the operating system. Prior to bootstrapping the operating system, the BSP determines the system configuration (e.g., the number of cores 102 or logical processors in the system) and saves it in memory so that the operating system may read it after it is booted. After being boot-strapped, the operating system instructs the AP cores 102 to begin fetching and executing instructions of the operating system. In one embodiment, normally (e.g., when the "modify BSP" and "all cores BSP" features of FIGS. 22 and 23, respectively, are disabled) a core 102 designates itself the BSP if its virtual core number is zero, and all other cores 102 designate themselves an AP core 102. Preferably, a core 102 populates the BSP flag bit in the APIC base address register of its corresponding APIC with its BSP flag configuration-related value. According to one embodiment, as described above, the BSP is master core 102 of blocks 907 and 919 that performs the package sleep state handshake protocol of FIG. 9.

Each core 102 also generates an APIC base value for populating the APIC base register. The APIC base address is generated based on the APIC ID of the core 102. In one embodiment, the operating system may update the APIC base address in the APIC base address register.

Each core 102 also generates a die master indicator, which indicates whether the core 102 is the master core 102 of the die 406 that includes the core 102.

Each core 102 also generates a slice master indicator, which indicates whether the core 102 is the master core 102 of the slice that includes the instant core 102, assuming the microprocessor 100 is configured with slices, which are described above.

Each core 102 computes the configuration-related values and operates using the configuration-related values so that the system comprising the microprocessor 100 operates correctly. For example, the system directs interrupt requests to the cores 102 based on their associated APIC IDs. The APIC ID determines which interrupt requests the core 102 will respond to. More specifically, each interrupt request includes a destination identifier, and a core 102 responds to an interrupt request only if the destination identifier matches the APIC ID of the core 102 (or if the interrupt request identifier is a special value that indicates it is a request for all cores 102). For another example, each core 102 must know whether it is the BSP so that it executes the initial BIOS code and bootstraps the operating system and in one embodiment performs the package sleep state handshake protocol as described with respect to FIG. 9. Embodiments are described below (see FIGS. 22 and 23) in which the BSP flag and APIC ID may be altered from their normal values for specific purposes, such as for testing and/or debug.

Referring now to FIG. 14, a flowchart illustrating dynamic reconfiguration of the microprocessor 100 is shown. In the description of FIG. 14 reference is made to the multi-die microprocessor 100 of FIG. 4, which includes two die 406 and eight cores 102. However, it should be understood that the dynamic reconfiguration described may apply to a microprocessor 100 with a different configuration, namely with more than two dies or a single die, and more or less than eight cores 102 but at least two cores 102. The operation is described from the perspective of a single core, but each of the cores 102 of the microprocessor 100 operates according to the description to collectively dynamically reconfigure the microprocessor 100. Flow begins at block 1402.

At block 1402, the microprocessor 100 is reset and hardware of the microprocessor 100 populates the configuration register 112 of each core 102 with the appropriate values based on the number of enabled cores 102 and the die number on which the control unit 104 resides. In one embodiment, the local core number 256 and die number 258 are hardwired. As described above, the hardware may determine whether a core 102 is enabled or disabled from the blown or unblown state of fuses 114. Flow proceeds to block 1404.

At block 1404, the core 102 reads the configuration word 252 from the configuration register 112. The core 102 then generates its configuration-related values based on the value of the configuration word 252 read at block 1402. In the case of a multi-die microprocessor 100 configuration, the configuration-related values generated at block 1404 will not take into account the cores 102 of the other die 406; however, the configuration-related values generated at blocks 1414 and 1424 (as well as block 1524 of FIG. 15) will take into account the cores 102 of the other die 406, as described below. Flow proceeds to block 1406.

At block 1406, the core 102 causes the enabled bit 254 values of the local cores 102 in the local configuration register 112 to be propagated to the corresponding enabled bits 254 of configuration register 112 of the remote die 406. For example, with respect to the configuration of FIG. 4, a core 102 on die A 406A causes the enabled bits 254 associated with cores A, B, C and D (local cores) in the configuration register 112 of die A 406A (local die) to be propagated to the enabled bits 254 associated with cores A, B, C and D in the configuration register 112 of die B 406B (remote die); conversely, a core 102 on die B 406B causes the enabled bits 254 associated with cores E, F, G and H (local cores) in the configuration register 112 of die B 406B (local die) to be propagated to the enabled bits 254 associated with cores E, F, G and H in the configuration register 112 of die A 406A (remote die). In one embodiment, the core 102 causes the propagation to the other die 406 by writing to the local configuration register 112. Preferably, the write by the core 102 to the local configuration register 112 causes no change to the local configuration register 112, but causes the local control unit 104 to propagate the local enabled bit 254 values to the remote die 406. Flow proceeds to block 1408.

At block 1408, the core 102 writes a sync request to its sync register 108 with a sync condition value of 8 (denoted sync 8 in FIG. 14). As a result, the control unit 104 puts the core 102 to sleep. Flow proceeds to block 1412.

At block 1412, the control unit 104 awakens the core 102 when all enabled cores 102 in the set of cores specified by the core set field 228 have written a sync 8. It is noted that in the case of a multi-die 406 microprocessor 100 configuration, the sync condition occurrence may be a multi-die sync condition occurrence. That is, the control unit 104 will wait to wakeup (or interrupt in the case where the cores 102 have not set the sleep bit 212 and thereby have elected not to sleep) the cores 102 until all the cores 102 specified in the core set field 228 (which may include cores 102 on both dies 406) and which are enabled (as indicated by the enabled bits 254) have written their sync request. Flow proceeds to block 1414.

At block 1414, the core 102 again reads the configuration register 112 and generates its configuration-related values based on the new value of the configuration word 252 that includes the correct values of the enabled bits 254 from the remote die 406. Flow proceeds to decision block 1416.

Figure 15:
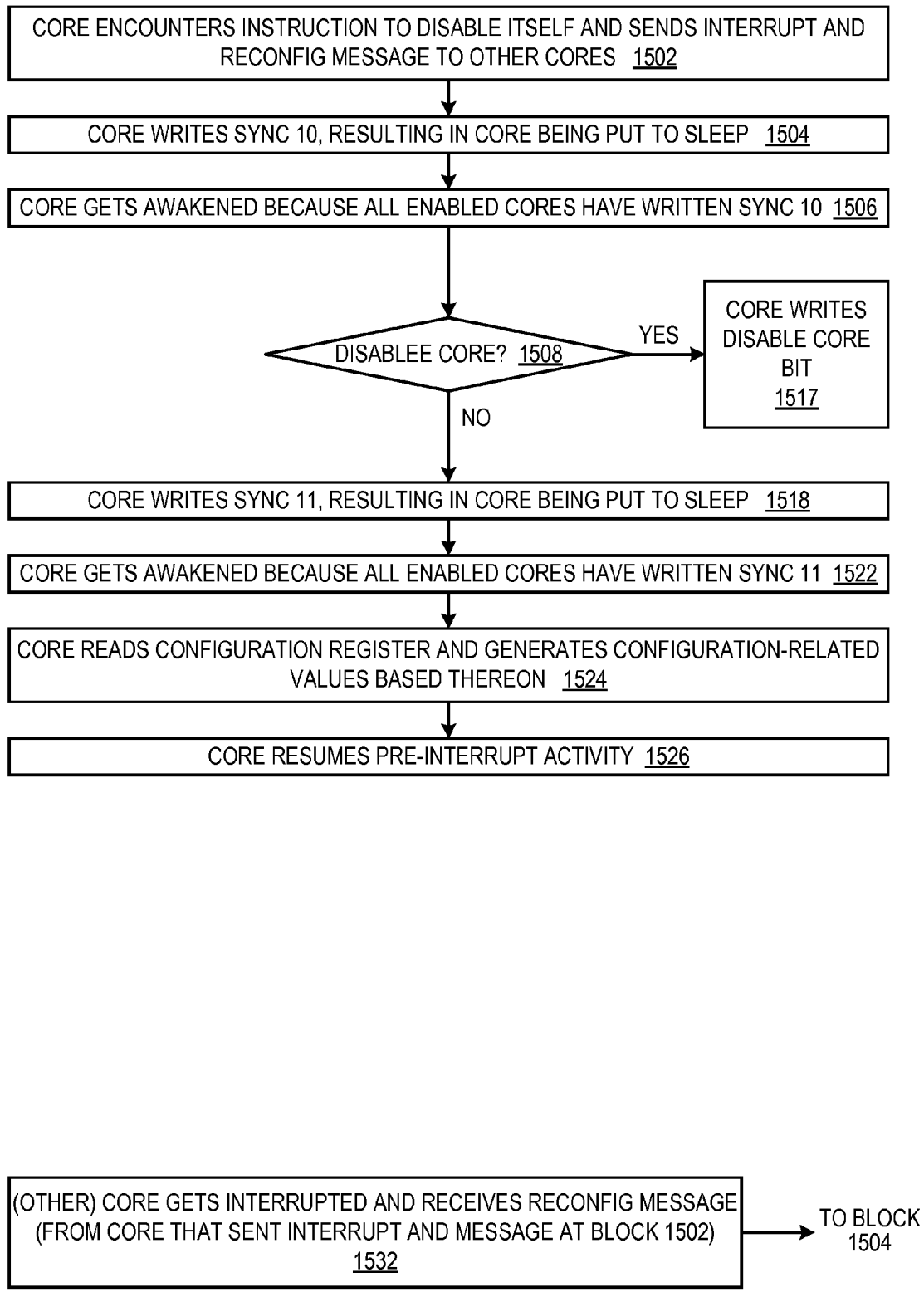
FIG. 15 is a flowchart illustrating dynamic reconfiguration of a microprocessor according to an alternate embodiment.

At decision block 1416, the core 102 determines whether it should disable itself. In one embodiment, the core 102 decides that it needs to disable itself because fuses 114 have been blown that the microcode reads (prior to decision block 1416) in its reset processing that indicate that the core 102 should disable itself. The fuses 114 may be blown during or after manufacturing of the microprocessor 100. Alternatively, updated fuse 114 values may be scanned into holding registers, as described above, and the scanned in values indicate to the core 102 that it should disable itself. FIG. 15 describes an alternate embodiment in which a core 102 determines by a different manner that it should disable itself. If the core 102 determines that it should disable itself, flow proceeds to block 1417; otherwise, flow proceeds to block 1418.

At block 1417, the core 102 writes the disable core bit 236 to cause itself to be removed from the list of enabled cores 102, e.g., to have its corresponding enabled bit 254 in the configuration word 252 of the configuration register 112 cleared. Afterward, the core 102 prevents itself from executing any more instructions, preferably by setting one or more bits to turn off its clock signals and have its power removed. Flow ends at block 1417.

At block 1418, the core 102 writes a sync request to its sync register 108 with a sync condition value of 9 (denoted sync 9 in FIG. 14). As a result, the control unit 104 puts the core 102 to sleep. Flow proceeds to block 1422.

At block 1422, the core 102 gets awakened by the control unit 104 when all enabled cores 102 have written a sync 9. Again, in the case of a multi-die 406 microprocessor 100 configuration, the sync condition occurrence may be a multi-die sync condition occurrence based on the updated values in the configuration register 112. Furthermore, the control unit 104 will exclude from consideration the core 102 that disabled itself at block 1417 as it determines whether a sync condition occurred. More specifically, in the circumstances in which all the other cores 102 (other than the core 102 disabling itself) write a sync 9 before the disabling-itself core 102 writes the sync register 108 at block 1417, then the control unit 104 will detect the sync condition occurred (at block 316) when the disabling-itself core 102 writes the sync register 108 with the disable core bit 236 set at block 1417. This is because at that point the control unit 104 no longer considers the disabled core 102 when determining whether the sync condition has occurred because the enabled bit 254 of the disabled core 102 is clear. That is, the control unit 104 determines that the sync condition has occurred because all of the enabled cores 102, which does not include the disabled core 102, have written a sync 9, regardless of whether the disabled core 102 has written a sync 9. Flow proceeds to block 1424.

At block 1424, the core 102 again reads the configuration register 112, and the new value of the configuration word 252 reflects a disabled core 102 if one was disabled by the operation of block 1417 by another core 102. The core 102 then again generates its configuration-related values, similar to the manner at block 1414, based on the new value of the configuration word 252. The presence of a disabled core 102 may cause some of the configuration-related values to be different than the values generated at block 1414. For example, as described above, the virtual core number, APIC ID, BSP flag, BSP base address, die master and slice master may change due to the presence of a disabled core 102. In one embodiment, after generating the configuration-related values, one of the cores 102 (e.g., BSP) writes to the uncore PRAM 116 some of the configuration-related values that are global to all cores 102 of the microprocessor 100 so that they may be subsequently read by all the cores 102. For example, in one embodiment the global the configuration-related values are read by a core 102 to perform an architectural instruction (e.g., the x86 CPUID instruction) that requests global information about the microprocessor 100, such as the number of cores 102 of the microprocessor 100. Flow proceeds to decision block 1426.

At block 1426, the core 102 comes out of reset and begins fetching architectural instructions. Flow ends at block 1426.

Referring now to FIG. 15, a flowchart illustrating dynamic reconfiguration of the microprocessor 100 according to an alternate embodiment is shown. In the description of FIG. 15 reference is made to the multi-die microprocessor 100 of FIG. 4, which includes two die 406 and eight cores 102. However, it should be understood that the dynamic reconfiguration described may apply to a microprocessor 100 with a different configuration, namely with more than two dies or a single die, and more or less than eight cores 102 but at least two cores 102. The operation is described from the perspective of a single core, but each of the cores 102 of the microprocessor 100 operates according to the description to collectively dynamically reconfigure the microprocessor 100. More specifically, FIG. 15 describes the operation of one core 102 that encounters the core disable instruction, whose flow begins at block 1502, and the operation of the other cores 102, whose flow begins at block 1532.

At block 1502, one of the cores 102 encounters an instruction that instructs the core 102 to disable itself. In one embodiment, the instruction is an x86 WRMSR instruction. In response, the core 102 sends a reconfigure message to the other cores 102 and sends them an inter-core interrupt. Preferably, the core 102 traps to microcode in response to the instruction to disable itself (at block 1502) or in response to the interrupt (at block 1532) and remains in microcode, during which time interrupts are disabled (i.e., the microcode does not allow itself to be interrupted), until block 1526. Flow proceeds from block 1502 to block 1504.

At block 1532, one of the other cores 102 (i.e., a core 102 other than the core 102 that encountered the disable instruction at block 1502) gets interrupted and receives the reconfigure message as a result of the inter-core interrupt sent at block 1502. As described above, although flow at block 1532 is described from the perspective of a single core 102, each of the other cores 102 (i.e., not the core 102 at block 1502) gets interrupted and receives the message at block 1532 and performs the steps at blocks 1504 through 1526. Flow proceeds from block 1532 to block 1504.

At block 1504, the core 102 writes a sync request to its sync register 108 with a sync condition value of 10 (denoted sync 10 in FIG. 15). As a result, the control unit 104 puts the core 102 to sleep. Flow proceeds to block 1506.

At block 1506, the core 102 gets awakened by the control unit 104 when all enabled cores 102 have written a sync 10. It is noted that in the case of a multi-die 406 microprocessor 100 configuration, the sync condition occurrence may be a multi-die sync condition occurrence. That is, the control unit 104 will wait to wakeup (or interrupt in the case where the cores 102 have not elected to sleep) the cores 102 until all the cores 102 specified in the core set field 228 (which may include cores 102 on both dies 406) and which are enabled (as indicated by the enabled bits 254) have written their sync request. Flow proceeds to decision block 1508.

At decision block 1508, the core 102 determines whether it is the core 102 that was instructed at block 1502 to disable itself. If so, flow proceeds to block 1517; otherwise, flow proceeds to block 1518.

At block 1517, the core 102 writes the disable core bit 236 to cause itself to be removed from the list of enabled cores 102, e.g., to have its corresponding enabled bit 254 in the configuration word 252 of the configuration register 112 cleared. Afterward, the core 102 prevents itself from executing any more instructions, preferably by setting one or more bits to turn off its clock signals and have its power removed. Flow ends at block 1517.

At block 1518, the core 102 writes a sync request to its sync register 108 with a sync condition value of 11 (denoted sync 11 in FIG. 15). As a result, the control unit 104 puts the core 102 to sleep. Flow proceeds to block 1522.

At block 1522, the core 102 gets awakened by the control unit 104 when all enabled cores 102 have written a sync 11. Again, in the case of a multi-die 406 microprocessor 100 configuration, the sync condition occurrence may be a multi-die sync condition occurrence based on the updated values in the configuration register 112. Furthermore, the control unit 104 will exclude from consideration the core 102 that disabled itself at block 1517 as it determines whether a sync condition occurred. More specifically, in the circumstances in which all the other cores 102 (other than the core 102 disabling itself) write a sync 11 before the disabling-itself core 102 writes the sync register 108 at block 1517, then the control unit 104 will detect the sync condition occurred (at block 316) when the disabling-itself core 102 writes the sync register 108 at block 1517 because at that point the control unit 104 no longer considers the disabled core 102 when determining whether the sync condition has occurred because the enabled bit 254 of the disabled core 102 is clear (see FIG. 16). That is, the control unit 104 determines that the sync condition has occurred because all of the enabled cores 102 have written a sync 11, regardless of whether the disabled core 102 has written a sync 11. Flow proceeds to block 1524.

At block 1524, the core 102 reads the configuration register 112, whose configuration word 252 will reflect the disabled core 102 that was disabled at block 1517. The core 102 then generates its configuration-related values based on the new value of the configuration word 252. Preferably, the disable instruction of block 1502 is executed by system firmware (e.g., BIOS setup) and, after the core 102 is disabled, the system firmware performs a reboot of the system, e.g., after block 1526. During the reboot, the microprocessor 100 may operate differently than before the generation of the configuration-related values here at block 1524. For example, the BSP during the reboot may be a different core 102 than before the generation of the configuration-related values. For another example, the system configuration information (e.g., the number of cores 102 or logical processors in the system) determined by the BSP prior to bootstrapping the operating system and saved in memory for the operating system to read it after it is booted may be different. For another example, the APIC IDs of the cores 102 still enabled may be different than before the generation of the configuration-related values, in which case the operating system will direct interrupt requests and the cores 102 will respond to the interrupt requests differently than before the generation of the configuration-related values. For another example, the master core 102 of blocks 907 and 919 that performs the package sleep state handshake protocol of FIG. 9 may be a different core 102 than before the generation of the configuration-related values. Flow proceeds to decision block 1526.

At block 1526, the core 102 resumes the task it was performing before it was interrupted at block 1532. Flow ends at block 1526.

The embodiments for dynamically reconfiguring the microprocessor 100 described herein may be used in a variety of applications. For example, the dynamic reconfiguration may be used for testing and/or simulation during development of the microprocessor 100 and/or for field-testing. Also, a user may want to know the performance and/or amount of power consumed when running a given application using only a subset of the cores 102. In one embodiment, after a core 102 is disabled, it may have its clocks turned off and/or power removed such that it consumes essentially no power. Furthermore, in a high reliability system, each core 102 may periodically check if the other cores 102 are faulty and if the cores 102 vote that a given core 102 is faulty, the healthy cores may disable the faulty core 102 and cause the remaining cores 102 to perform a dynamic reconfiguration such as described. In such an embodiment, the control word 202 may include an additional field that enables the writing core 102 to specify the core 102 to be disabled and the operation described with respect to FIG. 15 is modified such that a core may disable a different core 102 than itself at block 1517.

Figure 16:
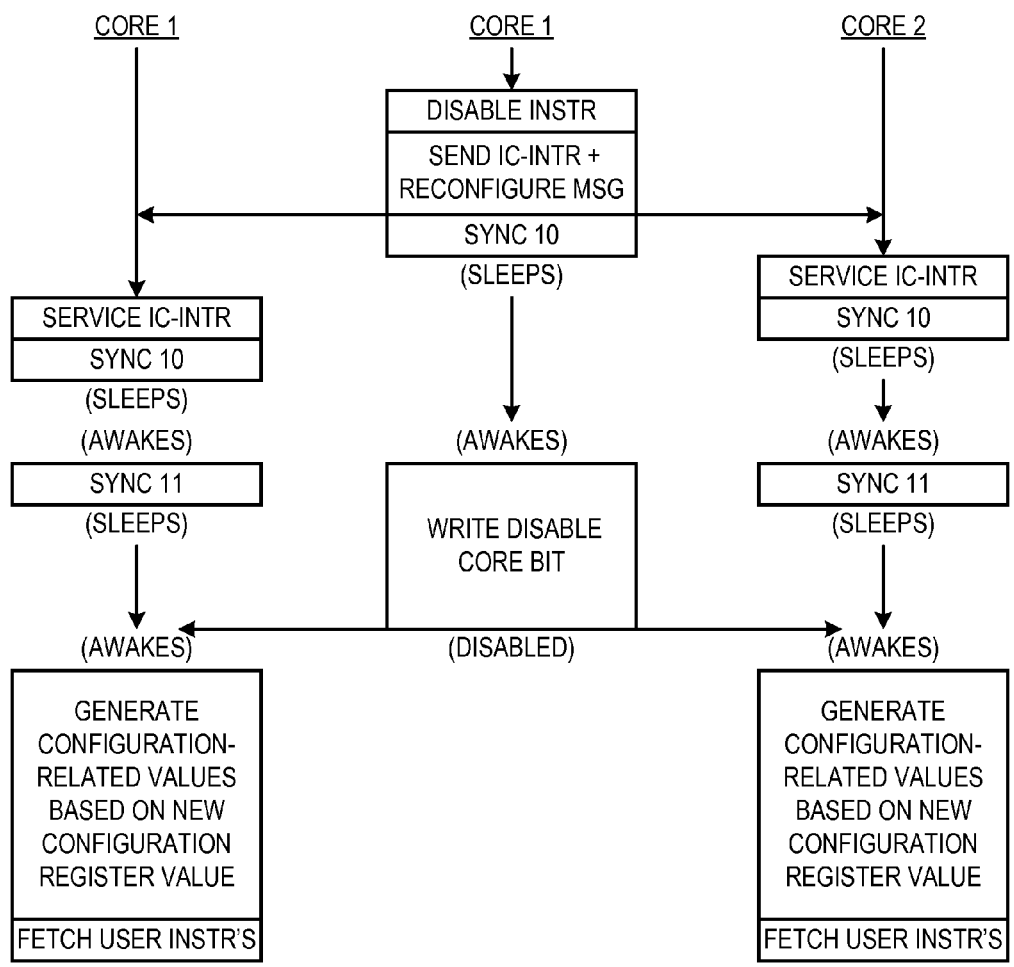
FIG. 16 is a timing diagram illustrating an example of the operation of a microprocessor according to the flowchart of FIG. 15.

Referring now to FIG. 16, a timing diagram illustrating an example of the operation of the microprocessor 100 according to the flowchart of FIG. 15 is shown. In the example, a configuration of a microprocessor 100 with three cores 102, denoted core 0, core 1 and core 2, is shown; however, it should be understood that in other embodiments the microprocessor 100 may include different numbers of cores 102 and may be a single-die or multi-die microprocessor 100. In the timing diagram, the timing of events proceeds downward.

Core 1 encounters an instruction to disable itself and in response sends a reconfigure message and interrupt to core 0 and core 2 (per block 1502). Core 1 then writes a sync 10 and is put to sleep (per block 1504).

Each of core 0 and core 2 eventually are interrupted from their current tasks and read the message (per block 1532). In response, each of core 0 and core 2 writes a sync 10 and is put to sleep (per block 1504). As shown, the time at which each of the cores writes the sync 10 may vary, for example due to the latency of the instruction that is executing when the interrupt is asserted.

When all the cores have written the sync 10, the control unit 104 wakes them all up simultaneously (per block 1506). Cores 0 and 2 then determine that they are not disabling themselves (per decision block 1508) and write a sync 11 and are put to sleep (per block 1518). However, core 1 determines that it is disabling itself, so it writes its disable core bit 236 (per block 1517). In the example, core 1 writes its disable core bit 236 after cores 1 and 2 write their sync 11, as shown. Nevertheless, the control unit 104 detects the sync condition occurrence because the control unit 104 determines that the S bit 222 is set for every core 102 whose enabled bit 254 is set. That is, even though the S bit 222 of core 1 is not set, its enabled bit 254 was cleared at the write of the sync register 108 of core 1 at block 1517.

When all the enabled cores have written the sync 11, the control unit 104 wakes them all up simultaneously (per block 1522). As described above, in the case of a multi-die microprocessor 100, when core 1 writes its disable core bit 236 and the local control unit 104 responsively clears the local enabled bit 254 of core 1, the local control unit 104 also propagates the local enabled bits 254 to the remote die 406. Consequently, the remote control unit 104 also detects the sync condition occurrence and simultaneously wakes up all the enabled cores of its die 406. Cores 0 and 2 then generate their configuration-related values (per block 1524) based on the updated configuration register 112 value and resume their pre-interrupt activity (per block 1526).

Hardware Semaphore

Figure 17:
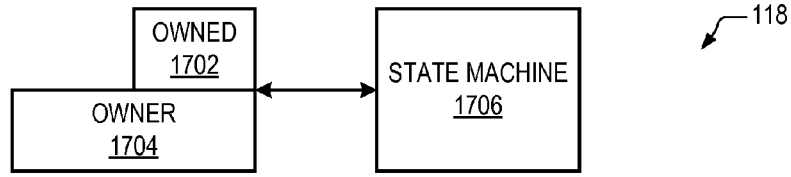
FIG. 17 is a block diagram illustrating a hardware semaphore.

Referring now to FIG. 17, a block diagram illustrating the hardware semaphore 118 of FIG. 1 is shown. The hardware semaphore 118 includes an owned bit 1702, owner bits 1704 and a state machine 1706 that updates the owned bit 1702 and the owner bits 1704 in response to reads and writes of the hardware semaphore 118 by the cores 102. Preferably, the number of owner bits 1704 is $\log_2$ of the number of cores 102 of the microprocessor 100 configuration in order to uniquely identify which core 102 currently owns the hardware semaphore 118. In another embodiment, the owner bits 1704 include one respective bit per core 102 of the microprocessor 100. It is noted that although one set of owned bit 1702, owner bits 1704 and state machine 1706 are described that implement a single hardware semaphore 118, the microprocessor 100 may include a plurality of hardware semaphores 118 each including the set of hardware described. Preferably, the microcode running on each of the cores 102 reads and writes the hardware semaphores 118 to gain ownership of a resource that is shared by the cores 102, examples of which are described below, in order to perform operations that require exclusive access to the shared resource. The microcode may associate each one of the multiple hardware semaphores 118 with ownership of a different shared resource of the microprocessor 100. Preferably, the hardware semaphore 118 is readable and writeable by the cores 102 at a predetermined address within a non-architectural address space of the cores 102. The non-architectural address space can only be accessed by microcode of a core 102, but cannot be accessed directly by user programs (e.g., x86 architecture program instructions). Operation of the state machine 1706 to update the owned bit 1702 and owner bits 1704 of the hardware semaphore 118 are described below with respect to FIGS. 18 and 19, and uses of the hardware semaphore 118 are described thereafter.

Figure 18:
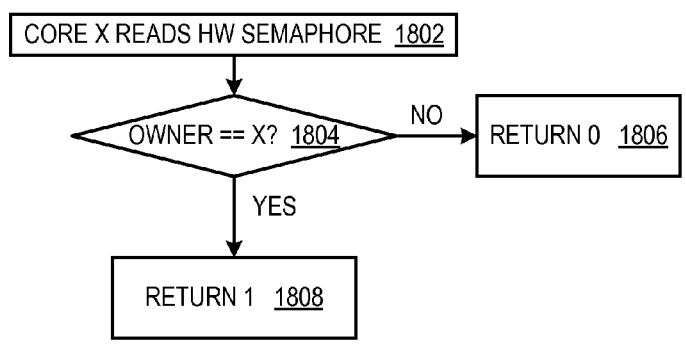
FIG. 18 is a flowchart illustrating operation of a hardware semaphore when read by a core.

Referring now to FIG. 18, a flowchart illustrating operation of the hardware semaphore 118 when read by a core 102 is shown. Flow begins at block 1802.

At block 1802, a core 102, denoted core x, reads the hardware semaphore 118. As described above, preferably the microcode of the core 102 reads the predetermined address at which the hardware semaphore 118 resides within the non-architectural address space. Flow proceeds to decision block 1804.

At decision block 1804, the state machine 1706 examines the owner bits 1704 to determine whether core x is the owner of the hardware semaphore 118. If so, flow proceeds to block 1808; otherwise, flow proceeds to block 1806.

At block 1806, the hardware semaphore 118 returns to the reading core 102 a zero value to indicate that the core 102 does not own the hardware semaphore 118. Flow ends at block 1806.

At block 1808, the hardware semaphore 118 returns to the reading core 102 a one value to indicate that the core 102 owns the hardware semaphore 118. Flow ends at block 1808.

As described above, the microprocessor 100 may include a plurality of hardware semaphores 118. In one embodiment, the microprocessor 100 includes 16 hardware semaphores 118, and when a core 102 reads the predetermined address it receives a 16-bit data value in which each bit corresponds to a different one of the 16 hardware semaphores 118 and indicates whether or not the core 102 reading the predetermined address owns the corresponding hardware semaphore 118.

Figure 19:
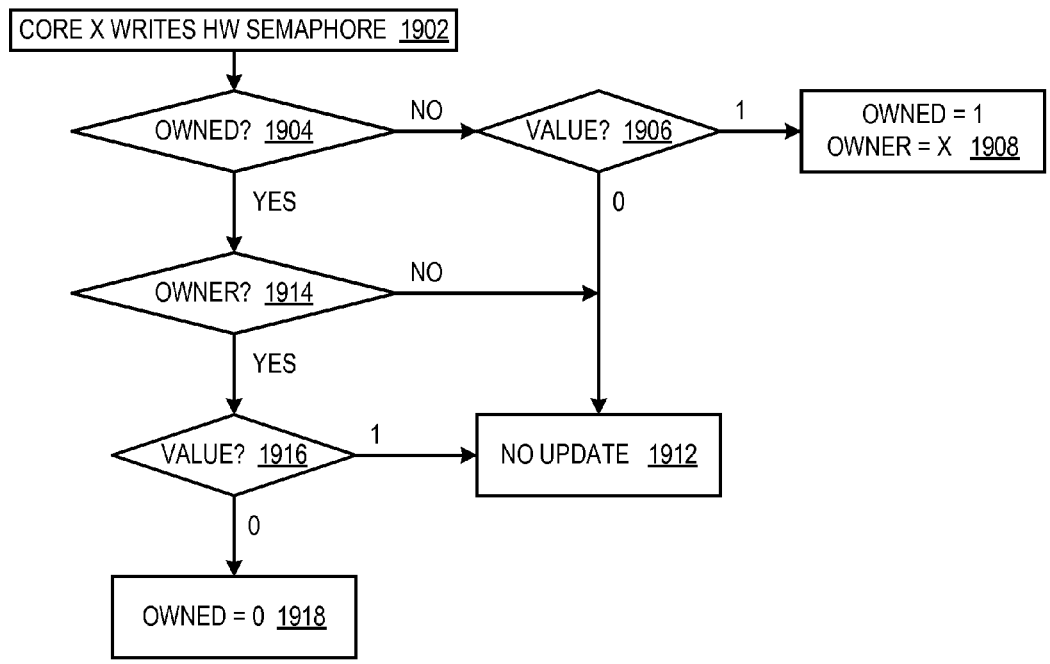
FIG. 19 is a flowchart illustrating operation of a hardware semaphore when written by a core.

Referring now to FIG. 19, a flowchart illustrating operation of the hardware semaphore 118 when written by a core 102 is shown. Flow begins at block 1902.

At block 1902, a core 102, denoted core x, writes the hardware semaphore 118, e.g., at the non-architectural predetermined address described above. Flow proceeds to decision block 1904.

At decision block 1904, the state machine 1706 examines the owned bit 1702 to determine whether the hardware semaphore 118 is owned by any of the cores 102 or is free, i.e., un-owned. If owned, flow proceeds to decision block 1914; otherwise, flow proceeds to decision block 1906.

At decision block 1906, the state machine 1706 examines the value written. If the value is one, which indicates the core 102 would like to obtain ownership of the hardware semaphore 118, flow proceeds to block 1908; whereas, if the value is zero, which indicates the core 102 would like to relinquish ownership of the hardware semaphore 118, flow proceeds to block 1912.

At block 1908, the state machine 1706 updates the owned bit 1702 to a one and sets the owner bits 1704 to a value indicating core x now owns the hardware semaphore 118. Flow ends at block 1908.

At block 1912, the state machine 1706 performs no update of the owned bit 1702 nor the owner bits 1704. Flow ends at block 1912.

At decision block 1914, the state machine 1706 examines the owner bits 1704 to determine whether core x is the owner of the hardware semaphore 118. If so, flow proceeds to decision block 1916; otherwise, flow proceeds to block 1912.

At decision block 1916, the state machine 1706 examines the value written. If the value is one, which indicates the core 102 would like to obtain ownership of the hardware semaphore 118, flow proceeds to block 1912 (where no update occurs, since this core 102 already owns the hardware semaphore 118, as determined at decision block 1914); whereas, if the value is zero, which indicates the core 102 would like to relinquish ownership of the hardware semaphore 118, flow proceeds to block 1918.

At block 1918, the state machine 1706 updates the owned bit 1702 to a zero to indicate that now no core 102 owns the hardware semaphore 118. Flow ends at block 1918.

As described above, in one embodiment the microprocessor 100 includes 16 hardware semaphores 118. When a core 102 writes the predetermined address it writes a 16-bit data value in which each bit corresponds to a different one of the 16 hardware semaphores 118 and indicates whether the core 102 writing the predetermined address is requesting to own (one value) or to relinquish ownership (zero value) of the corresponding hardware semaphore 118.

In one embodiment, arbitration logic arbitrates requests by the cores 102 to access the hardware semaphore 118 such that reads/writes from/to the hardware semaphore 118 are serialized. In one embodiment, the arbitration logic employs a round-robin fairness algorithm among the cores 102 for access to the hardware semaphore 118.

Referring now to FIG. 20, a flowchart illustrating operation of the microprocessor 100 to employ the hardware semaphore 118 to perform an action that requires exclusive ownership of a resource is shown. More specifically, the hardware semaphore 118 is used to insure that only one core 102 at a time performs a write back and invalidate of the shared cache memory 119 in the situation where two or more of the cores 102 have each encountered an instruction to write back and invalidate the shared cache 119. The operation is described from the perspective of a single core, but each of the cores 102 of the microprocessor 100 operates according to the description to collectively insure that while one core 102 is performing a write back and invalidate operation other cores 102 are not. That is, the operation of FIG. 20 insures that WBINVD instruction processes are serialized. In one embodiment, the operation of FIG. 20 may be performed in a microprocessor 100 that performs a WBINVD instruction according to the embodiment of FIG. 7. Flow begins at block 2002.

At block 2002, a core 102 encounters a cache control instruction, such as a WBINVD instruction. Flow proceeds to block 2004.

At block 2004, the core 102 writes a one to the WBINVD hardware semaphore 118. In one embodiment, the microcode has allocated one of the hardware semaphores 118 to the WBINVD operation. The core 102 then reads the WBINVD hardware semaphore 118 to determine whether it obtained ownership. Flow proceeds to decision block 2006.

At decision block 2006, if the core 102 determines that it obtained ownership of the WBINVD hardware semaphore 118, flow proceeds to block 2008; otherwise, flow returns to block 2004 to attempt again to obtain the ownership. It is noted that as microcode of the instant core 102 loops through blocks 2004 and 2006, it will eventually be interrupted by the core 102 that owns the WBINVD hardware semaphore 118, since that core 102 is performing a WBINVD instruction and sends the instant core 102 an interrupt at block 702 of FIG. 7. Preferably, each time through the loop, the instant core 102 microcode checks an interrupt status register to see whether one of the other cores 102 (e.g., the core 102 that owns the WBINVD hardware semaphore 118) sent an interrupt to the instant core 102. The instant core 102 will then perform the operations of FIG. 7 and at block 749 will resume operation according to FIG. 20 to attempt to gain ownership of the hardware semaphore 118 to perform its WBINVD instruction.

At block 2008, the core 102 has obtained ownership and flow proceeds to block 702 of FIG. 7 to perform the WBINVD instruction. As part of the WBINVD instruction operation, at block 748 of FIG. 7 the core 102 writes a zero to the WBINVD hardware semaphore 118 to relinquish ownership of it. Flow ends at block 2008.

An operation similar to the operation described with respect to FIG. 20 may be employed by the microcode in order to obtain exclusive ownership of other shared resources. Other resources to which a core 102 may obtain exclusive ownership by using a hardware semaphore 118 are uncore 103 registers that are shared by the cores 102. In one embodiment, the uncore 103 register comprises a control register that includes a respective field for each of the cores 102. The field controls an operational aspect of the respective core 102. Because the fields are in the same register, when a core 102 wants to update its respective field but not the fields of the other cores 102, the core 102 must read the control register, modify the value read, and then write back the modified value to the control register. For example, the microprocessor 100 may include an uncore 103 performance control register (PCR) that controls the bus clock ratio of the cores 102. To update its bus clock ratio, a given core 102 must read, modify, and write back the PCR. Therefore, in one embodiment the microcode is configured to perform an effectively atomic read/modify/write of the PCR by doing so only if the core 102 owns the hardware semaphore 118 associated with the PCR. The bus clock ratio determines the individual core 102 clock frequency as a multiple of the frequency of the clock supplied to the microprocessor 100 via an external bus.

Another resource is a Trusted Platform Module (TPM). In one embodiment, the microprocessor 100 implements a TPM in microcode that runs on the cores 102. At a given instant in time, the microcode running on one and only one of the cores 102 of the microprocessor 100 is implementing the TPM; however, the core 102 implementing the TPM may change over time. By using the hardware semaphore 118 associated with the TPM, the microcode of the cores 102 assures that only one core 102 is implementing the TPM at a time. More specifically, the core 102 currently implementing the TPM writes the TPM state to the PRAM 116 prior to giving up implementation of the TPM and the core 102 that takes over implementation of the TPM reads the TPM state from the PRAM 116. The microcode in each of the cores 102 is configured such that when a core 102 wants to become the core 102 implementing the TPM, the core 102 first obtains ownership of the TPM hardware semaphore 118 before reading the TPM state from the PRAM 116 and begins implementing the TPM. In one embodiment, the TPM conforms substantially to a TPM specification published by the Trusted Computing Group, such as the ISO/IEC 11889 specification.

As described above, a conventional solution to resource contention among multiple processors is to employ a software semaphore in system memory. Potential advantages of the hardware semaphore 118 described herein are that it may avoid generation of additional traffic on the external memory bus and it may be faster than accessing system memory.

Interrupting, Non-Sleeping Sync Requests

Referring now to FIG. 21, a timing diagram illustrating an example of the operation of the microprocessor 100 according to the flowchart of FIG. 3 in which the cores 102 issue non-sleeping sync requests is shown. In the example, a configuration of a microprocessor 100 with three cores 102, denoted core 0, core 1 and core 2, is shown; however, it should be understood that in other embodiments the microprocessor 100 may include different numbers of cores 102.

Core 0 writes a sync 14 in which neither the sleep bit 212 nor the sel wake bit 214 is set (i.e., a non-sleeping sync request). Consequently, the control unit 104 allows core 0 to keep running (per the "NO" branch out of decision block 312).

Core 1 also eventually writes a non-sleeping sync 14 and the control unit 104 allows core 1 to keep running Finally, Core 2 writes a non-sleeping sync 14. As shown, the time at which each of the cores writes the sync 14 may vary.

When all the cores have written the non-sleeping sync 14, the control unit 104 simultaneously sends each of core 0, core 1 and core 2 a sync interrupt (per block 334). Each core then receives the sync interrupt and services it (unless the sync interrupt was masked, in which case the microcode typically polls for it).

Designation of the Bootstrap Processor

In one embodiment, as described above, normally (e.g., when the "all cores BSP" feature of FIG. 23 is disabled) one core 102 designates itself the bootstrap processor (BSP) and performs special duties, such as bootstrapping the operating system. In one embodiment, normally (e.g., when the "modify BSP" and "all cores BSP" features of FIGS. 22 and 23, respectively, are disabled) virtual core number zero is by default the BSP core 102.

However, the present inventors have observed that there may be situations where it is advantageous for the BSP to be designated in a different manner, embodiments of which are described below. For example, much of the testing of a microprocessor 100 part, particularly during manufacturing testing, is performed by booting the operating system and running programs to insure that the part 100 is working properly. Because the BSP core 102 performs the system initialization and boots the operating system, it may be exercised in ways that the AP cores 102 may not. Additionally, it has been observed that, even in a multithreaded operating environment, the BSP typically bears a larger share of the processing burden than the APs; therefore, the AP cores 102 may not be tested as thoroughly as the BSP core 102. Finally, there may be certain actions that only the BSP core 102 performs on behalf of the microprocessor 100 as a whole, such as the package sleep state handshake protocol as described with respect to FIG. 9.

Therefore, embodiments are described in which any of the cores 102 may be designated the BSP. In one embodiment, during the testing of the microprocessor 100, the tests are run N times, wherein N is the number of cores 102 of the microprocessor 100, and in each run of the tests the microprocessor 100 is re-configured to make the BSP a different core 102. This may advantageously provide better test coverage during manufacturing and may also advantageously expose bugs in the microprocessor 100 during its design process. Another advantage is during different runs each core 102 may have a different APIC ID and consequently respond to different interrupt requests, which may provide more extensive test coverage.

Figure 22:
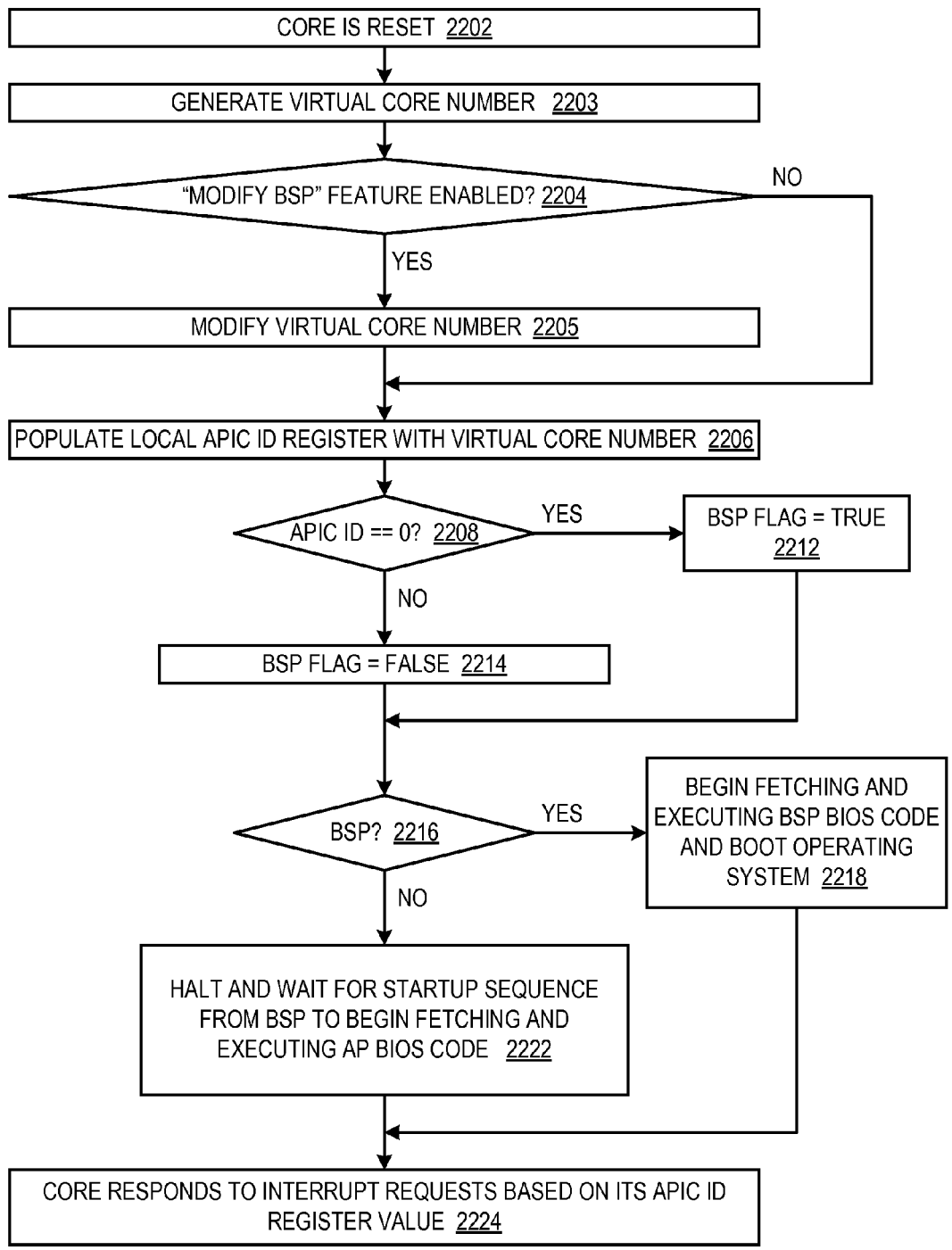
FIG. 22 is a flowchart illustrating a process for configuring a microprocessor.
Figure 23:
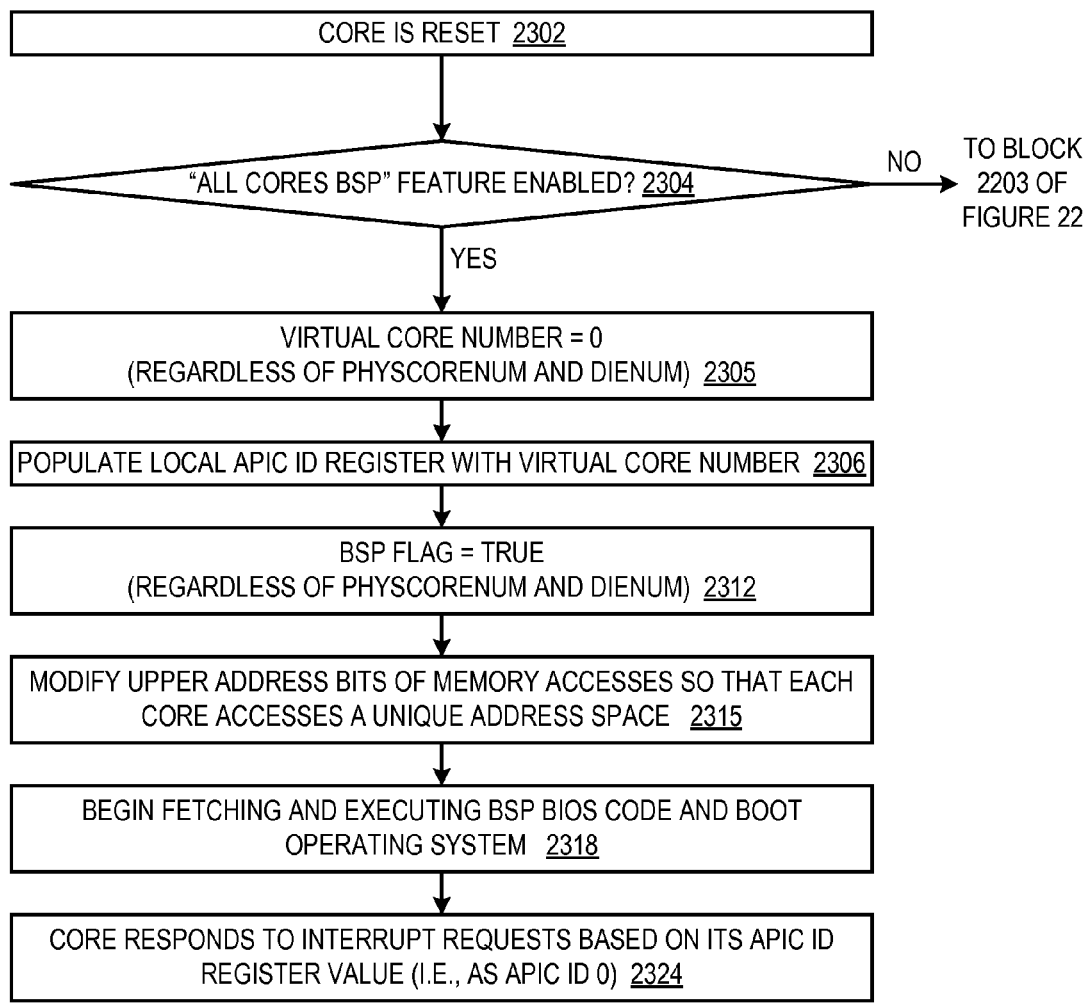
FIG. 23 is a flowchart illustrating a process for configuring a microprocessor according to an alternate embodiment.

Referring now to FIG. 22, a flowchart illustrating a process for configuring the microprocessor 100 is shown. In the description of FIG. 22 reference is made to the multi-die microprocessor 100 of FIG. 4, which includes two die 406 and eight cores 102. However, it should be understood that the dynamic reconfiguration described may apply to a microprocessor 100 with a different configuration, namely with more than two dies or a single die, and more or less than eight cores 102 but at least two cores 102. The operation is described from the perspective of a single core, but each of the cores 102 of the microprocessor 100 operates according to the description to collectively dynamically reconfigure the microprocessor 100. Flow begins at block 2202.

At block 2202, the microprocessor 100 is reset and performs an initial portion of its initialization, preferably in a manner similar to that described above with respect to FIG. 14. However, the generating of the configuration-related values, such as a block 1424 of FIG. 14, in particular the APIC ID and BSP flag, is performed in the manner described here with respect to blocks 2203 through 2214. Flow proceeds to block 2203.

At block 2203, the core 102 generates its virtual core number, preferably as described above with respect to FIG. 14. Flow proceeds to decision block 2204.

At decision block 2204, the core 102 samples an indicator to determine whether or not a feature is enabled. The feature is referred to herein as the "modify BSP" feature. In one embodiment, blowing a fuse 114 enables the modify BSP feature. Preferably, during testing, rather than blowing the modify BSP feature fuse 114, a true value is scanned into the holding register bit associated with the modify BSP feature fuse 114, as described above with respect to FIG. 1, to enable the modify BSP feature. In this way, the modify BSP feature is not permanently enabled on the microprocessor 100 part, but is instead disabled on subsequent power-ups. Preferably, the operations at blocks 2203 through 2214 are performed by microcode of the core 102. If the modify BSP feature is enabled, flow proceeds to block 2205. Otherwise, flow proceeds to block 2206.

At block 2205, the core 102 modifies the virtual core number that was generated at block 2203. In one embodiment, the core 102 modifies the virtual core number to be the result of a rotate function of the virtual core number generated at block 2203 and a rotate amount, as shown here:

virtual core number=rotate(rotate amount,virtual core number).

The rotate function, in one embodiment, rotates the virtual core number among the cores 102 by the rotate amount. The rotate amount is a value that is blown into a fuse 114, or preferably, is scanned into a holding register during testing.

Table 1 shows the virtual core number for each core 102 whose ordered pair (die number 258, local core number 256) is shown in the left-hand column for each rotate amount shown in the top row in an example configuration in which the number of dies 406 is two and the number of cores 102 per die 406 is four and all cores 102 are enabled. In this fashion, the tester is empowered to cause the cores 102 to generate their virtual core number, and consequently APIC ID, as any valid value. Although one embodiment for modifying the virtual core number is described, other embodiments are contemplated. For example, the rotate direction may be opposite that shown in Table 1. Flow proceeds to block 2206.

TABLE 1

|        | 0 | 1 | 2 | 3 | 4 | 5 | 6 | 7 |
|--------|---|---|---|---|---|---|---|---|
| (0, 0) | 0 | 7 | 6 | 5 | 4 | 3 | 2 | 1 |
| (0, 1) | 1 | 0 | 7 | 6 | 5 | 4 | 3 | 2 |
| (0, 2) | 2 | 1 | 0 | 7 | 6 | 5 | 4 | 3 |
| (0, 3) | 3 | 2 | 1 | 0 | 7 | 6 | 5 | 4 |
| (1, 0) | 4 | 3 | 2 | 1 | 0 | 7 | 6 | 5 |
| (1, 1) | 5 | 4 | 3 | 2 | 1 | 0 | 7 | 6 |
| (1, 2) | 6 | 5 | 4 | 3 | 2 | 1 | 0 | 7 |
| (1, 3) | 7 | 6 | 5 | 4 | 3 | 2 | 1 | 0 |

At block 2206, the core 102 populates the local APIC ID register with either the default virtual core number generated at block 2203 or the modified value generated at block 2205. In one embodiment, the APIC ID register may be read by the core 102 from itself (e.g., by the BIOS and/or operating system) at memory address 0x0FEE00020; whereas, in another embodiment, the APIC ID register may be read by the core 102 at MSR address 0x802. Flow proceeds to decision block 2208.

At decision block 2208, the core 102 determines whether its APIC ID populated at block 2208 is zero. If so, flow proceeds to block 2212; otherwise, flow proceeds to block 2214.

At block 2212, the core 102 sets its BSP flag to true to indicate the core 102 is the BSP. In one embodiment, the BSP flag is a bit in the x86 APIC base register (IA32_APIC_BASE MSR) of the core 102. Flow proceeds to decision block 2216.

At block 2214, the core 102 sets the BSP flag to false to indicate the core 102 is not the BSP, i.e., in an AP. Flow proceeds to decision block 2216.

At decision block 2216, the core 102 determines whether it is the BSP, i.e., whether it designated itself the BSP core 102 at block 2212 as opposed to designating itself an AP core 102 at block 2214. If the core 102 is the BSP, flow proceeds to block 2218; otherwise, flow proceeds to block 2222.

At block 2218, the core 102 begins fetching and executing the system initialization firmware (e.g., the BSP BIOS bootstrap code). This may include instructions that implicate the BSP flag and the APIC ID, e.g., instructions that read the APIC ID register or the APIC base register, in which case the core 102 returns the values written at blocks 2206 and 2212/2214. This may also include being the only core 102 of the microprocessor 100 to perform actions on behalf of the microprocessor 100 as a whole, such as the package sleep state handshake protocol as described with respect to FIG. 9. Preferably, the BSP core 102 begins fetching and executing the system initialization firmware at an architecturally-defined reset vector. For example, in the x86 architecture, the reset vector is address 0xFFFFFFF0. Preferably, executing the system initialization firmware includes bootstrapping the operating system, e.g., loading the operating system and transferring control to it. Flow proceeds to block 2224.

At block 2222, the core 102 halts itself and waits for a startup sequence from the BSP to begin fetching and executing instructions. In one embodiment, the startup sequence received from the BSP includes an interrupt vector to AP system initialization firmware (e.g., the AP BIOS code). This may include instructions that implicate the BSP flag and the APIC ID, in which case the core 102 returns the values written at blocks 2206 and 2212/2214. Flow proceeds to block 2224.

At block 2224, the core 102, as it executes instructions, receives interrupt requests and responds to the interrupt requests based on its APIC ID written in its APIC ID register at block 2206. Flow ends at block 2224.

As described above, according to one embodiment, the core 102 whose virtual core number is zero is the BSP by default. However, the present inventors have observed that there may be situations where it is advantageous for all of the cores 102 to be designated the BSP, embodiments of which are described below. For example, the microprocessor 100 developer may have invested a significant amount of time and cost to develop a large body of tests that are designed to run on a single core in a single-threaded manner, and the developer would like to use the single core tests to test the multi-core microprocessor 100. For example, the tests may run under the old and well-known DOS operating system in x86 real mode.

Running these tests on each core 102 could be accomplished in a serial fashion using the modify BSP feature described above with respect to FIG. 22 and/or by blowing fuses or scanning into a holding register modified fuse values to disable all cores 102 but the one core 102 to be tested. However, the present inventors have recognized that this would take more time (e.g., approximately 4× in the case of a 4-core microprocessor 100) than running the tests concurrently on all the cores 102. Furthermore, the time required to test each individual microprocessor 100 part is precious, particularly when manufacturing hundreds of thousands or more of the microprocessor 100 parts and particularly when much of the testing is performed on very expensive test equipment.

Additionally, it may be the case that a speed path in the logic of the microprocessor 100 is more heavily stressed when running more than one core 102 (or all the cores 102) at the same time because this generates more heat and/or draws more power. Running the tests in the serial fashion might not generate the additional stress and expose the speed path.

Therefore, embodiments are described in which dynamically all of the cores 102 may be designated the BSP core 102 so that all of the cores 102 may execute a test concurrently.

Referring now to FIG. 23, a flowchart illustrating a process for configuring the microprocessor 100 according to an alternate embodiment is shown. In the description of FIG. 23 reference is made to the multi-die microprocessor 100 of FIG. 4, which includes two die 406 and eight cores 102. However, it should be understood that the dynamic reconfiguration described may apply to a microprocessor 100 with a different configuration, namely with more than two dies or a single die, and more or less than eight cores 102 but at least two cores 102. The operation is described from the perspective of a single core, but each of the cores 102 of the microprocessor 100 operates according to the description to collectively dynamically reconfigure the microprocessor 100. Flow begins at block 2302.

At block 2302, the microprocessor 100 is reset and performs an initial portion of its initialization, preferably in a manner similar to that described above with respect to FIG. 14. However, the generating of the configuration-related values, such as a block 1424 of FIG. 14, in particular the APIC ID and BSP flag, is performed in the manner described here with respect to blocks 2304 through 2312. Flow proceeds to decision block 2304.

At decision block 2304, the core 102 detects a feature is enabled. The feature is referred to herein as the "all cores BSP" feature. Preferably, blowing a fuse 114 enables the all cores BSP feature. Preferably, during testing, rather than blowing the all cores BSP feature fuse 114, a true value is scanned into the holding register bit associated with the all cores BSP feature fuse 114, as described above with respect to FIG. 1, to enable the all cores BSP feature. In this way, the all cores BSP feature is not permanently enabled on the microprocessor 100 part, but is instead disabled on subsequent power-ups. Preferably, the operations at blocks 2304 through 2312 are performed by microcode of the core 102. If the all cores BSP feature is enabled, flow proceeds to block 2305. Otherwise, flow proceeds to block 2203 of FIG. 22.

At block 2305, the core 102 sets its virtual core number to zero, regardless of the local core number 256 and die number 258 of the core 102. Flow proceeds to block 2306.

At block 2306, the core 102 populates the local APIC ID register with the zero value of the virtual core number set at block 2305. Flow proceeds to block 2312.

At block 2312, the core 102 sets its BSP flag to true to indicate the core 102 is the BSP, regardless of the local core number 256 and die number 258 of the core 102. Flow proceeds to block 2315.

At block 2315, whenever a core 102 performs a memory access request, the microprocessor 100 modifies upper address bits of the memory access request address differently for each core 102 so that each core 102 accesses its own unique memory space. That is, depending on the core 102 making the memory access request, the microprocessor 100 modifies the upper address bits so the upper address bits have a unique value for each core 102. In one embodiment, the microprocessor 100 modifies the upper address bits as specified by values blown into fuses 114. In an alternate embodiment, the microprocessor 100 modifies the upper address bits based on the local core number 256 and die number 258 of the core 102. For example, in an embodiment in which the number of cores 102 in the microprocessor 100 is four, the microprocessor 100 modifies the upper two bits of the memory address and generates a unique value on the upper two bits for each core 102. Effectively, the memory space addressable by the microprocessor 100 is divided into N sub-spaces, where N is the number of cores 102. The test programs are developed such that they limit themselves to specifying addresses within the lowest of the N sub-spaces. For example, assume the microprocessor 100 is capable of addressing 64 GB of memory and the microprocessor 100 includes four cores 102. The test is developed to only access the bottom 8 GB of memory. When core 0 executes an instruction that accesses memory address A (in the lower 8 GB of memory), the microprocessor 100 generates an address on the memory bus of A (unmodified); when core 1 executes an instruction that accesses the same memory address A, the microprocessor 100 generates an address on the memory bus of A+8 GB; when core 2 executes an instruction that accesses the same memory address A, the microprocessor 100 generates an address on the memory bus of A+16 GB; and when core 3 executes an instruction that accesses the same memory address A, the microprocessor 100 generates an address on the memory bus of A+32 GB. In this fashion, advantageously, the cores 102 will not be colliding in their accesses to memory, which enables the tests to execute correctly. Preferably, the single-threaded tests are executed on a stand-alone testing machine that is capable of testing the microprocessor 100 in isolation. The microprocessor 100 developer develops test data to be provided by the testing machine to the microprocessor 100 in response to a memory read request; conversely, the developer develops result data that the testing machine compares to the data written by the microprocessor 100 during a memory write access to insure that the microprocessor 100 is writing the correct data. In one embodiment, shared cache 119 (i.e., the highest level cache that generates the addresses used in the external bus transactions) is the portion of the microprocessor 100 configured to modify the upper address bits when the all cores BSP feature is enabled. Flow proceeds to block 2318.

At block 2318, the core 102 begins fetching and executing the system initialization firmware (e.g., the BSP BIOS bootstrap code). This may include instructions that implicate the BSP flag and the APIC ID, e.g., instructions that read the APIC ID register or the APIC base register, in which case the core 102 returns the zero value written at block 2306. Preferably, the BSP core 102 begins fetching and executing the system initialization firmware at an architecturally-defined reset vector. For example, in the x86 architecture, the reset vector is address 0xFFFFFFF0. Preferably, executing the system initialization firmware includes bootstrapping the operating system, e.g., loading the operating system and transferring control to it. Flow proceeds to block 2324.

At block 2324, the core 102, as it executes instructions, receives interrupt requests and responds to the interrupt requests based on its APIC ID value of zero written in its APIC ID register at block 2306. Flow ends at block 2324.

Although an embodiment has been described with respect to FIG. 23 in which all the cores 102 are designated the BSP, other embodiments are contemplated in which multiple but less than all of the cores 102 are designated the BSP.

Although embodiments have been described in the context of an x86-style system that employs a local APIC per core 102 and in which there is a relationship between the APIC ID and the BSP designation, it should be understood that the designation of the bootstrap processor is not limited to x86-style embodiments, but may be employed in systems with different system architectures.

Propagation of Microcode Patches to Multiple Cores

As may be observed from the foregoing, there may be many critical functions performed largely by microcode of a microprocessor, and particularly, which require correct communication and coordination between the microcode instances executing on the multiple cores of the microprocessor. Due to complexity of the microcode, a significant probability that bugs will exist in the microcode that require fixing. This may be accomplished via microcode patches in which new microcode instructions are substituted for old microcode instructions that cause the bug. That is, the microprocessor includes special hardware that facilitates the patching of microcode. Typically, it is desirable to apply the microcode patch to all the cores of the microprocessor. Conventionally, this has been performed by separately executing an architectural instruction on each of the cores to apply the patch. However, the convention approach may be problematic.

First, the patch may pertain to inter-core communication by instances of the microcode (e.g., core synchronization, hardware semaphore use) or to features that require microcode inter-core communication (e.g., trans-core debug requests, cache control operations or power management, or dynamic multi-core microprocessor configuration). The execution of the architectural patch application instruction separately on each core may create a window of time in which the microcode patch is applied to some cores but not to others (or a previous patch is applied to some cores and the new patch is applied to others). This may cause a communication failure between the cores and incorrect operation of the microprocessor. Other problems, foreseen and unforeseen, may also be created if all of the cores of the microprocessor do not have the same microcode patch applied.

Second, the architecture of the microprocessor specifies many features that may be supported by some instances of the microprocessor and not by others. During operation, the microprocessor is capable of communicating to system software which particular features it supports. For example, in the case of an x86 architecture microprocessor, the x86 CPUID instruction may be executed by system software to determine the supported feature set. However, the feature set-determining instruction (e.g., CPUID) is executed separately on each core of the microprocessor. In some cases, a feature may be disabled because a bug existed at the time the microprocessor was released. However, subsequently a microcode patch may be developed that fixes the bug so that the feature may now be enabled after the patch is applied. However, if the patch is applied in the conventional manner (i.e., applied separately to each core through the separate execution of the apply patch instruction on each core), different cores may indicate different feature sets at a given point in time depending upon whether or not the patch has been applied to them. This may be problematic, particularly if the system software (such as the operating system, for example, to facilitate thread migration between the cores) expects all the cores of the microprocessor to have the same feature set. In particular, it has been observed that some system software only obtains the feature set of one core and assumes the other cores have the same feature set.

Third, the microcode instance of each core controls and/or communicates with uncore resources that are shared by the cores (e.g., sync-related hardware, hardware semaphore, share PRAM, shared cache or service processing unit). Therefore, generally speaking, it may be problematic for the microcode of two different cores to be controlling or communicating with an uncore resource simultaneously in two different manners due to the fact that one of the cores has a microcode patch applied and the other does not (or the two cores have different microcode patches).

Finally, the microcode patch hardware of the microprocessor may be such that applying the patch in the conventional manner could potentially cause interference of the operation of a patch by one core by the application of a patch by another core, for example, if portions of the patch hardware are shared among the cores.

Advantageously, embodiments for applying a microcode patch to a multi-core microprocessor in an atomic manner at the architectural instruction level to potentially solve such problems are described herein. The application of the patch is atomic in at least two senses. First, the patch is applied to the entire microprocessor 100 in response to the execution of an architectural instruction on a single core 102. That is, the embodiments do not require system software to execute an apply microcode patch instruction (described below) on each core 102. More specifically, the single core 102 that encounters the apply microcode patch instruction sends messages to and interrupts the other cores 102 to invoke instances of the portion of their microcode that applies the patch, and all the microcode instances cooperate with one another such that the microcode patch is applied to the microcode patch hardware of each of the cores 102 and to shared patch hardware of the microprocessor 100 while interrupts are disabled on all the cores 102. Second, the microcode instances running on all the cores 102 that implement the atomic patch application mechanism cooperate with one another such that they refrain from executing any architectural instructions (other than the one apply microcode patch instruction) after all the cores 102 of the microprocessor 100 have agreed to apply the patch and until all the cores 102 have done so. That is, none of the cores 102 executes an architectural instruction while any of the cores 102 is applying the microcode patch. Furthermore, in a preferred embodiment, all the cores 102 reach the same place in the microcode that performs the patch application with interrupts disabled, and after that the cores 102 execute only microcode instructions that apply the microcode patch until all cores 102 of the microprocessor 100 confirm the patch has been applied. That is, none of the cores 102 execute microcode instructions other than those that apply the microcode patch while any of the cores 102 of the microprocessor 100 are applying the patch.

Figure 24:
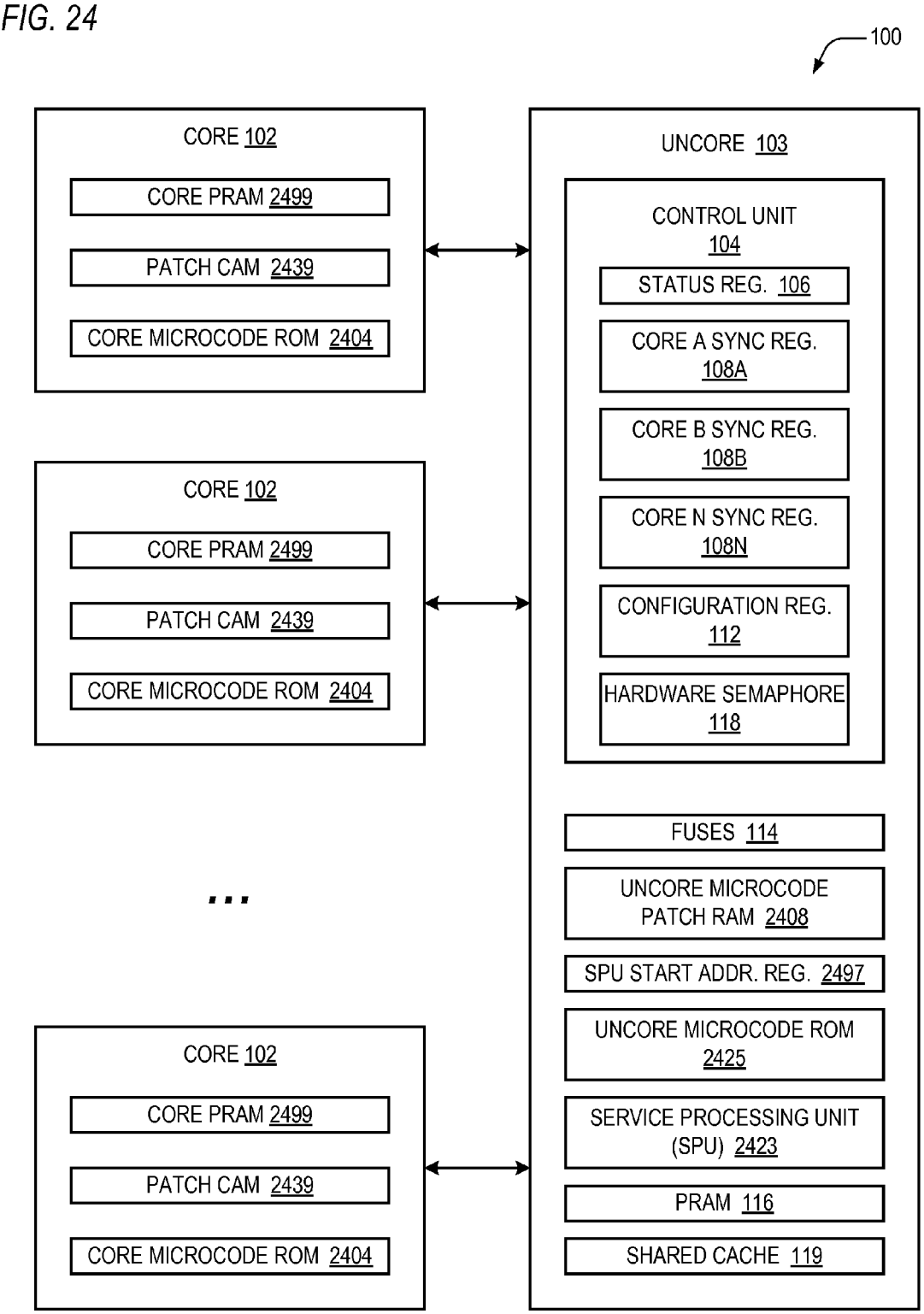
FIG. 24 is a block diagram illustrating a multicore microprocessor according to an alternate embodiment.

Referring now to FIG. 24, a block diagram illustrating a multicore microprocessor 100 according to an alternate embodiment is shown. The microprocessor 100 is similar in many respects to the microprocessor 100 of FIG. 1. However, the microprocessor 100 of FIG. 24 also includes in its uncore 103 a service processing unit (SPU) 2423, a SPU start address register 2497, an uncore microcode read-only memory (ROM) 2425 and an uncore microcode patch random access memory (RAM) 2408. Additionally, each core 102 includes a core PRAM 2499, a patch content-addressable memory (CAM) 2439 and a core microcode ROM 2404.

Microcode comprises microcode instructions. The microcode instructions are non-architectural instructions stored within one or more memories (e.g., the uncore microcode ROM 2425, uncore microcode patch RAM 2408 and/or core microcode ROM 2404) of the microprocessor 100 that are fetched by a core 102 based on a fetch address stored in the non-architectural micro-program counter (micro-PC) and used by the core 102 to implement the instructions of the instruction set architecture of the microprocessor 100. Preferably, the microcode instructions are translated by a microtranslator into microinstructions that are executed by execution units of the core 102, or in an alternate embodiment the microcode instructions are executed directly by the execution units (in which case the microcode instructions are microinstructions). That the microcode instructions are non-architectural instructions means they are not instructions of the instruction set architecture (ISA) of the microprocessor 100 but are instead encoded according to an instruction set distinct from the architectural instruction set. The non-architectural micro-PC is not defined by the instruction set architecture of the microprocessor 100 and is distinct from the architecturally-defined program counter of the core 102. The microcode is used to implement some or all of the instructions of the instruction set of the microprocessor's ISA as follows. In response to decoding a microcode-implemented ISA instruction, the core 102 transfers control to a microcode routine associated with the ISA instruction. The microcode routine comprises microcode instructions. The execution units execute the microcode instructions, or, according to the preferred embodiment, the microcode instructions are further translated into microinstructions that are executed by the execution units. The results of the execution of the microcode instructions (or microinstructions from which the microcode instructions are translated) by the execution units are the results defined by the ISA instruction. Thus, the collective execution of the microcode routine associated with the ISA instruction (or of the microinstructions translated from the microcode routine instructions) by the execution units "implements" the ISA instruction; that is, the collective execution by the execution units of the implementing microcode instructions (or of the microinstructions translated from the microcode instructions) performs the operation specified by the ISA instruction on inputs specified by the ISA instruction to produce a result defined by the ISA instruction. Additionally, the microcode instructions may be executed (or translated into microinstructions that are executed) when the microprocessor is reset in order to configure the microprocessor.

The core microcode ROM 2404 holds microcode executed by the particular core 102 that comprises it. The uncore microcode ROM 2425 also holds microcode executed by the cores 102; however, in contrast to the core ROMs 2404, the uncore ROM 2425 is shared by the cores 102. Preferably, the uncore ROM 2425 holds microcode routines that require less performance and/or are less frequently executed, since the access time of the uncore ROM 2425 is greater than the core ROM 2404. Additionally, the uncore ROM 2425 holds code that is fetched and executed by the SPU 2423.

The uncore microcode patch RAM 2408 is also shared by the cores 102. The uncore microcode patch RAM 2408 holds microcode instructions executed by the cores 102. The patch CAM 2439 holds patch addresses output by the patch CAM 2439 to a microsequencer in response to a microcode fetch address if the fetch address matches the contents of one of the entries in the patch CAM 2439. In such case, the microsequencer outputs the patch address as the microcode fetch address rather than the next sequential fetch address (or target address in the case of a branching type instruction), in response to which the uncore patch RAM 2408 outputs a patch microcode instruction. This effectuates fetching of a patch microcode instruction from the uncore patch RAM 2408, rather fetching a microcode instruction from the uncore ROM 2425 or the core ROM 2404 that is undesirable, for example because it and/or microcode instructions following it are the source of a bug. Thus, the patch microcode instruction effectively replaces, or patches, the undesirable microcode instruction that resides in the core ROM 2404 or the uncore microcode ROM 2425 at the original microcode fetch address. Preferably, the patch CAM 2439 and patch RAM 2408 are loaded in response to architectural instructions included in system software, such as BIOS or the operating system running on the microprocessor 100.

The uncore PRAM 116, among other things, is used by the microcode to store values used by the microcode. Some of these values effectively function as constant values because they are immediate values stored in the core microcode ROM 2404 or the uncore microcode ROM 2425 or blown into the fuses 114 at the time the microprocessor 100 is manufactured and are written to the uncore PRAM 116 by the microcode when the microprocessor 100 is reset and are not modified during operation of the microprocessor 100, except possibly via a patch or in response to the execution of an instruction that explicitly modifies the value, such as a WRMSR instruction. Advantageously, these values may be modified via the patch mechanism described herein without requiring a change to the core microcode ROM 2404 or the uncore microcode ROM 2425, which would be costly, and without requiring one or more fuses 114 to be unblown.

Additionally, the uncore PRAM 116 is used to hold patch code fetched and executed by the SPU 2423, as described herein.

The core PRAM 2499, similar to the uncore PRAM 116, is private, or non-architectural, in the sense that it is not in the architectural user program address space of the microprocessor 100. However, unlike the uncore PRAM 116, each of the core PRAM 2499 is accessed only by its respective core 102 and is not shared by the other cores 102. Like the uncore PRAM 116, the core PRAM 2499 is also used by the microcode to store values used by the microcode. Advantageously, these values may be modified via the patch mechanism described herein without requiring a change to the core microcode ROM 2404 or uncore microcode ROM 2425.

The SPU 2423 comprises a stored program processor that is n adjunct to and distinct from each of the cores 102. Although the cores 102 are architecturally visible to execute instructions of the ISA of the cores 102 (e.g., x86 ISA instructions), the SPU 2423 is not architecturally visible to do so. So, for example, the operating system cannot run on the SPU 2423 nor can the operating system schedule programs of the ISA of the cores 102 (e.g., x86 ISA instructions) to run on the SPU 2423. Stated alternatively, the SPU 2423 is not a system resource managed by the operating system. Rather, the SPU 2423 performs operations used to debug the microprocessor 100. Additionally, the SPU 2423 may assist in measuring performance of the cores 102, as well as other functions. Preferably, the SPU 2423 is much smaller, less complex and less power consuming (e.g., in one embodiment, the SPU 2423 includes built-in clock gating) than the cores 102. In one embodiment, the SPU 2423 comprises a FORTH CPU core.

There are asynchronous events that can occur with which debug microcode executed by the cores 102 (referred to as tracer) cannot deal well. However, advantageously, the SPU 2423 can be commanded by a core 102 to detect the events and to perform actions, such as creating a log or modifying aspects of the behavior of the cores 102 and/or external bus interface of the microprocessor 100, in response to detecting the events. The SPU 2423 can provide the log information to the user, and it can also interact with the tracer to request the tracer to provide the log information or to request the tracer to perform other actions. In one embodiment, the SPU 2423 has access to control registers of the memory subsystem and programmable interrupt controller of each core 102, as well as to control registers of the shared cache 119.

Examples of the events that SPU 2423 can detect include the following: (1) a core 102 is hung, i.e., the core 102 has not retired any instructions for a number of clock cycles that is programmable; (2) a core 102 loads data from an uncacheable region of memory; (3) a change in temperature of the microprocessor 100 occurs; (4) the operating system requests a change in the microprocessor's 100 bus clock ratio and/or requests a change in the microprocessor's 100 voltage level; (5) the microprocessor 100, of its own accord, changes the voltage level and/or bus clock ratio, e.g., to achieve power savings or performance improvement; (6) an internal timer of a core 102 expires; (7) a cache snoop that hits a modified cache line causing the cache line to be written back to memory occurs; (8) the temperature, voltage, or bus clock ratio of the microprocessor 100 goes outside a respective range; (9) an external trigger signal is asserted by a user on an external pin of the microprocessor 100.

Advantageously, because the SPU 2423 is running code 132 independently of the cores 102, it does not have the same limitations as the tracer microcode that executes on the cores 102. Thus, the SPU 2423 can detect or be notified of the events independent of the core 102 instruction execution boundaries and without disrupting the state of the core 102.

The SPU 2423 has its own code that it executes. The SPU 2423 may fetch its code from either the uncore microcode ROM 2425 or from the uncore PRAM 116. That is, preferably, the SPU 2423 shares the uncore ROM 2425 and uncore PRAM 116 with the microcode that runs on the cores 102. The SPU 2423 uses the uncore PRAM 116 to store its data, including the log. In one embodiment, the SPU 2423 also includes its own serial port interface through which it can transmit the log to an external device. Advantageously, the SPU 2423 can also instruct tracer running on a core 102 to store the log information from the uncore PRAM 116 to system memory.

The SPU 2423 communicates with the cores 102 via status and control registers. The SPU status register includes a bit corresponding to each of the events described above that the SPU 2423 can detect. To notify the SPU 2423 of an event, a core 102 sets the bit in the SPU status register corresponding to that event. Some of the event bits are set by hardware of the microprocessor 100 and some are set by microcode of the cores 102. The SPU 2423 reads the status register to determine the list of events that have occurred. One of the control registers includes a bit corresponding to each action that the SPU 2423 should take in response to detecting one of the events specified in the status register. That is, a set of actions bits exists in the control register for each possible event in the status register. In one embodiment, there are 16 action bits per event. In one embodiment, when the status register is written to indicate an event, this causes the SPU 2423 to be interrupted, in response to which the SPU 2423 reads the status register to determine which events have occurred. Advantageously, this saves power by alleviating the need for the SPU 2423 to poll the status register. The status register and control registers can also be read and written by user programs that execute instructions, such as RDMSR and WRMSR instructions.

The set of actions the SPU 2423 can perform in response to detecting an event include the following. (1) Write the log information to the uncore PRAM 116. For each of the log-writing actions, multiple of the action bits exist to enable the programmer to specify that only particular subsets of the log information should be written. (2) Write the log information from the uncore PRAM 116 to the serial port interface. (3) Write to one of the control registers to set an event for the tracer. That is, the SPU 2423 can interrupt a core 102 and cause the tracer microcode to be invoked to perform a set of actions associated with the event. The actions may be specified by the user beforehand. In one embodiment, when the SPU 2423 writes the control register to set the event, this causes the core 102 to take a machine check exception, and the machine check exception handler checks to see whether the tracer is activated. If so, the machine check exception handler transfers control to the tracer. The tracer reads the control register and if the events set in the control register are events that the user has enabled for the tracer, the tracer performs the actions specified beforehand by the user associated with the events. For example, the SPU 2423 can set an event to cause the tracer to write the log information stored in the uncore PRAM 116 to system memory. (4) Write to a control register to cause the microcode to branch to a microcode address specified by the SPU 2423. This is particularly useful if the microcode is in an infinite loop such that the tracer will not be able to perform any meaningful actions, yet the core 102 is still executing and retiring instructions, which means the processor hung event will not occur. (5) Write to a control register to cause a core 102 to reset. As mentioned above, the SPU 2423 can detect that a core 102 is hung (i.e., has not retired any instruction for some programmable amount of time) and reset it. The reset microcode checks to see whether the reset was initiated by the SPU 2423 and, if so, advantageously writes the log information out to system memory before clearing it during the process of initializing the core 102. (6) Continuously log events. In this mode, rather than waiting to be interrupted about an event, the SPU 2423 spins in a loop checking the status register and continuously logging information to the uncore PRAM 116 associated with the events indicated therein, and optionally additionally writing the log information to the serial port interface. (7) Write to a control register to stop a core 102 from issuing requests to the shared cache 119 and/or stop the shared cache 119 from acknowledging requests to the cores 102. This may be particularly useful in debugging memory subsystem-related design bugs, such as page tablewalk hardware bugs, and even fixing the bugs during operation of the microprocessor 100, such as through a patch to the SPU 2423 code, as described below. (8) Write to a control register of an external bus interface controller of the microprocessor 100 to perform transactions on the eternal system bus, such as special cycles or memory read/write cycles. (9) Write to a control register of the programmable interrupt controller of a core 102 to generate an interrupt to another core 102 or to emulate an I/O device to the cores 102 or to fix a bug in the interrupt controller, for example. (10) Write to a control register of the shared cache 119 to control its sizing, e.g., to disable or enable different ways of the associative cache 119. (11) Write to control registers of the various functional units of the cores 102 to configure different performance features, such as branch prediction or data prefetch algorithms. As described below, advantageously the SPU 2423 code may be patched, which enables the SPU 2423 to perform actions such as those described herein to remedy design flaws or perform other functions even after the design of the microprocessor 100 has been completed and the microprocessor 100 has been fabricated.

The SPU start address register 2497 holds the address at which the SPU 2423 begins fetching instructions when it comes out of reset. The SPU start address register is written by the cores 102. The address may be in either uncore PRAM 116 or uncore microcode ROM 2425.

Figure 25:
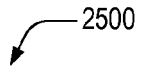
FIG. 25 is a block diagram illustrating the structure of a microcode patch.

Referring now to FIG. 25, a block diagram illustrating the structure of a microcode patch 2500 according to one embodiment is shown. In the embodiment of FIG. 25, the microcode patch 2500 includes the following portions: a header 2502; an immediate patch 2504; a checksum 2506 of the immediate patch 2504; CAM data 2508; a core PRAM patch 2512; a checksum of the CAM data 2508 and core PRAM patch 2512; a RAM patch 2516; an uncore PRAM patch 2518; and a checksum 2522 of the core PRAM patch 2512 and RAM patch 2516. The checksums 2506/2514/2522 enable the microprocessor 100 to verify the integrity of the respective portions of the patches after they are loaded into the microprocessor 100. Preferably, the portions of the microcode patch 2500 are loaded from system memory and/or from a non-volatile system, such as from a ROM or FLASH memory that holds a system BIOS or extensible firmware, for example. The header 2502 describes each portion of the patch 2500, such as its size, the location in its respective patch-related memory to which the patch portion is to be loaded, and a valid flag that indicates whether or not the portion contains a valid patch that should be applied to the microprocessor 100.

Figure 26:
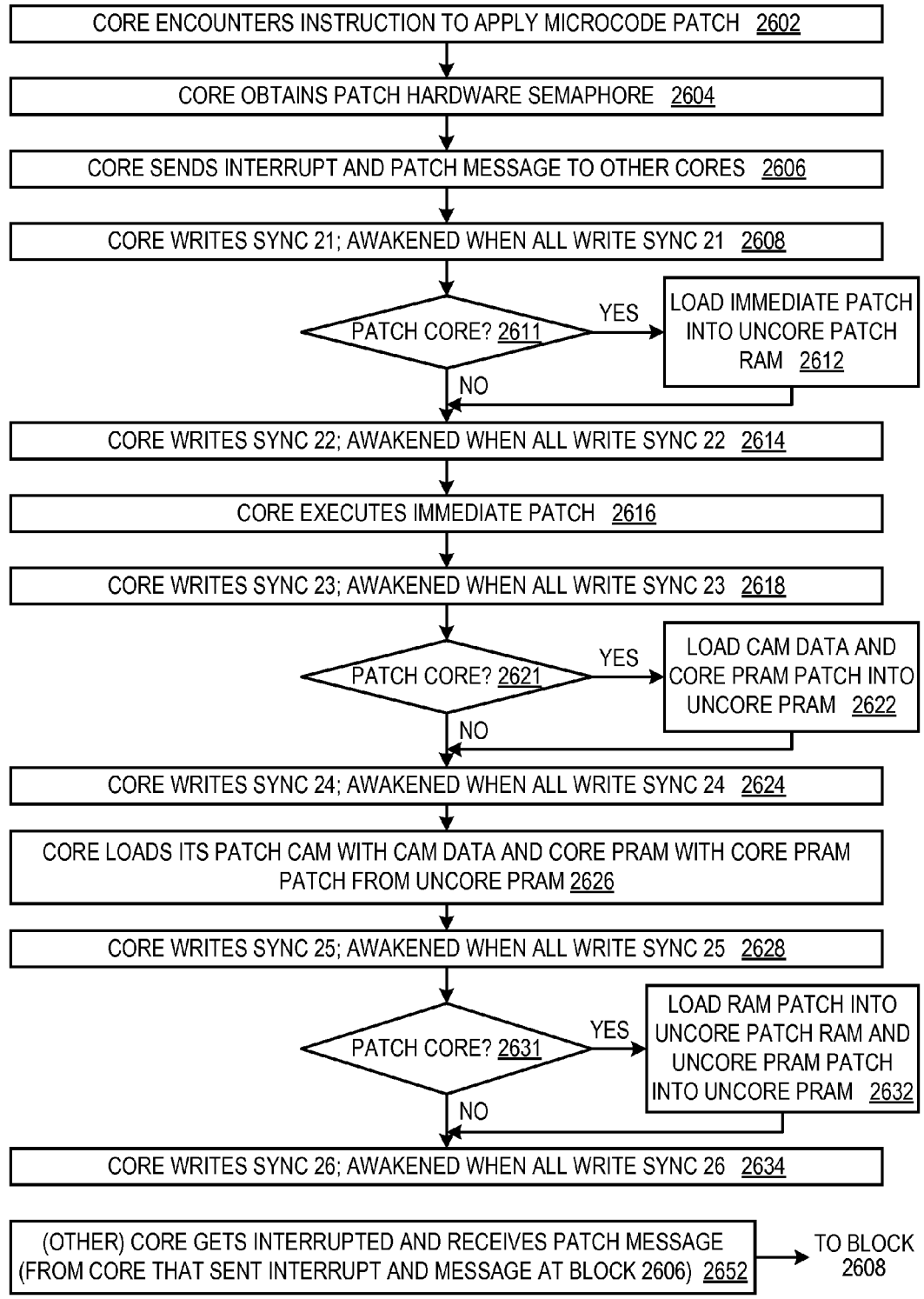
FIG. 26 is a flowchart illustrating operation of the microprocessor of FIG. 24 to propagate a microcode patch of FIG. 25 to multiple cores of the microprocessor.

The immediate patch 2504 comprises code (i.e., instructions, preferably microcode instructions) to be loaded into the uncore microcode patch RAM 2408 of FIG. 24 (e.g., at block 2612 of FIG. 26) and then executed by each of the cores 102 (e.g., at block 2616 of FIG. 26). The patch 2500 also specifies the address to which the immediate patch 2504 is to be loaded into the patch RAM 2408. Preferably, the immediate patch 2504 code modifies default values that were written by the reset microcode, such as values written to configuration registers that affect the configuration of the microprocessor 100. After the immediate patch 2504 is executed by each of the cores 102 out of the patch RAM 2408, it is not executed again. Furthermore, the subsequent loading of the RAM patch 2516 into the patch RAM 2408 (e.g., at block 2632 of FIG. 26) may overwrite the immediate patch 2504 in the patch RAM 2408.

The RAM patch 2516 comprises the patch microcode instructions to be executed in place of the microcode instructions in the core ROM 2404 or uncore ROM 2425 that need to be patched. The RAM patch 2516 also includes the address of the location in the patch RAM 2408 into which the patch microcode instructions are to be written when the patch 2500 is applied (e.g., at block 2632 of FIG. 26). The CAM data 2508 is loaded into the patch CAM 2439 of each core 102 (e.g., at block 2626 of FIG. 26). As described above with respect to the operation of the patch CAM 2439, the CAM data 2508 includes one or more entries each of which comprises a pair of microcode fetch addresses. The first address is of the microcode instruction to be patched and is the content matched by the fetch address. The second address points to the location in the patch RAM 2408 that holds the patch microcode instruction to be executed in place of the microcode instruction to be patched. Unlike the immediate patch 2504, the RAM patch 2516 remains in the patch RAM 2408 and (along with the operation of the patch CAM 2439 according to the CAM data 2508) continues to function to patch the microcode of the core microcode ROM 2404 and/or the uncore microcode ROM 2425 until modified by another patch 2500 or the microprocessor 100 is reset.

The core PRAM patch 2512 includes data to be written to the core PRAM 2499 of each core 102 and the address within the core PRAM 2499 to which each item of the data is to be written (e.g., at block 2626 of FIG. 26). The uncore PRAM patch 2518 includes data to be written to the uncore PRAM 116 and the address within the uncore PRAM 116 to which each item of the data is to be written (e.g., at block 2632 of FIG. 26).

Referring now to FIG. 26, a flowchart illustrating operation of the microprocessor 100 of FIG. 24 to propagate a microcode patch 2500 of FIG. 25 to multiple cores 102 of the microprocessor 100 is shown. The operation is described from the perspective of a single core, but each of the cores 102 of the microprocessor 100 operates according to the description to collectively propagate the microcode patch to all of the cores 102 of the microprocessor 100. More specifically, FIG. 26 describes the operation of one core that encounters the instruction to apply a patch to the microcode, whose flow begins at block 2602, and the operation of the other cores 102, whose flow begins at block 2652. It should be understood that multiple patches 2500 might be applied to the microprocessor 100 at different times during operation of the microprocessor 100. For example, a first patch 2500 may be applied according to the atomic embodiments described herein when the system that includes the microprocessor 100 is bootstrapped, such as during BIOS initialization, and a second patch 2500 may be applied after the operating system is running, which may be particularly useful for purposes of debugging the microprocessor 100.

At block 2602, one of the cores 102 encounters an instruction that instructs it to apply a microcode patch into the microprocessor 100. Preferably, the microcode patch is similar to that described above. In one embodiment, the apply microcode patch instruction is an x86 WRMSR instruction. In response to the apply microcode patch instruction, the core 102 disables interrupts and traps to microcode that implements the apply microcode patch instruction. It should be understand that the system software that includes the apply microcode patch instruction may include a sequence of multiple instructions to prepare for the application of the microcode patch; however, preferably, it is in response to a single architectural instruction of the sequence that the microcode patch is propagated to all of the cores 102 in an atomic fashion at the architectural instruction level. That is, once interrupts are disabled on the first core 102 (i.e., the core 102 that encounters the apply microcode patch instruction at block 2602), interrupts remain disabled while the implementing microcode propagates the microcode patch and it is applied to all the cores 102 of the microprocessor 100 (e.g., until after block 2634); furthermore, once interrupts are disabled on the other cores 102 (e.g., at block 2652), they remain disabled until the microcode patch has been applied to all the cores 102 of the microprocessor 100 (e.g., until after block 2634). Thus, advantageously, the microcode patch is propagated and applied to all of the cores 102 of the microprocessor 100 in an atomic fashion at the architectural instruction level. Flow proceeds to block 2604.

At block 2604, the core 102 obtains ownership of the hardware semaphore 118 of FIG. 1. Preferably, the microprocessor 100 includes a hardware semaphore 118 associated with patching microcode. Preferably, the core 102 obtains ownership of the hardware semaphore 118 in a manner similar to that described above with respect to FIG. 20, and more particularly with respect to block 2004 and 2006. The hardware semaphore 118 is used because it is possible while one of the cores 102 is applying a patch 2500 in response to encountering an apply microcode patch instruction, a second core 102 encounters an apply microcode patch instruction, in response to which the second core would begin to apply the second patch 2500, which might result in incorrect execution, for example, due to corruption of the first patch 2500. Flow proceeds to block 2606.

At block 2606, the core 102 sends a patch message to the other cores 102 and sends them an inter-core interrupt. Preferably, the core 102 traps to microcode in response to the apply microcode patch instruction (at block 2602) or in response to the interrupt (at block 2652) and remains in microcode, during which time interrupts are disabled (i.e., the microcode does not allow itself to be interrupted), until block 2634. Flow proceeds from block 2606 to block 2608.

At block 2652, one of the other cores 102 (i.e., a core 102 other than the core 102 that encountered the apply microcode patch instruction at block 2602) gets interrupted and receives the patch message as a result of the inter-core interrupt sent at block 2606. In one embodiment, the core 102 takes the interrupt at the next architectural instruction boundary (e.g., at the next x86 instruction boundary). In response to the interrupt, the core 102 disables interrupts and traps to microcode that handles the patch message. As described above, although flow at block 2652 is described from the perspective of a single core 102, each of the other cores 102 (i.e., not the core 102 at block 2602) gets interrupted and receives the message at block 2652 and performs the steps at blocks 2608 through 2634. Flow proceeds from block 2652 to block 2608.

At block 2608, the core 102 writes a sync request to its sync register 108 with a sync condition value of 21 (denoted sync 21 in FIG. 26), is put to sleep by the control unit 104, and subsequently awakened by the control unit 104 when all cores 102 have written a sync 21. Flow proceeds to decision block 2611.

At decision block 2611, the core 102 determines whether it was the core 102 that encountered the apply microcode patch instruction at block 2602 (as opposed to a core 102 that received the patch message at block 2652). If so, flow proceeds to block 2612; otherwise, flow proceeds to block 2614.

At block 2612, the core 102 loads the immediate patch 2504 portion of the microcode patch 2500 into the uncore patch RAM 2408. Additionally, the core 102 generates a checksum of the loaded immediate patch 2504 and verifies that it matches the checksum 2506. Preferably, the core 102 also sends information to the other cores 102 that specifies the length of the immediate patch 2504 and the location within the uncore patch RAM 2408 to which the immediate patch 2504 was loaded. Advantageously, because all of the cores 102 are known to be executing the same microcode that implements the application of the microcode patch, if a previous RAM patch 2516 is present in the uncore patch RAM 2408, it is safe to overwrite uncore patch RAM 2408 with the new patch because there will be no hits in the patch CAM 2439 during this time (assuming the microcode that implements the application of the microcode patch is not patched). In an alternate embodiment, the core 102 loads the immediate patch 2504 into the uncore PRAM 116, and prior to execution of the immediate patch 2504 at block 2616, the core 102 copies the immediate patch 2504 from the uncore PRAM 116 to the uncore patch RAM 2408. Preferably, the core 102 loads the immediate patch 2504 into a portion of the uncore PRAM 116 that is reserved for such purpose, e.g., a portion of the uncore PRAM 116 that is not being used for another purpose, such as holding values used by the microcode (e.g., core 102 state, TPM state, or effective microcode constants described above) and which may be patched (e.g., at block 2632), so that any previous uncore PRAM patch 2518 is not clobbered. In one embodiment, the loading into and copying from the reserved portion of the uncore PRAM 116 are performed in multiple stages in order to reduce the size required for the reserved portion. Flow proceeds to block 2614.

At block 2614, the core 102 writes a sync request to its sync register 108 with a sync condition value of 22 (denoted sync 22 in FIG. 26), is put to sleep by the control unit 104, and subsequently awakened by the control unit 104 when all cores 102 have written a sync 22. Flow proceeds to block 2616.

At block 2616, the core 102 executes the immediate patch 2504 from the uncore patch RAM 2408. As described above, in one embodiment the core 102 copies the immediate patch 2504 from the uncore PRAM 116 to the uncore patch RAM 2408 before executing the immediate patch 2504. Flow proceeds to block 2618.

At block 2618, the core 102 writes a sync request to its sync register 108 with a sync condition value of 23 (denoted sync 23 in FIG. 26), is put to sleep by the control unit 104, and subsequently awakened by the control unit 104 when all cores 102 have written a sync 23. Flow proceeds to decision block 2621.

At decision block 2621, the core 102 determines whether it was the core 102 that encountered the apply microcode patch instruction at block 2602 (as opposed to a core 102 that received the patch message at block 2652). If so, flow proceeds to block 2622; otherwise, flow proceeds to block 2624.

At block 2622, the core 102 loads the CAM data 2508 and core PRAM patch 2512 into the uncore PRAM 116. Additionally, the core 102 generates a checksum of the loaded CAM data 2508 and core PRAM patch 2512 and verifies that it matches the checksum 2514. Preferably, the core 102 also sends information to the other cores 102 that specifies the length of the CAM data 2508 and core PRAM patch 2512 and the location within the uncore PRAM 116 to which the CAM data 2508 and core PRAM patch 2512 were loaded. Preferably, the core 102 loads the CAM data 2508 and core PRAM patch 2512 into a reserved portion of the uncore PRAM 116 so that any previous uncore PRAM patch 2518 is not clobbered, similar to the manner described above with respect to block 2612. Flow proceeds to block 2624.

At block 2624, the core 102 writes a sync request to its sync register 108 with a sync condition value of 24 (denoted sync 24 in FIG. 26), is put to sleep by the control unit 104, and subsequently awakened by the control unit 104 when all cores 102 have written a sync 24. Flow proceeds to block 2626.

At block 2626, the core 102 loads the CAM data 2508 from the uncore PRAM 116 into its patch CAM 2439. Additionally, the core 102 loads the core PRAM patch 2512 from the uncore PRAM 116 into its core PRAM 2499. Advantageously, because all of the cores 102 are known to be executing the same microcode that implements the application of the microcode patch, even though the corresponding RAM patch 2516 has not yet been written into the uncore patch RAM 2408 (which will occur at block 2632), it is safe to load the patch CAM 2439 with the new CAM data 2508 because there will be no hits in the patch CAM 2439 during this time (assuming the microcode that implements the application of the microcode patch is not patched). Additionally, any updates to the core PRAM 2499 by the core PRAM patch 2512, including updates that change values that could affect the operation of the core 102 (e.g., feature set), are guaranteed not to be architecturally visible until the patch 2500 has been propagated to all the cores 102 because all of the cores 102 are known to be executing the same microcode that implements the apply microcode patch instruction and interrupts will not be enabled on any of the cores 102 until the patch 2500 has been propagated to all the cores 102. Flow proceeds to block 2628.

At block 2628, the core 102 writes a sync request to its sync register 108 with a sync condition value of 25 (denoted sync 25 in FIG. 26), is put to sleep by the control unit 104, and subsequently awakened by the control unit 104 when all cores 102 have written a sync 25. Flow proceeds to decision block 2631.

At decision block 2631, the core 102 determines whether it was the core 102 that encountered the apply microcode patch instruction at block 2602 (as opposed to a core 102 that received the patch message at block 2652). If so, flow proceeds to block 2632; otherwise, flow proceeds to block 2634.

At block 2632, the core 102 loads the RAM patch 2516 into the uncore patch RAM 2408. Additionally, the core 102 loads the uncore PRAM patch 2518 into the uncore PRAM 116. In one embodiment, the uncore PRAM patch 2518 includes code that is executed by the SPU 2423. In one embodiment, the uncore PRAM patch 2518 includes updates to values used by the microcode, as described above. In one embodiment, the uncore PRAM patch 2518 includes both the SPU 2423 code and updates to values used by the microcode. Advantageously, it is safe to load the RAM patch 2516 into the uncore patch RAM 2408 because all of the cores 102 are known to be executing the same microcode that implements the application of the microcode patch, more specifically, that the patch CAM 2439 of all the cores 102 has already been loaded with the new CAM data 2508 (e.g., at block 2626), and there will be no hits in the patch CAM 2439 during this time (assuming the microcode that implements the application of the microcode patch is not patched). Additionally, any updates to the uncore PRAM 116 by the uncore PRAM patch 2518, including updates that change values that could affect the operation of the core 102 (e.g., feature set), are guaranteed not to be architecturally visible until the patch 2500 has been propagated to all the cores 102 because all of the cores 102 are known to be executing the same microcode that implements the apply microcode patch instruction and interrupts will not be enabled on any of the cores 102 until the patch 2500 has been propagated to all the cores 102. Flow proceeds to block 234.

At block 2634, the core 102 writes a sync request to its sync register 108 with a sync condition value of 26 (denoted sync 26 in FIG. 26), is put to sleep by the control unit 104, and subsequently awakened by the control unit 104 when all cores 102 have written a sync 26. Flow ends at block 2634.

After block 2634, if code was loaded into the uncore PRAM 116 for the SPU 2423 to execute at block 2632, the patch core 102 also subsequently causes the SPU 2423 to begin executing the code, as described below with respect to FIG. 30. Also, after block 2634, the patch core 102 releases the hardware semaphore 118 obtained at block 2604. Still further, after block 2634, the core 102 re-enables interrupts.

Figure 27:
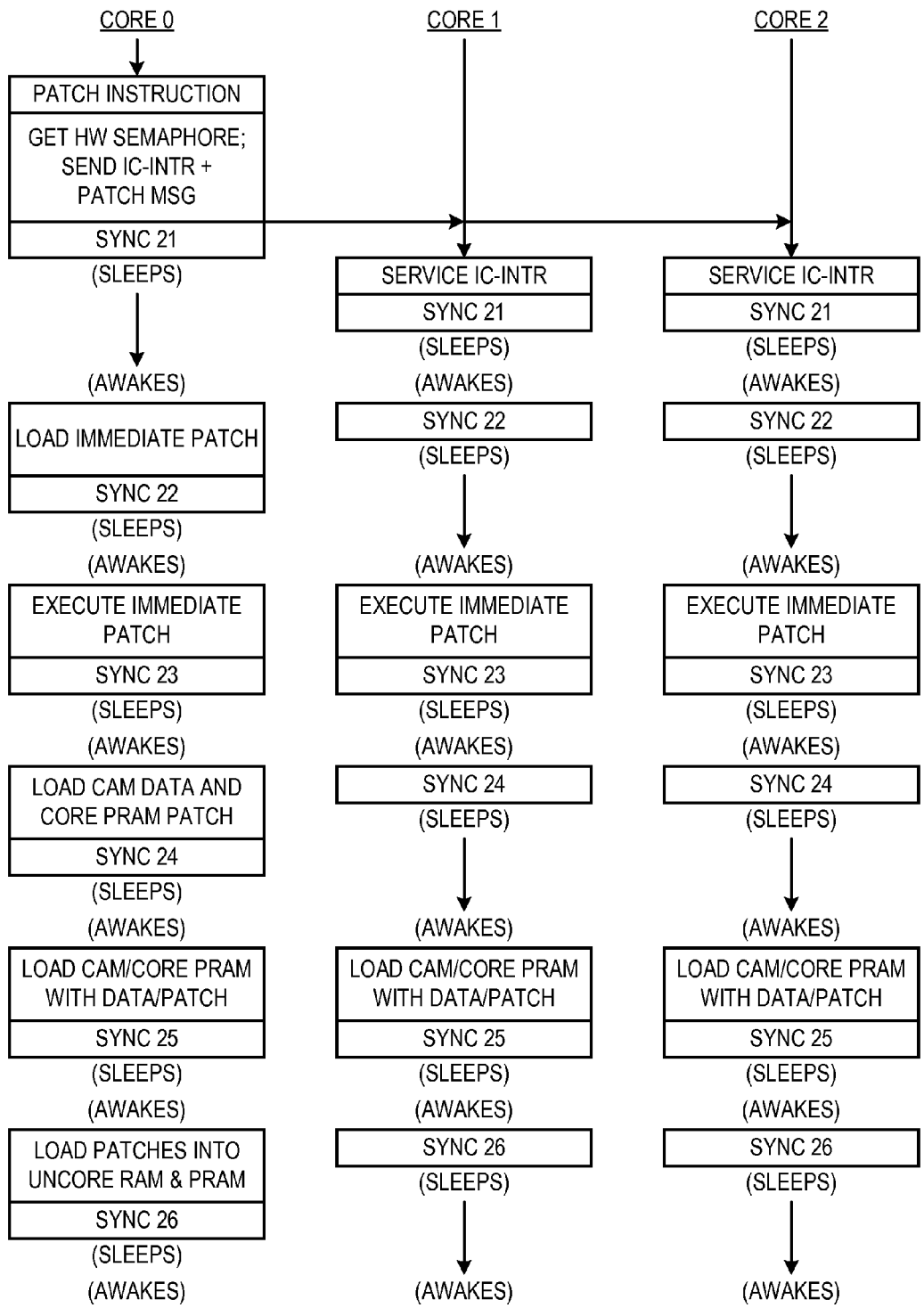
FIG. 27 is a timing diagram illustrating an example of the operation of a microprocessor according to the flowchart of FIG. 26.

Referring now to FIG. 27, a timing diagram illustrating an example of the operation of a microprocessor according to the flowchart of FIG. 26 is shown. In the example, a configuration of a microprocessor 100 with three cores 102, denoted core 0, core 1 and core 2, is shown; however, it should be understood that in other embodiments the microprocessor 100 may include different numbers of cores 102. In the timing diagram, the timing of events proceeds downward.

Core 0 receives a request to patch microcode (per block 2602) and in response obtains the hardware semaphore 118 (per block 2604). Core 0 then sends a microcode patch message and interrupt to core 1 and core 2 (per block 2606). Core 0 then writes a sync 21 and is put to sleep (per block 2608).

Each of core 1 and core 2 eventually are interrupted from their current tasks and read the message (per block 2652). In response, each of core 1 and core 2 writes a sync 21 and is put to sleep (per block 2608). As shown, the time at which each of the cores writes the sync 21 may vary, for example due to the latency of the instruction that is executing when the interrupt is asserted.

When all the cores have written the sync 21, the control unit 104 wakes them all up simultaneously (per block 2608). Core 0 then loads the immediate patch 2504 into uncore PRAM 116 (per block 2612) and writes a sync 22 and is put to sleep (per block 2614). Core 1 and core 2 each write a sync 22 and is put to sleep (per block 2614).

When all the cores have written the sync 22, the control unit 104 wakes them all up simultaneously (per block 2614). Each core then executes the immediate patch 2504 (per block 2616) and writes a sync 23 and is put to sleep (per block 2618).

When all the cores have written the sync 23, the control unit 104 wakes them all up simultaneously (per block 2618). Core 0 then loads the CAM data 2508 and core PRAM patch 2512 into uncore PRAM 116 (per block 2622) and writes a sync 24 and is put to sleep (per block 2624). Core 1 and core 2 each write a sync 24 and is put to sleep (per block 2624).

When all the cores have written the sync 24, the control unit 104 wakes them all up simultaneously (per block 2624). Each core then loads its patch CAM 2439 with the CAM data 2508 and loads its core PRAM 2499 with the core PRAM patch 2512 (per block 2626) and writes a sync 25 and is put to sleep (per block 2628).

When all the cores have written the sync 25, the control unit 104 wakes them all up simultaneously (per block 2628). Core 0 then loads the RAM patch 2516 into the uncore microcode patch RAM 2408 and loads the uncore PRAM patch 2518 into uncore PRAM 116 (per block 2632) and writes a sync 26 and is put to sleep (per block 2634). Core 1 and core 2 each write a sync 26 and is put to sleep (per block 2634).

When all the cores have written the sync 26, the control unit 104 wakes them all up simultaneously (per block 2634). As described above, if code was loaded into the uncore PRAM 116 for the SPU 2423 to execute at block 2632, the core 102 also subsequently causes the SPU 2423 to begin executing the code, as described below with respect to FIG. 30.

Figure 28:
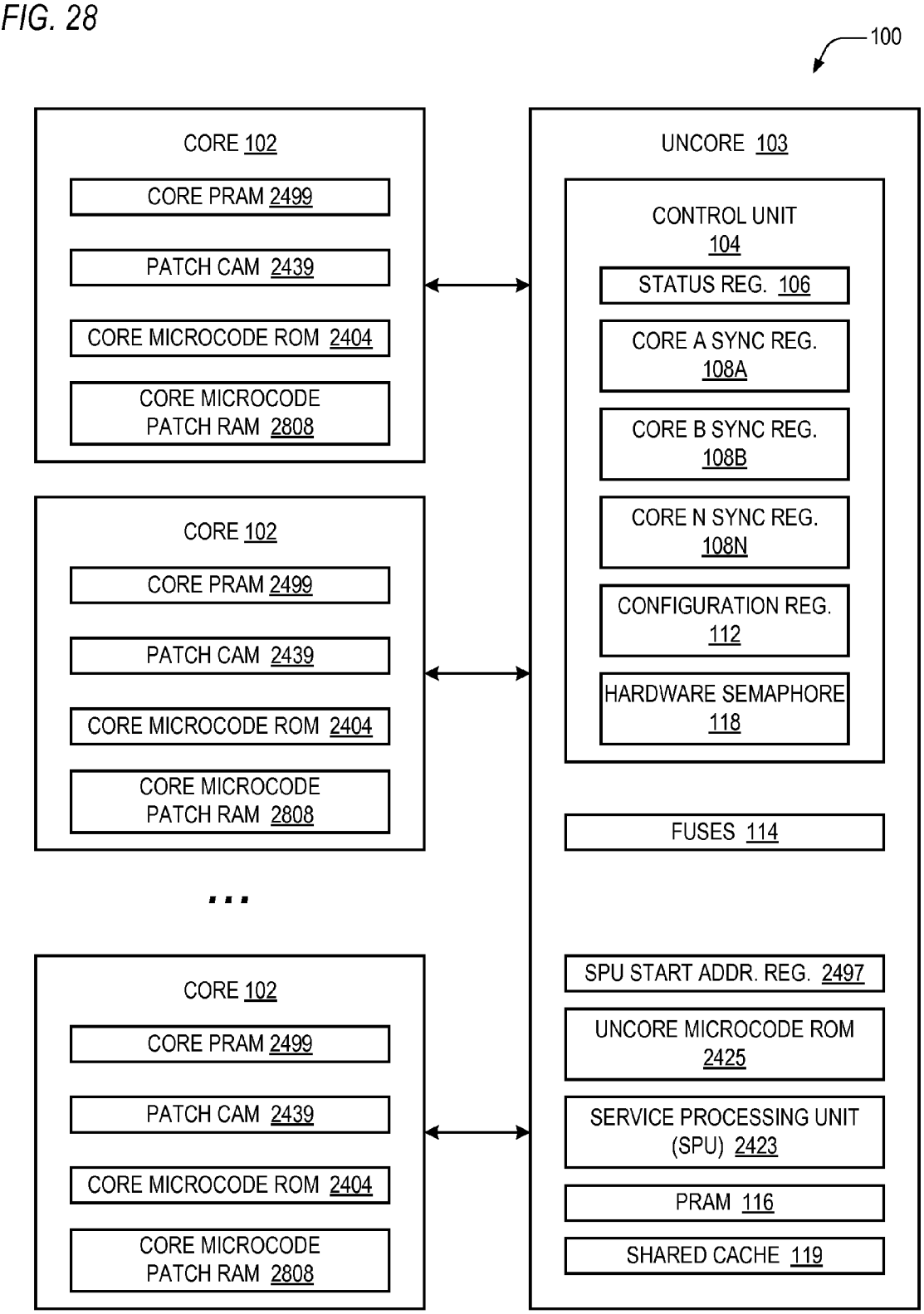
FIG. 28 is a block diagram illustrating a multicore microprocessor according to an alternate embodiment.

Referring now to FIG. 28, a block diagram illustrating a multicore microprocessor 100 according to an alternate embodiment is shown. The microprocessor 100 is similar in many respects to the microprocessor 100 of FIG. 24. However, the microprocessor 100 of FIG. 28 does not include an uncore patch RAM, but instead includes a core patch RAM 2808 in each of the cores 102, which serves a similar function to the uncore patch RAM 2408 of FIG. 24; however, the core patch RAM 2808 in each of the cores 102 is private to its respective core 102 and is not shared by the other cores 102.

Figure 29:
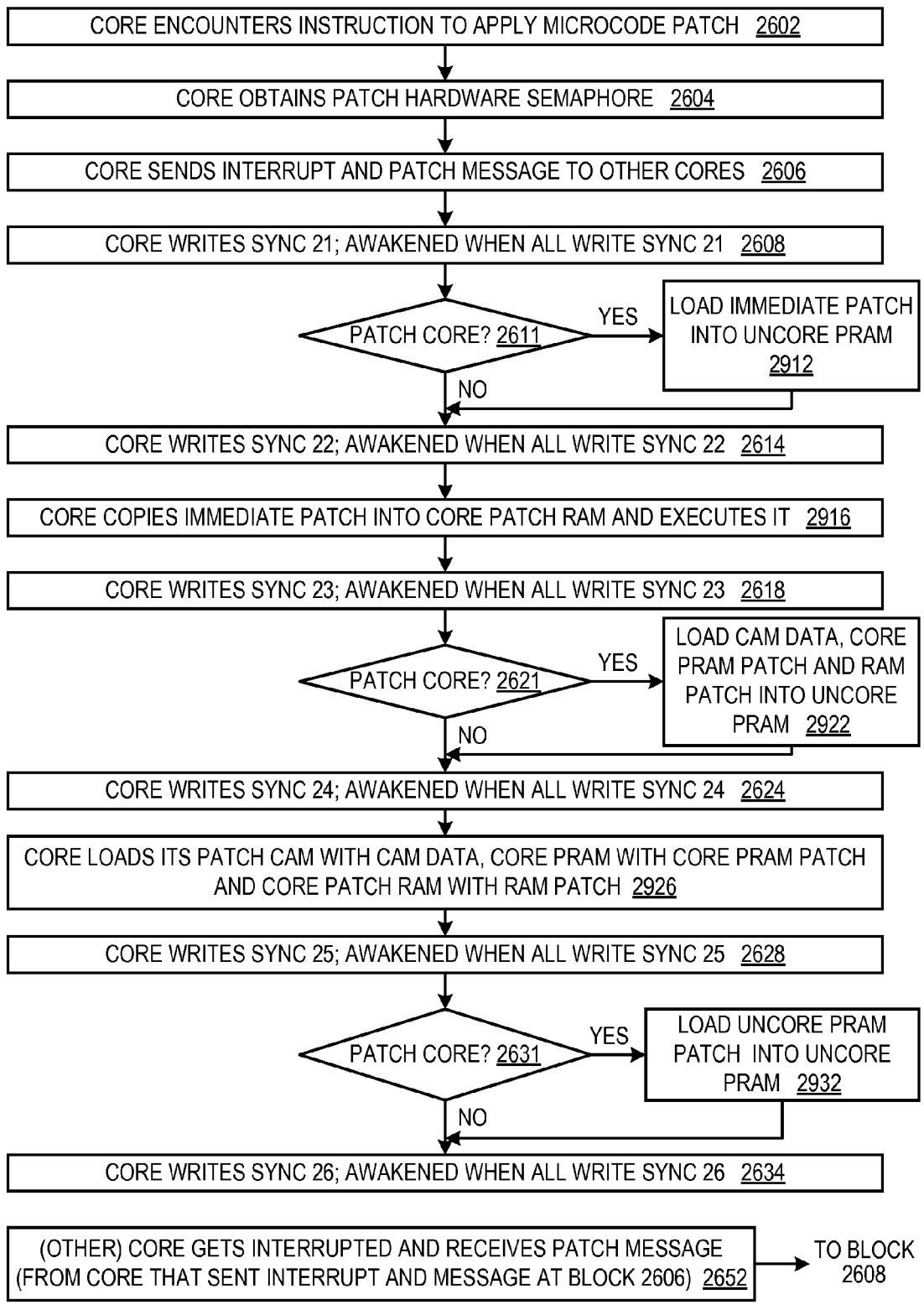
FIG. 29 is a flowchart illustrating operation of the microprocessor of FIG. 28 to propagate a microcode patch to multiple cores of the microprocessor according to an alternate embodiment.

Referring now to FIG. 29, a flowchart illustrating operation of the microprocessor 100 of FIG. 28 to propagate a microcode patch to multiple cores 102 of the microprocessor 100 according to an alternate embodiment is shown. In the alternate embodiment of FIGS. 28 and 29, the patch 2500 of FIG. 25 may be modified such that the checksum 2514 follows the RAM patch 2516, rather than the core PRAM patch 2512, and enables the microprocessor 100 to verify the integrity of the CAM data 2508, core PRAM patch 2512 and RAM patch 2516 after they are loaded into the microprocessor 100 (e.g., at block 2922 of FIG. 29). The flowchart of FIG. 29 is similar in many respects to the flowchart of FIG. 26 and similarly numbered blocks are similar. However, block 2912 replaces block 2612, block 2916 replaces block 2616, block 2922 replaces block 2622, block 2926 replaces block 2626, and block 2932 replaces block 2632. At block 2912, the core 102 loads the immediate patch 2504 into the uncore PRAM 116 (rather than into an uncore patch RAM). At block 2916, the core 102 copies the immediate patch 2504 from the uncore PRAM 116 to the core patch RAM 2808 before executing it. At block 2922, the core 102 loads the RAM patch 2516, in addition to the CAM data 2508 and core PRAM patch 2512, into the uncore PRAM 116. At block 2926, the core 102 loads the RAM patch 2516 from the uncore PRAM 116 into its patch RAM 2808, in addition to loading the CAM data 2508 from the uncore PRAM 116 into its patch CAM 2439 and loading the core PRAM patch 2512 from the uncore PRAM 116 into its core PRAM 2499. At block 2932, unlike at block 2632 of FIG. 26, the core 102 does not load the RAM patch 2516 into an uncore patch RAM.

As may be observed from the above embodiment, advantageously the atomic propagation of the microcode patch 2500 to each of relevant memories 2439/2499/2808 of the cores 102 of the microprocessor 100 and to the relevant uncore memories 2408/116 is performed in a manner to insure the integrity and efficacy of the patch 2500 even in the presence of multiple concurrently executing cores 102 that share resources and that might otherwise clobber various portions of one another's patches if applied in the conventional manner.

Patching Service Processor Code

Figure 30:
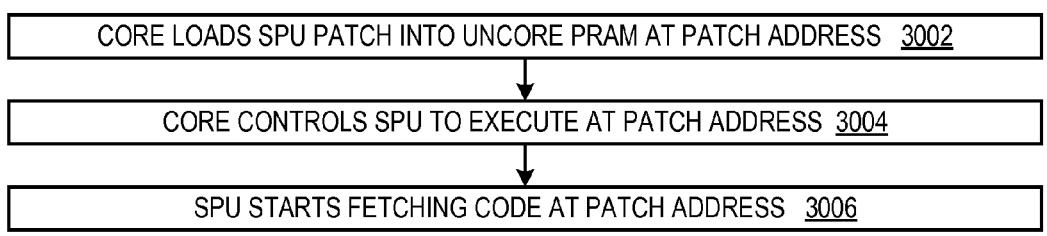
FIG. 30 is a flowchart illustrating operation of the microprocessor of FIG. 24 to patch code for a service processor.

Referring now to FIG. 30, a flowchart illustrating operation of the microprocessor 100 of FIG. 24 to patch code for a service processor is shown. Flow begins at block 3002.

At block 3002, the core 102 loads code to be executed by the SPU 2423 into the uncore PRAM 116 at a patch address specified by the patch, such as described above with respect to block 2632 of FIG. 26. Flow proceeds to block 3004.

At block 3004, the core 102 controls the SPU 2423 to execute code at the patch address, i.e., the address in uncore PRAM 116 to which the SPU 2423 code was written at block 3002. In one embodiment, the SPU 2423 is configured to fetch its reset vector (i.e., the address at which the SPU 2423 begins to fetch instructions after coming out of reset) from the start address register 2497, and the core 102 writes the patch address into the start address register 2497 and then writes to a control register that causes the SPU 2423 to be reset. Flow proceeds to block 3006.

At block 3006, the SPU 2423 begins fetching code (i.e., fetches its first instruction) at the patch address, i.e., at the address in uncore PRAM 116 to which the SPU 2423 code was written at block 3002. Typically, the SPU 2423 patch code residing in the uncore PRAM 116 will perform a jump to SPU 2423 code residing in the uncore microcode ROM 2425. Flow ends at block 3006.

The ability to patch the SPU 2423 code may be particularly useful. For example, the SPU 2423 may be used for performance testing that is transient in nature, i.e., it may not desirable to make the performance testing SPU 2423 code a permanent part of the microprocessor 100, e.g.s, for production parts, but rather only part of development parts. For another example, the SPU 2423 may be used to find and/or fix bugs. For another example, the SPU 2423 may be used to configure the microprocessor 100.

Figure 31:
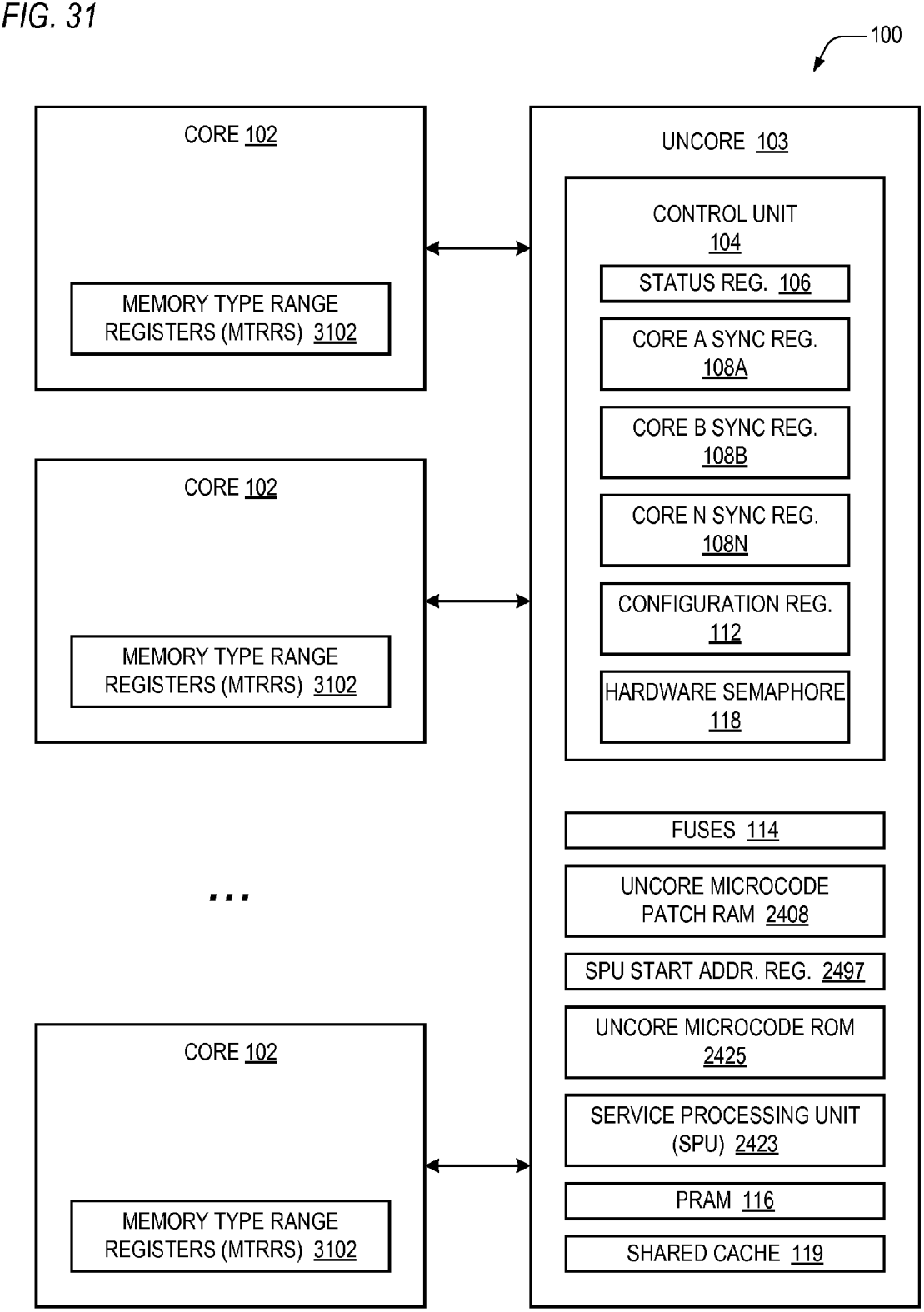
FIG. 31 is a block diagram illustrating a multicore microprocessor according to an alternate embodiment.

Atomic Propagation of Updates to Per-Core-Instantiated Architecturally-Visible Storage Resources Referring now to FIG. 31, a block diagram illustrating a multicore microprocessor 100 according to an alternate embodiment is shown. The microprocessor 100 is similar in many respects to the microprocessor 100 of FIG. 24. However, each core 102 of the microprocessor 100 of FIG. 31 also includes architecturally-visible memory type range registers (MTRRs) 3102. That is, each core 102 instantiates the architecturally-visible MTRRs 3102, even though system software expects the MTRRs 3102 to be consistent across all the cores 102 (as described in more detail below). The MTRRs 3102 are examples of per-core-instantiated architecturally-visible storage resources, and other embodiments of per-core-instantiated architecturally-visible storage resources are described below. (Although not shown, each core 102 also includes the core PRAM 2499, core microcode ROM 2404, patch CAM 2439 of FIG. 24 and, in one embodiment, the core microcode patch RAM 2808 of FIG. 28.)

The MTRRs 3102 provide a way for system software to associate a memory type with multiple different physical address ranges in the system memory address space of the microprocessor 100. Examples of different memory types include strong uncacheable, uncacheable, write-combining, write through, write back and write protected. Each MTRR 3102 specifies a memory range (either explicitly or implicitly) and its memory type. The collective values of the various MTRRs 3102 define a memory map that specifies the memory type of the different memory ranges. In one embodiment, the MTRRs 3102 are similar to the description in the Intel 64 and IA-32 Architectures Software Developer's Manual, Volume 3: System Programming Guide, September 2013, particularly in section 11.11, which is hereby incorporated by reference in its entirety for all purposes.

It is desirable that the memory map defined by the MTRRs 3102 be identical for all the cores 102 of the microprocessor 100 so that software running on the microprocessor 100 has a consistent view of memory. However, in a conventional processor, there is no hardware support for maintaining consistency of the MTRRs between the cores of a multi-core processor. As stated in the NOTE at the bottom of page 11-20 of Volume 3 of the above-referenced Intel Manual, "The P6 and more recent processor families provide no hardware support for maintaining this consistency [of MTRR values]." Consequently, system software is responsible for maintaining the MTRR consistency across cores. Section 11.11.8 of the above-referenced Intel Manual describes an algorithm for system software to maintain the consistency that involves each core of the multi-core processor updating its MTRRs, i.e., all of the cores execute instructions to update their respective MTRRs.

In contrast, embodiments are described herein in which the system software may update the respective instance of the MTRR 3102 on one of the cores 102, and that core 102 advantageously propagates the update to the respective instance of the MTRR 3102 on all of the cores 102 of the microprocessor 100 in an atomic fashion (somewhat similar to the manner in which a microcode patch is performed as described above with respect to the embodiments of FIGS. 24 through 30). This provides a means for maintaining consistency at the architectural instruction level between the MTRRs 3102 of the different cores 102.

Figure 32:
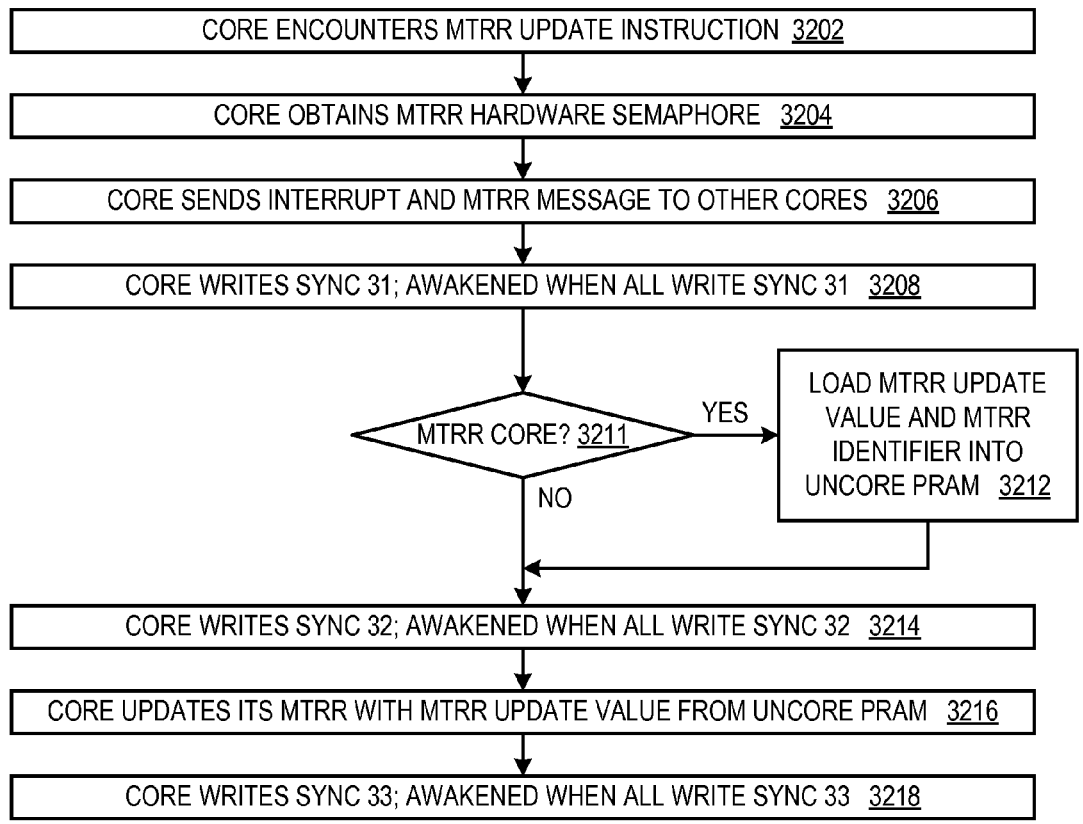
FIG. 32 is a flowchart illustrating operation of the microprocessor of FIG. 31 to propagate an MTRR update to multiple cores of the microprocessor.

Referring now to FIG. 32, a flowchart illustrating operation of the microprocessor 100 of FIG. 31 to propagate an MTRR 3102 update to multiple cores 102 of the microprocessor 100 is shown. The operation is described from the perspective of a single core, but each of the cores 102 of the microprocessor 100 operates according to the description to collectively propagate the MTRR 3102 update to all of the cores 102 of the microprocessor 100. More specifically, FIG. 32 describes the operation of one core that encounters the instruction to update the MTRR 3102, whose flow begins at block 3202, and the operation of the other cores 102, whose flow begins at block 3252.

At block 3202, one of the cores 102 encounters an architecturalx instruction that instructs the core 102 to update an MTRR 3102 of the core 102. That is, the MTRR update instruction includes an MTRR 3102 identifier and an update value to be written to the MTRR 3102. In one embodiment, the MTRR update instruction is an x86 WRMSR instruction that specifies the update value in the EAX:EDX registers and the MTRR 3102 identifier in the ECX register, which is an MSR address within the MSR address space of the core 102. In response to the MTRR update instruction, the core 102 disables interrupts and traps to microcode that implements the MTRR update instruction. It should be understand that the system software that includes the MTRR update instruction may include a sequence of multiple instructions to prepare for the update of the MTRR 3102; however, preferably, it is in response to a single architectural instruction of the sequence that the MTRR 3102 all of the cores 102 is updated in an atomic fashion at the architectural instruction level. That is, once interrupts are disabled on the first core 102 (i.e., the core 102 that encounters the MTRR update instruction at block 3202), interrupts remain disabled while the implementing microcode propagates the new MTRR 3102 value to all the cores 102 of the microprocessor 100 (e.g., until after block 3218); furthermore, once interrupts are disabled on the other cores 102 (e.g., at block 3252), they remain disabled until the MTRR 3102 of all the cores 102 of the microprocessor 100 have been updated (e.g., until after block 3218). Thus, advantageously, the new MTRR 3102 value is propagated to all of the cores 102 of the microprocessor 100 in an atomic fashion at the architectural instruction level. Flow proceeds to block 3204.

At block 3204, the core 102 obtains ownership of the hardware semaphore 118 of FIG. 1. Preferably, the microprocessor 100 includes a hardware semaphore 118 associated with an MTRR 3102 update. Preferably, the core 102 obtains ownership of the hardware semaphore 118 in a manner similar to that described above with respect to FIG. 20, and more particularly with respect to block 2004 and 2006. The hardware semaphore 118 is used because it is possible while one of the cores 102 is performing an MTRR 3102 update in response to encountering an MTRR update instruction, a second core 102 encounters an MTRR update instruction, in response to which the second core would begin to update the MTRR 3102, which might result in incorrect execution. Flow proceeds to block 3206.

At block 3206, the core 102 sends a MTRR update message to the other cores 102 and sends them an inter-core interrupt. Preferably, the core 102 traps to microcode in response to the MTRR update instruction (at block 3202) or in response to the interrupt (at block 3252) and remains in microcode, during which time interrupts are disabled (i.e., the microcode does not allow itself to be interrupted), until block 3218. Flow proceeds from block 3206 to block 3208.

At block 3252, one of the other cores 102 (i.e., a core 102 other than the core 102 that encountered the MTRR update instruction at block 3202) gets interrupted and receives the MTRR update message as a result of the inter-core interrupt sent at block 3206. In one embodiment, the core 102 takes the interrupt at the next architectural instruction boundary (e.g., at the next x86 instruction boundary). In response to the interrupt, the core 102 disables interrupts and traps to microcode that handles the MTRR update message. As described above, although flow at block 3252 is described from the perspective of a single core 102, each of the other cores 102 (i.e., not the core 102 at block 3202) gets interrupted and receives the message at block 3252 and performs the steps at blocks 3208 through 3234. Flow proceeds from block 3252 to block 3208.

At block 3208, the core 102 writes a sync request to its sync register 108 with a sync condition value of 31 (denoted sync 31 in FIG. 32), is put to sleep by the control unit 104, and subsequently awakened by the control unit 104 when all cores 102 have written a sync 31. Flow proceeds to decision block 3211.

At decision block 3211, the core 102 determines whether it was the core 102 that encountered the MTRR update instruction at block 3202 (as opposed to a core 102 that received the MTRR update message at block 3252). If so, flow proceeds to block 3212; otherwise, flow proceeds to block 3214.

At block 3212, the core 102 loads into the uncore PRAM 116 the MTRR identifier specified by the MTRR update instruction and an MTRR update value with which the MTRR is to be updated such that it is visible by all the other cores 102. In the case of an x86 embodiment, MTRRs 3102 include both (1) fixed range MTRRs that comprise a single 64-bit MSR that is updated via a single WRMSR instruction and (2) variable range MTRRs that comprise two 64-bit MSRs each of which is written via a different WRMSR instruction, i.e., the two WRMSR instructions specify different MSR addresses. For variable range MTRRs, one of the MSRs (the PHYSBASE register) includes a base address of the memory range and a type field for specifying the memory type, and the other of the MSRs (the PHYSMASK register) includes a valid bit and a mask field that sets the range mask. Preferably, the core 102 loads into the uncore PRAM 116 the MTRR update value as follows.
1. If the MSR identified is the PHYSMASK register, the core 102 loads into the uncore PRAM 116 a 128-bit update value that includes both the new 64-bit value specified by the WRMSR instruction (which includes the valid bit and mask values) and the current value of the PHYSBASE register (which includes the base and type values).
2. If the MSR identified is the PHYSBASE register:
    a. If the valid bit in the PHYSMASK register is currently set, the core 102 loads into the uncore PRAM 116 a 128-bit update value that includes both the new 64-bit value specified by the WRMSR instruction (which includes the base and type values) and the current value of the PHYSMASK register (which includes the valid bit and mask values).
    b. If the valid bit in the PHYSMASK register is currently clear, the core 102 loads into the uncore PRAM 116 a 64-bit update value that includes only the new 64-bit value specified by the WRMSR instruction (which includes the base and type values).

Additionally, the core 102 sets a flag in the uncore PRAM 116 if the update value written is a 128-bit value and clears the flag if the update value is a 64-bit value. Flow proceeds from block 3212 to block 3214.

At block 3214, the core 102 writes a sync request to its sync register 108 with a sync condition value of 32 (denoted sync 32 in FIG. 32), is put to sleep by the control unit 104, and subsequently awakened by the control unit 104 when all cores 102 have written a sync 32. Flow proceeds to block 3216.

At block 3216, the core 102 reads from the uncore PRAM 116 the MTRR 3102 identifier and MTRR update value written at block 3212 and updates its identified MTRR 3102 with the MTRR update value. Advantageously, the MTRR update value propagation is performed in an atomic fashion such that any updates to the MTRRs 3102 that could affect the operation of their respective core 102 are guaranteed not to be architecturally visible until the update value has been propagated to the MTRR 3102 of all the cores 102 because all of the cores 102 are known to be executing the same microcode that implements the MTRR update instruction and interrupts will not be enabled on any of the cores 102 until the value has been propagated to the respective MTRR 3102 of all the cores 102. With respect to the embodiment described above with respect to block 3212, if the flag written at block 3212 is set, the core 102 also updates (in addition to the identified MSR) the PHYSMASK or PHYSBASE register; otherwise if the flag is clear, the core 102 only updates the identified MSR. Flow proceeds to block 3218.

At block 3218, the core 102 writes a sync request to its sync register 108 with a sync condition value of 33 (denoted sync 33 in FIG. 32), is put to sleep by the control unit 104, and subsequently awakened by the control unit 104 when all cores 102 have written a sync 33. Flow ends at block 3218.

After block 3218, the MTRR core 102 releases the hardware semaphore 118 obtained at block 3204. Still further, after block 3218, the core 102 re-enables interrupts.

As may be observed from FIGS. 31 and 32, system software running on the microprocessor 100 of FIG. 31 may advantageously execute a MTRR update instruction on a single core 102 of the microprocessor 100 to accomplish updating of the specified MTRR 3102 of all the cores 102 of the microprocessor 100, rather than executing a MTRR update instruction on each of the cores 102 individually, which may provide system integrity advantages.

One particular MTRR 3102 instantiated in each core 102 is a system management range register (SMRR) 3102. The memory range specified by the SMRR 3102 is referred to as the SMRAM region because it holds code and data associated with system management mode (SMM) operation, such as a system management interrupt (SMI) handler. When code running on a core 102 attempts to access the SMRAM region, the core 102 only allows the access if the core 102 is running in SMM; otherwise, the core 102 ignores a write to the SMRAM region and returns a fixed value for each byte read from the SMRAM region. Furthermore, if a core 102 running in SMM attempts to execute code outside the SMRAM region, the core 102 will assert a machine check exception. Additionally, the core 102 only allows code to write the SMRR 3102 if it is running in SMM. This facilitates the protection of SMM code and data in the SMRAM region. In one embodiment, the SMRR 3102 is similar to that described in the Intel 64 and IA-32 Architectures Software Developer's Manual, Volume 3: System Programming Guide, September 2013, particularly in sections 11.11.2.4 and 34.4.2.1, which are hereby incorporated by reference in their entirety for all purposes.

Typically, each core 102 has its own instance of SMM code and data in memory. It is desirable that each core's 102 SMM code and data be protected not only from code running on itself, but also from code running on the other cores 102. To accomplish this using the SMRRs 3102, system software typically places the multiple SMM code and data instances in adjacent blocks of memory. That is, the SMRAM region is a single contiguous memory region that includes all of the SMM code and data instances. If the SMRR 3102 of all the cores 102 of the microprocessor 100 have values that specify the entirety of the single contiguous memory region that includes all of the SMM code and data instances, this prevents code running on one core in non-SMM from updating the SMM code and data instance of another core 102. If a window of time exists in which the SMRR 3102 values of the cores 102 are different, i.e., the SMRRs 3102 of different cores 102 of the microprocessor 100 have different values any of which specify less than the entirety of the single contiguous memory region that includes all of the SMM code and data instances, then the system may be vulnerable to a security attack, which may be serious given the nature of SMM. Thus, embodiments that atomically propagate updates to the SMRRs 3102 may be particularly advantageous.

Additionally, other embodiments are contemplated in which the update of other per-core-instantiated architecturally-visible storage resources of the microprocessor 100 are propagated in an atomic fashion similar to the manner described above. For example, in one embodiment each core 102 instantiates certain bit fields of the x86 IA32_MISC_ENABLE MSR, and a WRMSR executed on one core 102 is propagated to all of the cores 102 of the microprocessor 100 in a manner similar to that described above. Furthermore, embodiments are contemplated in which the execution on one core 102 of a WRMSR to other MSRs that are instantiated on all of the cores 102 of the microprocessor 100, both architectural and proprietary and/or current and future, is propagated to all of the cores 102 of the microprocessor 100 in a manner similar to that described above.

Furthermore, although embodiments are described in which the per-core-instantiated architecturally-visible storage resources are MTRRs, other embodiments are contemplated in which the per-core-instantiated resources are resources of different instruction set architectures than the x86 ISA, and are other resources than MTRRs. For example, other resources than the MTRRs include CPUID values and MSRs that report capabilities, such as Vectored Multimedia eXtensions (VMX) capabilities.

While various embodiments of the present invention have been described herein, it should be understood that they have been presented by way of example, and not limitation. It will be apparent to persons skilled in the relevant computer arts that various changes in form and detail can be made therein without departing from the scope of the invention. For example, software can enable, for example, the function, fabrication, modeling, simulation, description and/or testing of the apparatus and methods described herein. This can be accomplished through the use of general programming languages (e.g., C, C++), hardware description languages (HDL) including Verilog HDL, VHDL, and so on, or other available programs. Such software can be disposed in any known computer usable medium such as magnetic tape, semiconductor, magnetic disk, or optical disc (e.g., CD-ROM, DVD-ROM, etc.), a network, wire line, wireless or other communications medium. Embodiments of the apparatus and method described herein may be included in a semiconductor intellectual property core, such as a microprocessor core (e.g., embodied, or specified, in a HDL) and transformed to hardware in the production of integrated circuits. Additionally, the apparatus and methods described herein may be embodied as a combination of hardware and software. Thus, the present invention should not be limited by any of the exemplary embodiments described herein, but should be defined only in accordance with the following claims and their equivalents. Specifically, the present invention may be implemented within a microprocessor device that may be used in a general-purpose computer. Finally, those skilled in the art should appreciate that they can readily use the disclosed conception and specific embodiments as a basis for designing or modifying other structures for carrying out the same purposes of the present invention without departing from the scope of the invention as defined by the appended claims.

The invention claimed is:

1. A microprocessor, comprising:
   a control unit, configured to selectively control a respective clock signal to each of a plurality of processing cores;
   the plurality of processing cores, each configured to separately write a value to the control unit;
   wherein, for each core of the plurality of processing cores, the control unit is configured to turn off the respective clock signal to the core in response to the core writing a value to the control unit;
   wherein the control unit is configured to detect a condition has occurred by determining that all of the plurality of processing cores have written a value to the control unit and the control unit has turned off the respective clock signal to all of the plurality of processing cores; and
   wherein the control unit is configured to simultaneously turn on the respective clock signal to all of the plurality of processing cores in response to detecting the condition has occurred.

2. The microprocessor of claim 1, wherein:
   wherein the control unit is configured to detect the condition has occurred by determining that all of the plurality of processing cores have written the same value to the control unit and the control unit has turned off the respective clock signal to all of the cores.

3. The microprocessor of claim 2, wherein if the control unit detects one of the plurality of processing cores writes a value different from the value previously written by other of the plurality of processing cores, the control unit is configured to indicate a deadlock condition and to turn on the respective clock signal to all of the plurality of processing cores for which it previously turned off the respective clock signal.

4. The microprocessor of claim 1, wherein the value written by each of the plurality of processing cores includes an indicator that indicates whether or not the value includes a sleep state, wherein the control unit is configured to detect the condition has occurred by determining that all of the plurality of processing cores have written a value to the control unit in which the indicator indicates the value includes a sleep state.

5. The microprocessor of claim 4, wherein an operating system running on the core executes a sleep instruction to specify the sleep state to the core.

6. The microprocessor of claim 4, further comprising:
   a status register, readable by each of the plurality of processing cores, wherein when the control unit detects the condition has occurred the control unit populates the status register with a lowest common value of the sleep state written by each of the plurality of processing cores.

7. The microprocessor of claim 1, wherein the value written by each of the plurality of processing cores includes a selective wakeup indicator, wherein in response to detecting the condition has occurred the control unit is configured to turn on the respective clock signal to only a temporally last of the plurality of processing cores to write the value.

8. The microprocessor of claim 1, further comprising:
   for each core of the plurality of processing cores, an indicator that indicates whether the core is enabled or disabled; and
   wherein the control unit is configured to detect the condition has occurred by determining that all of the enabled cores of the plurality of processing cores have written a value to the control unit without regard for whether the disabled cores have written a value to the control unit.

9. The microprocessor of claim 1, further comprising:
wherein the control unit is configured to determine that the value written by each of the plurality of processing cores specifies a subset of the plurality of processing cores that is less than all of the plurality of processing cores; and
wherein the control unit is configured to detect the condition has occurred by determining that all of the plurality of processing cores included in the subset have written a value to the control unit without regard for whether the plurality of processing cores excluded from the subset have written a value to the control unit.

10. The microprocessor of claim 9, wherein the value written by each of the plurality of processing cores specifies that ones of the plurality of processing cores located on a same semiconductor die as the one of the plurality of processing cores that wrote the value are included in the subset and ones of the plurality of processing cores located on a different semiconductor die as the one of the plurality of processing cores that wrote the value are excluded from the subset.

11. The microprocessor of claim 9, wherein the value written by each of the plurality of processing cores specifies that ones of the plurality of processing cores located on a different semiconductor die as the one of the plurality of processing cores that wrote the value are included in the subset and ones of the plurality of processing cores located on a same semiconductor die as the one of the plurality of processing cores that wrote the value are excluded from the subset.

12. The microprocessor of claim 9, wherein the value written by each of the plurality of processing cores specifies that ones of the plurality of processing cores that share a cache memory with the one of the plurality of processing cores that wrote the value are included in the subset and ones of the plurality of processing cores that do not share a cache memory with the one of the plurality of processing cores that wrote the value are excluded from the subset.

13. The microprocessor of claim 1, wherein the value written by each of the plurality of processing cores includes a field that specifies one or more wakeup events, wherein the control unit is configured to turn on the respective clock signal to the core when the control unit detects one or more of the specified one or more wakeup events has occurred.

14. The microprocessor of claim 1, wherein to simultaneously turn on the respective clock signal to all of the plurality of processing cores the control unit is configured to turn on the respective clock signal to all of the plurality of processing cores on the same clock cycle.

15. In a microprocessor having a control unit and a plurality of processing cores, a method for synchronizing operations among the cores, the method comprising:
writing, by each of the plurality of processing cores, a value to the control unit;
turning off, by the control unit for each core of the plurality of processing cores, a respective clock signal to the core in response to the core said writing a value to the control unit;
detecting, by the control unit, that a condition has occurred by determining that all of the plurality of processing cores have written a value to the control unit and the control unit has turned off the respective clock signal to all of the plurality of processing cores; and
turning on, by the control unit, simultaneously the respective clock signal to all of the plurality of processing cores in response to said detecting the condition has occurred.

16. The method of claim 15, wherein:
wherein said detecting the condition has occurred by determining that all of the plurality of processing cores have written the same value to the control unit and the control unit has turned off the respective clock signal to all of the cores.

17. The method of claim 16, further comprising:
detecting, by the control unit, that one of the plurality of processing cores writes a value different from the value previously written by other of the plurality of processing cores; and
indicating, by the control unit, a deadlock condition and turning on the respective clock signal to all of the plurality of processing cores for which it previously turned off the respective clock signal.

18. The method of claim 15, wherein the value written by each of the plurality of processing cores includes an indicator that indicates whether or not the value includes a sleep state, wherein said detecting the condition has occurred by determining that all of the plurality of processing cores have written a value to the control unit in which the indicator indicates the value includes a sleep state.

19. The method of claim 18, wherein an operating system running on the core executes a sleep instruction to specify the sleep state to the core.

20. The method of claim 18, the method further comprising:
detecting, by the control unit, the condition has occurred; and
populating, by the control unit, a status register, readable by each of the plurality of processing cores, with a lowest common value of the sleep state written by each of the plurality of processing cores.

21. The method of claim 15, wherein the value written by each of the plurality of processing cores includes a selective wakeup indicator, the method further comprising:
in response to detecting the condition has occurred, turning on, by the control unit, the respective clock signal to only a temporally last of the plurality of processing cores to write the value.

22. The method of claim 15, wherein the microprocessor also includes for each core of the plurality of processing cores, an indicator that indicates whether the core is enabled or disabled, wherein said detecting the condition has occurred by determining that all of the enabled cores of the plurality of processing cores have written a value to the control unit without regard for whether the disabled cores have written a value to the control unit.

23. The method of claim 15, further comprising:
determining, by the control unit, that the value written by each of the plurality of processing cores specifies a subset of the plurality of processing cores that is less than all of the plurality of processing cores; and
wherein said detecting the condition has occurred by determining that all of the plurality of processing cores included in the subset have written a value to the control unit without regard for whether the plurality of processing cores excluded from the subset have written a value to the control unit.

24. The method of claim 23, wherein the value written by each of the plurality of processing cores specifies that ones of the plurality of processing cores located on a same semiconductor die as the one of the plurality of processing cores that wrote the value are included in the subset and ones of the plurality of processing cores located on a different semiconductor die as the one of the plurality of processing cores that wrote the value are excluded from the subset.

25. The method of claim 23, wherein the value written by each of the plurality of processing cores specifies that ones of the plurality of processing cores located on a different semiconductor die as the one of the plurality of processing cores that wrote the value are included in the subset and ones of the plurality of processing cores located on a same semiconductor die as the one of the plurality of processing cores that wrote the value are excluded from the subset.

26. The method of claim 23, wherein the value written by each of the plurality of processing cores specifies that ones of the plurality of processing cores that share a cache memory with the one of the plurality of processing cores that wrote the value are included in the subset and ones of the plurality of processing cores that do not share a cache memory with the one of the plurality of processing cores that wrote the value are excluded from the subset.

27. The method of claim 15, wherein the value written by each of the plurality of processing cores includes a field that specifies one or more wakeup events, wherein the control unit is configured to turn on the respective clock signal to the core when the control unit detects one or more of the specified one or more wakeup events has occurred.

28. The method of claim 15, wherein said turning on simultaneously the respective clock signal to all of the plurality of processing cores comprises turning on the respective clock signal to all of the plurality of processing cores on the same clock cycle.

29. A computer program product encoded in at least one non-transitory computer usable medium for use with a computing device, the computer program product comprising:
- computer usable program code embodied in said medium, for specifying a microprocessor, the computer usable program code comprising:
    - first program code for specifying a control unit, configured to selectively control a respective clock signal to each of a plurality of processing cores; and
    - second program code for specifying the plurality of processing cores, each configured to separately write a value to the control unit;
- wherein, for each core of the plurality of processing cores, the control unit is configured to turn off the respective clock signal to the core in response to the core writing a value to the control unit;
- wherein the control unit is configured to detect a condition has occurred by determining that all of the plurality of processing cores have written a value to the control unit and the control unit has turned off the respective clock signal to all of the plurality of processing cores; and
- wherein the control unit is configured to simultaneously turn on the respective clock signal to all of the plurality of processing cores in response to detecting the condition has occurred.

30. The computer program product of claim 29, wherein the at least one non-transitory computer usable medium is selected from the set of a disk, tape, or other magnetic, optical, or electronic storage medium.

31. The microprocessor of claim 1, further comprising a processor die, wherein the control unit and the plurality of cores are in the processor die.

32. The microprocessor of claim 31, further comprising an uncore address/data bus on the die that provides micro-architectural address space to resources of the die that are shared by the plurality of cores, wherein each core is configured to write a value to the control unit over the uncore address/data bus.

33. The microprocessor of claim 31, further comprising:
- a plurality of control unit registers, wherein a separate register is provided for each core;
- wherein each core is configured to separately write a value to the corresponding control unit register; and
- wherein the control unit is configured to detect that a condition has occurred by determining that a common value has been written by each of the plurality of processing cores, or by each of the cores of a defined subset of the processing cores, to each of the corresponding control unit registers, and the control unit has turned off the respective clock signal to all of the plurality of processing cores.

* * * * *